United States Patent
Carreira-Perpiñán

(10) Patent No.: US 12,505,355 B2
(45) Date of Patent: Dec. 23, 2025

(54) GENERAL FORM OF THE TREE ALTERNATING OPTIMIZATION (TAO) FOR LEARNING DECISION TREES

(71) Applicant: The Regents of the University of California, Oakland, CA (US)

(72) Inventor: Miguel Á Carreira-Perpiñán, Merced, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 957 days.

(21) Appl. No.: 17/616,946

(22) PCT Filed: Jun. 8, 2020

(86) PCT No.: PCT/US2020/036696
§ 371 (c)(1),
(2) Date: Dec. 6, 2021

(87) PCT Pub. No.: WO2020/247949
PCT Pub. Date: Dec. 10, 2020

(65) Prior Publication Data
US 2022/0318641 A1    Oct. 6, 2022

Related U.S. Application Data

(60) Provisional application No. 62/858,923, filed on Jun. 7, 2019.

(51) Int. Cl.
G06N 5/01    (2023.01)
G06N 5/022    (2023.01)

(52) U.S. Cl.
CPC ............... *G06N 5/01* (2023.01); *G06N 5/022* (2013.01)

(58) Field of Classification Search
CPC .................... G06N 5/01; G06N 5/022
See application file for complete search history.

(56) References Cited

U.S. PATENT DOCUMENTS 6,247,016 B1    6/2001    Rastogi et al.
6,385,607 B1    5/2002    Iyengar
(Continued)

FOREIGN PATENT DOCUMENTS

WO    2020247949 A1    12/2020

OTHER PUBLICATIONS

Charuvaka et al, "Approximate Block Coordinate Descent for Large Scale Hierarchical Classification", 2015 (Year: 2015).*
(Continued)

*Primary Examiner* — Michael J Huntley
*Assistant Examiner* — Christopher Dillon Devore
(74) *Attorney, Agent, or Firm* — NIXON PEABODY LLP

(57) ABSTRACT

A computer-implemented Tree Alternating Optimization (TAO) algorithm for learning decision trees to find an approximate minimizer of an objective function over the parameters of the tree. Generally, the method comprises inputting an initial decision tree and a training set of instances, processing the initial decision tree by partitioning nodes into sets of non-descendant nodes, processing the nodes in each set by updating the nodes' parameters at each iteration so that the objective function decreases monotonically, and pruning the tree, which produces a final tree of a size no larger than that of the initial tree. TAO applies to many different types of loss functions, regularization terms and constraints, and types of models at both the decision nodes and the leaves, and makes it possible to learn better decision trees than with traditional algorithms, and to learn trees for problems where traditional algorithms do not apply.

24 Claims, 15 Drawing Sheets

(56) References Cited

U.S. PATENT DOCUMENTS

| | | | |
|---|---|---|---|
| 7,233,931 | B2 | 6/2007 | Lee et al. |
| 8,725,661 | B1 * | 5/2014 | Goldman .............. G06N 20/00 706/12 |
| 2008/0168011 | A1 | 7/2008 | Steinberg |
| 2014/0122381 | A1 | 5/2014 | Nowozin |
| 2015/0134576 | A1 | 5/2015 | Shotton et al. |
| 2015/0302317 | A1 | 10/2015 | Norouzi et al. |
| 2015/0379426 | A1 | 12/2015 | Steele et al. |
| 2016/0078361 | A1 * | 3/2016 | Brueckner .............. H04L 67/10 706/12 |
| 2018/0231565 | A1 | 8/2018 | Jakobi et al. |
| 2020/0050963 | A1 | 2/2020 | Tanaka et al. |
| 2020/0372400 | A1 | 11/2020 | Carreira-Perpiñán |

OTHER PUBLICATIONS

Wu et al, "Beyond Sparsity: Tree Regularization of Deep Models for Interpretability", 2018 (Year: 2018).*

Hu et al, "Optimal Sparse Decision Trees", Apr. 29, 2019 (Year: 2019).*

Xiang et al, "A Text Stream Online Subject Detecting Method And System", 2018, English Translation Version (Year: 2018).*

Xiang et al, "A Text Stream Online Subject Detecting Method And System", 2018 (Year: 2018).*

Chia-chi Wu et al, "Decision Tree Induction With A Constrained Number of Leaf Nodes", 2016 (Year: 2016).*

ISR and WO for PCT/US2020/036696 dated Aug. 25, 2020, 7 pages.

Carreira-Perpiñán et al., Alternating Optimization of Decision Trees, with Application to Learning Sparse Oblique Trees, (online) Advances in Neural Information Processing Systems, 2018, [retrieved on Aug. 11, 2020] retrieved from the Internet < URL: http://papers.nips.cc/paper/7397-alternating-optimization-of-decision-trees-with-application-to-learning-sparse-oblique-trees.pdf> entire document (especially p. 2-9), 11 pages.

Kruse et al., Test Sequence Generation from Classification Trees 2012 IEEE Fifth International Conference on Software Testing; 2012.

Review-Alternating optimization of decision trees, with application to learning sparse oblique trees, NIPS, 2018, 4 pages [retrieved on Dec. 12, 2022] retrieved from the Internet <URL: https://proceedings.neurips.cc/paper/2018/file/185c29dc24325934ee377cfda20e414c-Reviews.html> entire document.

Carreira-Perpiñán et al., Supplementary material for: Alternating Optimization of Decision Trees, with Application to Learning Sparse Oblique Trees, University of California, Merced, Oct. 26, 2018, 7 pages.

NSF Grant awarded to UC-Merced 2020, 3 pages [retrieved on Dec. 12, 2022] retrieved from the Internet < URL: https://www.nsf.gov/awardsearch/showAward?AWD_ID=2007147> entire document.

* cited by examiner

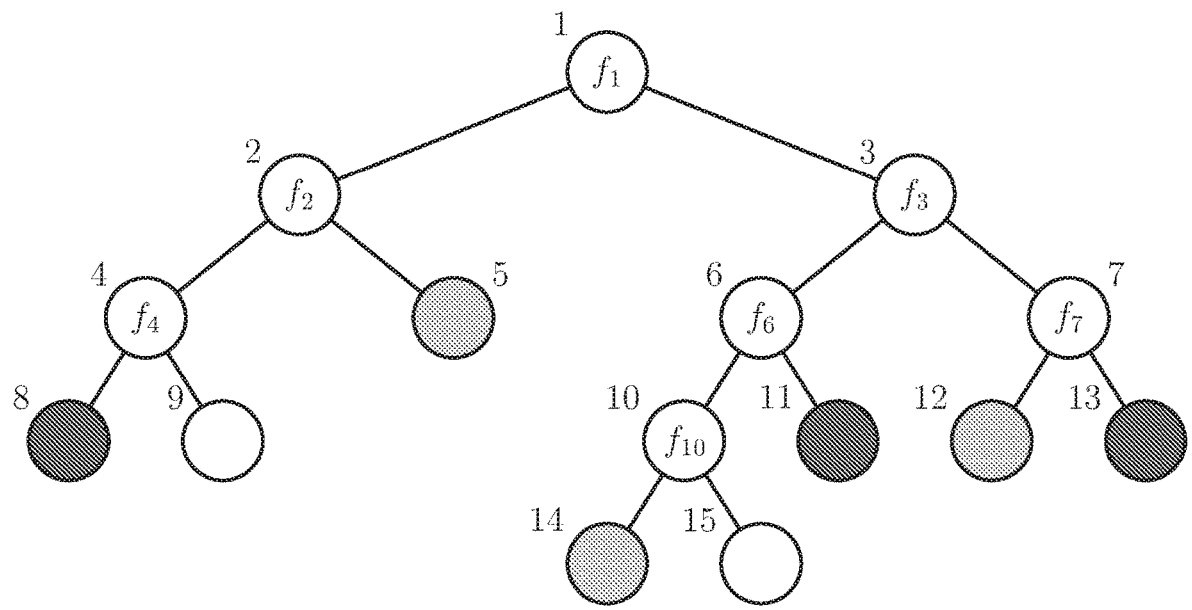
FIG. 1A
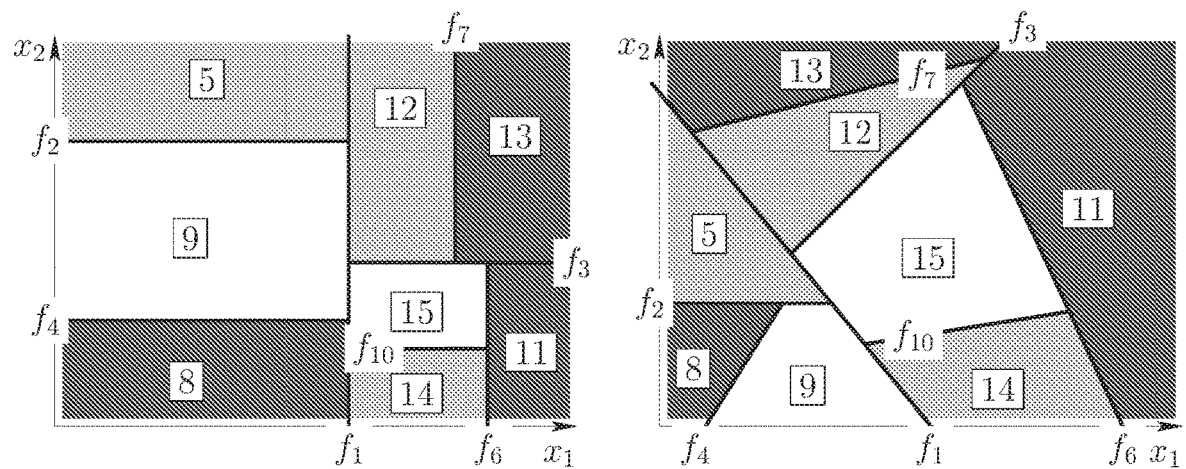
FIG. 1B
FIG. 1C

TAO-ALGORITHMIC-FRAMEWORK
input training set
  initial tree $T(\cdot; \Theta)$ with $\begin{cases} \text{nodes } \mathcal{N} = \mathcal{D} \cup \mathcal{L} \\ \qquad \text{(decision nodes and leaves)} \\ \text{parameters } \Theta = \{\boldsymbol{\theta}_i\}_{i \in \mathcal{N}} \end{cases}$
repeat
  $\mathcal{N}_1, \ldots, \mathcal{N}_J \leftarrow$ a partition of $\mathcal{N}$ such that each $\mathcal{N}_j$
        is a set of non-descendant nodes
  for $j \in \{1, \ldots, J\}$
    parfor $i \in \mathcal{N}_j$
      if $i \in \mathcal{L}$ then
        $\boldsymbol{\theta}_i \leftarrow$ (approximate) minimizer of the reduced problem
            over a leaf
      else
        $\boldsymbol{\theta}_i \leftarrow$ (approximate) minimizer of the reduced problem
            over a decision node
until stop
postprocess T: prune dead & pure subtrees
return T

FIG. 5

APPLY-TREE-PREDICTOR($i, \mathbf{x}$)                            $\mathbf{y} \leftarrow T_i(\mathbf{x}; \Theta_i)$
if $i \in \mathcal{L}$ then
  return APPLY-PREDICTOR($\mathbf{g}_i, \mathbf{x}$)               $\mathbf{y} \leftarrow \mathbf{g}_i(\mathbf{x}; \theta_i)$
else
  $j \leftarrow$ APPLY-DECISION($f_i, \mathbf{x}$)              $j \leftarrow f_i(\mathbf{x}; \theta_i)$
  return APPLY-TREE-PREDICTOR($j, \mathbf{x}$)

APPLY-PREDICTOR($\mathbf{g}, \mathbf{x}$)                                 call existing algorithm APPLY-DECISION($f, \mathbf{x}$)                                     call existing algorithm

FIG. 7

TRAIN-PREDICTOR($f, \mathcal{R}$)              call existing algorithm

TRAIN-DECISION($f, \mathcal{R}$)
$\mathcal{R}' \leftarrow \varnothing$
for $n \in \mathcal{R}$              reduced set instances
  for $i \in \mathcal{C}$              children of node
    $l_i \leftarrow L_n(T_i(\mathbf{x}_n; \Theta_i))$              loss of $\mathbf{x}_n$ down child $i$
  if $\max_i(\mathbf{l}) - \min_i(\mathbf{l}) > \eta$              $\eta$-care instance
    $\mathcal{R}' \leftarrow \mathcal{R}' \cup \{n\}$              add it to care set
    $\bar{y}_n \leftarrow \arg\min_i(\mathbf{l})$              set its pseudolabel
if $\mathcal{R}' \neq \varnothing$ then              don't optimize empty nodes
  return TRAIN-CLASSIFIER($f, \mathcal{R}', \{\bar{y}_n\}_{n \in \mathcal{R}'}$)
else              empty care set
  return $\theta_i$              leave parameters unchanged TRAIN-CLASSIFIER($f, \mathcal{R}', \{\bar{y}_n\}_{n \in \mathcal{R}'}$)              call existing algorithm

FIG. 8

TAO-REVERSE-BFS input training set
    initial tree $T(\cdot; \Theta)$ with $\begin{cases} \text{nodes } \mathcal{N} = \mathcal{D} \cup \mathcal{L} \\ \quad\quad \text{(decision nodes and leaves)} \\ \text{parameters } \Theta = \{\theta_i\}_{i \in \mathcal{N}} \end{cases}$ $\mathcal{N}_0, \ldots, \mathcal{N}_\Delta \leftarrow$ nodes at depth $0, \ldots, \Delta$, respectively
$\mathcal{R}_1 \leftarrow \{1, \ldots, N\}$                                               root's reduced set
repeat
  $\{\mathcal{R}_i\}_{i \in \mathcal{N} \setminus \{1\}} \leftarrow$ ALL-REDUCED-SETS(T)    reduced sets for rest of nodes
  for $d = \Delta$ downto $0$                                   bottom to top (root)
    parfor $i \in \mathcal{N}_d$                                           nodes at depth $d$
      if $\mathcal{R}_i \neq \varnothing$ then                          don't optimize empty nodes
        if $i \in \mathcal{L}$ then
          $\theta_i \leftarrow$ TRAIN-PREDICTOR($\mathbf{g}_i, \mathcal{R}_i$)         leaf optimization
        else
          $\theta_i \leftarrow$ TRAIN-DECISION($f_i, \mathcal{R}_i$)    decision node optimization
until stop
postprocess T: prune dead & pure subtrees
return T

---

ALL-REDUCED-SETS(T)

for $d = 1$ to $\Delta$                                           top (root) to bottom
  for $i \in \mathcal{N}_{d-1}$                                   nodes at depth $d - 1$
    $\{\mathcal{R}_j\}_{j \in \mathcal{C}_i} \leftarrow$ CHILDREN-REDUCED-
              SETS(T, $i$)
return $\{\mathcal{R}_i\}_{i \in \mathcal{N} \setminus \{1\}}$

---

ALL-REDUCED-SETS(T)

for $i \in \mathcal{N} \setminus \{1\}$
  $\mathcal{R}_i \leftarrow \varnothing$
for $n \in \mathcal{R}_1$                                             process all instances
  $i \leftarrow 1$                                                   start at root
  while $i \notin \mathcal{L}$                                   propagate to leaf
    $i \leftarrow f_i(\mathbf{x}_n; \theta_i)$                         child for instance $n$
    $\mathcal{R}_i \leftarrow \mathcal{R}_i \cup \{n\}$                       add $n$ to child's set
return $\{\mathcal{R}_i\}_{i \in \mathcal{N} \setminus \{1\}}$

FIG. 10

TAO-BFS input training set initial tree $T(\cdot; \Theta)$ with $\begin{cases} \text{nodes } \mathcal{N} = \mathcal{D} \cup \mathcal{L} \\ \qquad \text{(decision nodes and leaves)} \\ \text{parameters } \Theta = \{\theta_i\}_{i \in \mathcal{N}} \end{cases}$ $\mathcal{N}_0, \ldots, \mathcal{N}_\Delta \leftarrow$ nodes at depth $0, \ldots, \Delta$, respectively $\mathcal{R}_1 \leftarrow \{1, \ldots, N\}$      root's reduced set repeat for $d = 0$ to $\Delta$      top (root) to bottom parfor $i \in \mathcal{N}_d$      nodes at depth $d$ if $\mathcal{R}_i \neq \varnothing$ then      don't optimize empty nodes if $i \in \mathcal{L}$ then

$\theta_i \leftarrow$ TRAIN-PREDICTOR$(\mathbf{g}_i, \mathcal{R}_i)$      leaf optimization else

$\theta_i \leftarrow$ TRAIN-DECISION$(f_i, \mathcal{R}_i)$      decision node optimization $\{\mathcal{R}_j\}_{j \in \mathcal{C}_i} \leftarrow$ CHILDREN-REDUCED-SETS$(T, i)$      reduced sets for $i$'s children until stop postprocess $T$: prune dead & pure subtrees return $T$

---

CHILDREN-REDUCED-SETS$(T, i)$ for $j \in \mathcal{C}_i$ $\mathcal{R}_j \leftarrow \varnothing$ for $n \in \mathcal{R}_i$      process $i$'s instances $j \leftarrow f_i(\mathbf{x}_n; \theta_i)$      child for instance $n$ $\mathcal{R}_j \leftarrow \mathcal{R}_j \cup \{n\}$      add $n$ to child's set return $\{\mathcal{R}_j\}_{j \in \mathcal{C}_i}$

FIG. 11

TAO-DFS input training set initial tree $T(\cdot; \Theta)$ with $\begin{cases} \text{nodes } \mathcal{N} = \mathcal{D} \cup \mathcal{L} \\ \qquad \text{(decision nodes and leaves)} \\ \text{parameters } \Theta = \{\boldsymbol{\theta}_i\}_{i \in \mathcal{N}} \end{cases}$ $\mathcal{R}_1 \leftarrow \{1, \ldots, N\}$               root's reduced set
repeat
  DFS-VISIT(T, 1)               root of the tree
until stop
postprocess T: prune dead & pure subtrees
return T

---

DFS-VISIT(T, $i$)

if $i \in \mathcal{L}$ then                 leaf, no children
  $\boldsymbol{\theta}_i \leftarrow$ TRAIN-PREDICTOR($\mathbf{g}_i, \mathcal{R}_i$)         leaf optimization
else                     decision node
  $\{\mathcal{R}_j\}_{j \in \mathcal{C}_i} \leftarrow$ CHILDREN-REDUCED-SETS(T, $i$)    reduced sets
                    for $i$'s children
  parfor $j \in \mathcal{C}_i$              children of $i$
   if $\mathcal{R}_j \neq \varnothing$ then       don't optimize empty subtrees
    DFS-VISIT(T, $j$)
  $\boldsymbol{\theta}_i \leftarrow$ TRAIN-DECISION($f_i, \mathcal{R}_i$)     decision node optimization

FIG. 12

GENERAL FORM OF THE TREE ALTERNATING OPTIMIZATION (TAO) FOR LEARNING DECISION TREES

CROSS-REFERENCE TO RELATED APPLICATIONS

This application is the national phase of International Application No. PCT/US2020/036696, filed Jun. 8, 2020, which designated the U.S. and that International Application was published under PCT Article 21(2) in English. This application claims priority under 35 U.S.C. § 119(e) to U.S. Provisional Application No. 62/858,923 filed Jun. 7, 2019, the contents of which are incorporated herein by reference in their entirety.

FIELD OF THE INVENTION

1 Introduction

The invention generally relates to the field of machine learning. More specifically, embodiments of the present invention relate to learning better decision trees by application of novel methods using a general form of a tree alternating optimization (TAO) algorithm.

DISCUSSION OF THE BACKGROUND

2 Related Work: Learning Decision Trees from Data 2.1 Hard Decision Trees

As substantially all textbooks on statistical learning or specialized review of tree induction will show, the established way to learn (hard) decision trees from data is based on greedy growing ("top-down induction") of the tree using a purity criterion to split nodes (typically Gini index or entropy), followed by an optional pruning. Various refinements may be combined with this, leading to slightly different algorithms such as CART, ID3 or C4.5; we will refer to these algorithms generically as "CART-type algorithms." OC1 is a minor variation of the coordinate descent algorithm of CART for oblique trees that uses multiple restarts and random perturbations after convergence to try to find a better local optimum, but its practical improvement is marginal. Other approaches have been proposed within the greedy growing framework to learn the oblique decision node parameters when splitting, such as using LDA. In the omnivariate decision tree, when splitting a node several candidate models are tried (univariate, multivariate, nonlinear) and the best one is picked via a statistical test. Finally, evolutionary algorithms have also been used instead of a greedy growing procedure in an effort to find better optima, but they are very slow and possibly no better than using random restarts in CART. None of these variations have replaced the simple CART-type algorithm in practice.

Another line of research has focused on optimizing the parameters of a tree given an initial tree (obtained with greedy growing and pruning) whose structure is kept fixed. The problem of optimizing a fixed tree may be cast as a linear programming problem, in which the global optimum could be found. However, the linear program is so large that the procedure is only practical for very small trees (4 internal nodes in experiments); also, it applies only to binary classification. Another work introduces a framework based on optimizing an upper bound over the tree loss using stochastic gradient descent (initialized from an already induced tree). This method is scalable to large datasets, however it is not guaranteed to decrease the real loss function of a decision tree and may even marginally worsen an already induced tree.

Other research formulates the optimization over tree structures (limited to a given depth) and node parameters as a mixed-integer optimization (MIO) by introducing auxiliary binary variables to encode the tree structure. Then, they use state-of-the-art MIO solvers (based on branch-and-bound) that are guaranteed to find the globally optimum tree (unlike the classical, greedy approach). But this has a worst-case exponential cost and is not practical unless the tree is very small (depth 2 to 4).

2.2 Soft Decision Trees

Soft trees define a probability distribution for an input instance over every path of a fixed tree structure. For example, in the hierarchical mixture of experts (HME), the model is a hierarchical mixture in which both the mixture coefficients and the mixture components are generalized linear models. The decision node function (called gating network) produces a probability distribution over its children for a given instance, which induces a distribution over the leaves for that particular instance. This makes the soft tree a differentiable function over its parameters and hence gradient-based optimization (such as SGD or an EM algorithm) can be used to learn the parameters by maximum likelihood.

So, while training soft trees is not especially difficult, unfortunately the unique advantages of hard decision trees disappear: an input instance must follow each root-leaf path accumulating probability and all the leaves' predictions must be combined weighted by their probability, so inference becomes slow and the tree is harder to interpret in general and in particular (to explain the prediction for a given instance). Training is also much slower because every instance has a probability and must be accounted for at every node. Indeed, as in trees elsewhere (e.g., kd-trees, binary heaps, binary search trees) the tree becomes uninteresting if we are forced to follow more than one path. It is possible to obtain a hard tree by training a soft tree and then hardening it during inference (i.e., the instance picks the child with largest probability at each decision node), but this is suboptimal; we should deal with the discrete nature of the decisions during training (We also note in passing that hard decision trees do not use probability at the decision nodes but can perfectly output probability distributions at the leaves.)

One important point to note is that, while hard decision trees do not use probability at the decision nodes, they can perfectly output probability distributions at the leaves. The difference between soft and hard trees is not in the ability to produce probability outputs—both are able to do so—but in whether the decision nodes make stochastic or deterministic decisions, respectively. Hence, for a given input instance, a soft tree computes output probabilities at each leaf while a hard tree computes them at only one leaf.

In comparing decision trees with HMEs, textbooks rightfully note that HMEs have some advantages over decision trees: 1) HMEs are less prone to bad local optima because they define a smooth function that can be more effectively optimized. 2) HMEs admit more modeling flexibility than decision trees, in particular being able to handle oblique or even nonlinear splits well. This is a consequence of the heuristic optimization in CART-type algorithms, which for oblique decision trees is known to work poorly. This means that in practice decision trees are usually axis-aligned, which imposes an artificial, restrictive shape on the leaf regions. TAO directly addresses these two problems.

2.3 Forests

There is a large literature on constructing ensembles of trees. The individual trees may be trained in different ways, such as random forests or boosting and other combinations, such as using both greedy growing and boosting. The trees themselves may be axis-aligned, oblique or other types. TAO makes it possible to construct accurate, compact forests.

2.4 Combinations of Trees and Neural Nets

Decision trees and neural nets have somewhat complementary advantages and researchers have long sought to combine both, from early attempts using some form of heuristic training to many recent attempts following the success of deep learning. Most approaches use some form of soft trees (single or ensemble, possibly combined with greedy growing), since then end-to-end training is applicable. However, as in HMEs, this loses the advantages of hard decision trees. TAO can combine hard decision trees with neural nets. Finally, other approaches try to avoid the discrete nature of the optimization so gradient-based optimization applies and other types of decision nodes (such as neural nets) can be used, by using a smooth surrogate of the purity criterion. However, this remains different from the loss that the tree should optimize.

Consequently, because all of these approaches are suboptimal, there is a need for methods to learn better classification trees than these conventional algorithms and methods, in order to improve classification accuracy, interpretability, model size, speed of learning the tree and of using it to classify an instance (target data), as well as other factors more fully described below. It should be understood that the approaches described in this section are for background purposes only. Therefore, no admission is made, nor should it be assumed, that any of the approaches described in this section qualify as prior art merely by virtue of their inclusion in this section.

SUMMARY OF THE INVENTION

The instant invention provides novel methods for learning and growing better decision trees using a general form of a tree optimizing algorithm to improve prediction accuracy, interpretability, tree size, speed of learning the tree, and speed and accuracy of growing a tree from scratch, among other improvements. In some embodiments of the invention, methods assume a tree structure given by an initial decision tree (grown by CART or another conventional method, and/or using random parameter values), and through use of a tree alternating optimization (TAO) algorithm, return a tree that is smaller or equal in size than the initial tree that reduces the prediction error of the tree. These methods utilizing the TAO algorithm directly optimize the quantity of interest (i.e., the prediction accuracy). The invention may provide other optimizations and benefits as well.

Generally, the method comprises inputting an initial decision tree and a training set of instances, processing the initial decision tree by partitioning nodes into sets of non-descendant nodes, processing the nodes in each set by updating the nodes' parameters at each iteration so that the objective function decreases monotonically, and pruning the tree, which produces a final tree of a size no larger than that of the initial tree. TAO applies to many different types of loss functions, regularization terms and constraints, and types of models at both the decision nodes and the leaves, and makes it possible to learn better decision trees than with traditional algorithms, and to learn trees for problems where traditional algorithms do not apply.

It is therefore an object of the invention to take an initial decision tree structure having initial models at the nodes and return a tree that is smaller or equal in size than that of the initial tree.

It is also an object of the invention to take an initial decision tree and return a tree that produces a lower prediction error than the initial tree.

It is further an object of the invention to provide methods for learning decision trees that increase the speed of learning the tree.

It is further an object of the invention to provide methods for learning decision trees that increase the speed of predicting an output for an input instance using the resulting tree.

It is further an object of the invention to provide methods for growing a decision tree from scratch.

It is further an object of the invention to better learn decision trees where the initial tree may be of any size and structure.

It is further an object of the invention to learn better decision trees where the parameters of the initial tree may be random or equal to the parameters of a tree obtained by a conventional algorithm or a previously processed tree.

It is further an object of the invention to learn better decision trees where the node's decision function model is any type of classifier.

It is further an object of the invention to learn better decision trees having any type of predictor model at the leaves.

It is a further object of the invention to learn better decision trees for predicting target values for any type of machine learning task.

It is a further object of the invention to learn better decision trees utilizing any type of loss function.

It is a further object of the invention to learn better decision trees utilizing any type of regularization.

It is further an object of the invention to learn better decision trees utilizing any type of training instances.

It is further an object of the invention to learn better decision trees where the decision trees are part of an ensemble of trees.

It is further an object of the invention to learn better decision trees where the input features to the tree are the output features of another machine learning model (e.g., a neural net).

It is further an object if the invention to learn better decision trees where the pruned tree may be used to replace a portion of a neural net.

It is to be understood that both the foregoing general description and the following detailed description are exemplary, but not restrictive, of the invention. A more complete understanding of the methods disclosed herein will be afforded to those skilled in the art.

BRIEF DESCRIPTION OF THE DRAWINGS

FIG. 1A shows a decision tree for classifications with three classes

FIG. 1B shows leaf regions for the decision tree of FIG. 1A having a decision function at the decision nodes that is axis-aligned.

FIG. 1C show leaf regions for the decision tree of FIG. 1A having a decision function at the decision nodes that is oblique.

FIG. 5 shows pseudocode for the algorithmic framework of TAO.

FIG. 7 shows pseudocode for determining the tree predictive function of the subtree rooted at node i on input instances x.

FIG. 8 shows pseudocode for the auxiliary functions for TAO.

FIG. 10 shows pseudocode for TAO with reverse breadth-first search (BFS) order.

FIG. 11 shows pseudocode for TAO with breadth-first search (BFS) order.

FIG. 12 shows pseudocode for TAO with depth-first search (DFS) order.

DETAILED DESCRIPTION OF THE PREFERRED EMBODIMENTS

Figure 2:
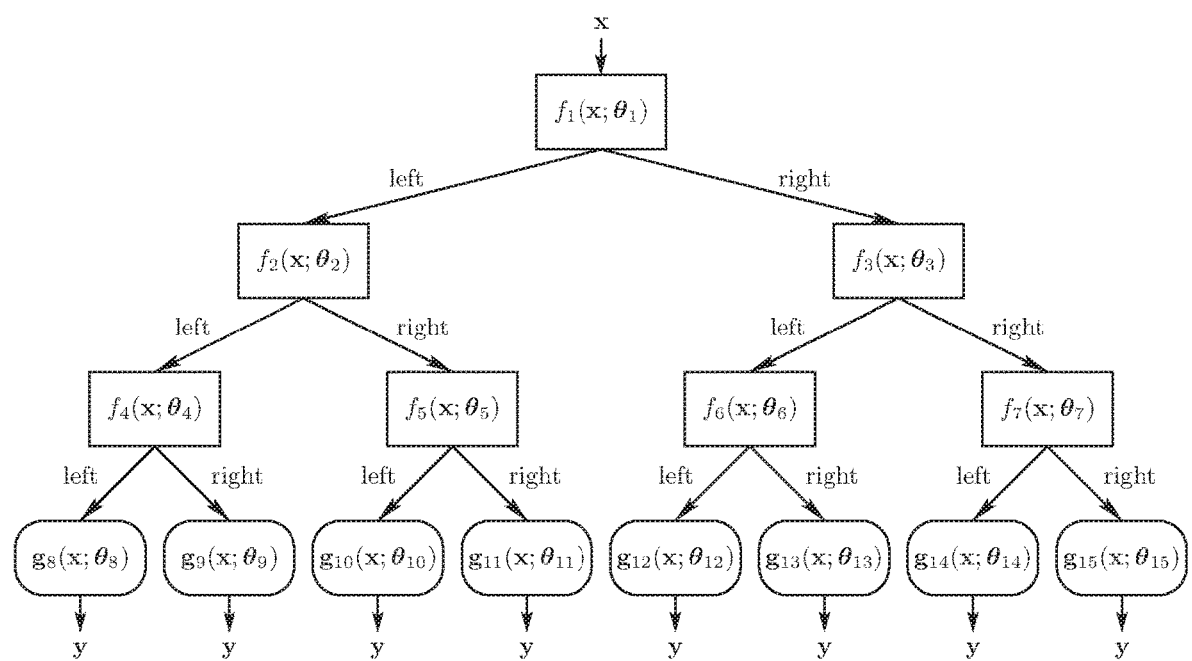
FIG. 2 shows a complete binary decision tree of depth 3 having a decision function at each decision node and a predictor model at each leaf.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. These conventions are intended to make this document more easily understood by those practicing or improving on the inventions, and it should be appreciated that the level of detail provided should not be interpreted as an indication as to whether such instances, methods, procedures or components are known in the art, novel, or obvious.

The following methods of learning and growing decision trees may be used for medical diagnosis, legal analysis, image recognition (whether moving, still, or in the non-visible spectrum, such as x-rays), loan risk analysis, other financial/risk analysis, etc. The methods may further be utilized, in whole or in part, to improve non-player characters in games; to improve control logic for remotely operated devices; to improve control logic for autonomous or semi-autonomous devices; to improve control logic for self-driving cars, self-piloting aircraft, and other autonomous or semi-autonomous transportation modalities; to improve search results; to improve routing of internet or other network traffic; to improve performance of implanted and non-implanted medical devices; to improve identification of music; to improve object identification in moving and still images; to improve computerized analysis of microexpressions; to improve computerized analysis of behavior, such as analysis of suspect behavior at an airport checkpoint; to improve the ability to obtain an accurate estimate of elements that are too computationally resource-intensive to solve with certainty; to compute hash codes or fingerprints of documents, images, audio or other data items; to understand, interpret, audit or manipulate models (such as neural networks); for automated analysis of patent applications, issued patents, and prior art; for running simulations; and for various other tasks that benefit from the invention.

3 How TAO Differs from Traditional Tree Induction Algorithms

To put TAO in context within machine learning training algorithms, it is instructive to compare how the training of decision trees differs from that of neural nets. Both of these models are similar in that they have a complex structure (hierarchical in trees, multilayered in neural nets) in addition to numerical parameters that have to be learned (node parameters in the tree, weights in the neural net). However, the approaches that have historically become established in practice to learn trees and neural nets are very different. To learn a decision tree from data (using traditional algorithms such as CART or C4.5), one learns at the same time both the structure of the tree and its parameters, by a greedy top-down approach. To learn a neural net from data, one fixes the neural net architecture (number of layers and units, etc.) and optimize its weights, usually by stochastic gradient descent. The search over architectures is done as an outer loop that tries multiple structures and selects one (by using a model selection approach, such as cross-validation). This is by far the most common approach to learn neural nets, although others have been proposed (such as adding or removing units during training) But, in fact, the problem of learning the structure of a tree is no different than that of learning the architecture of a neural net. The key difference is that optimizing the parameters of a tree of a given structure is harder, since gradient methods are not applicable.

TAO takes a parametric tree (with a given structure and initial parameter values) and optimizes a precisely defined objective function, made up of a loss and a regularization term, by iteratively decreasing its value. This is closest to the way parametric models, such as neural nets, are trained in machine learning (sparsity regularizers such as $\ell_1$ penalties have also been used with other models to make parameters zero and thus reduce their size, such as in the least absolute shrinkage and selection operator (Lasso) and related models for feature selection, or in neural nets for weight and neuron pruning), but it is very different from the way decision trees have been traditionally trained.

3.1 The Difficulty of Decision Tree Optimization

The vast majority of machine learning models are trained by gradient descent or some other gradient-based algorithm. The reason why tree learning has historically developed in a very different way from most other models is the difficulty of the tree optimization problem and the lack of gradients of its objective function. Consider a tree of fixed structure where, for simplicity, the decision functions are hyperplanes and each leaf contains a constant value. Call $T(x; \Theta)$ the tree predictive function, which maps an input instance x to an output, and has node parameters Θ. As a function of x, T is piecewise constant, since it maps x to a constant value in each leaf's region. When T is part of a loss function, such as the classification error, then the loss is also piecewise constant (over a huge number of regions) as a function of the decision node parameters. Indeed, while an infinitesimal change to a hyperplane does change the regions infinitesimally, it does not change the loss unless a training instance moves from one region to another, and in that case the change to the loss is discontinuous. Hence, the objective function for training the tree has no valid gradient with respect to the decision node parameters; either it is zero or it does not exist. The training problem is thus nondifferentiable and very nonconvex. Note that, if we fix the decision functions, then the training problem over the leaves is very simple (fit each leaf's predictor to its reduced set). The fundamental difficulty in tree learning is in the decision nodes and the discontinuous function they create.

TAO does not use gradient-based optimization (at least directly). It uses alternating optimization. This is also a well-known technique in optimization, but its application to trees is subtle, as described in sections 5-7. The reduced problems over the decision nodes and leaves can use gradient-based optimization, depending on the type of decision function or leaf predictor.

3.2 TAO Vs CART-Type Algorithms

Users accustomed to CART-type algorithms, where a tree is grown one node at a time using a purity criterion and frozen thereafter, may be puzzled by TAO, which takes a given structure with (random) initial node parameters and iteratively optimizes its parameters. As just explained, TAO is in fact closer in spirit to how the rest of machine learning models are trained. And not only does TAO learn much better trees (in accuracy and size), it also frees the user from many ad-hoc choices that CART-type algorithms require: what purity criterion to use (Gini index, information gain, misclassification error, F-ratio, various hypothesis tests . . . ), when to stop growing the tree, the minimum number of instances a leaf must have, etc.

The most extensively researched method of machine learning in data mining is top-down induction of decision trees. Panoply of variations for almost every conceivable aspect of the learning process have been investigated, including different criteria for attribute selection or modified pruning methods. Typically no substantial improvements in accuracy over a spectrum of diverse datasets are realized.

The above heuristics are deeply entrenched in the decision tree literature, but they strike one as surprising in the larger context of machine learning, where no such heuristics are needed, say, if training an SVM, logistic regression or even a neural net. The reason is that for the latter models we have efficient algorithms that will exactly or approximately minimize the desired objective function, including regularization terms. TAO makes it possible to optimize objective functions of that type for decision trees. The form of a TAO algorithm is determined by the type of tree, loss function and regularization terms. Given these, the subproblems to be solved at each node follow automatically by applying standard optimization principles and accepted approximations. (Like most algorithms, the basic TAO algorithm can benefit from some heuristics, but they are minor refinements; see section 8.13.)

Another important difference is that CART-type algorithms are often described as divide-and-conquer algorithms, because of their recursive partitioning nature, and as nonparametric, since the model size grows with the training set size. In contrast, TAO is neither divide-and-conquer nor nonparametric: it iteratively optimizes a fixed-structure tree with parametric models at the nodes. This also makes another difference obvious: while CART-type algorithms learn a tree from scratch, TAO generally requires an initial tree, although the initial tree may be a single node (i.e., a leaf; see section 8.11). This is critical if we want to improve over a given tree, for example, to warm-start an inner-loop optimization, or to capitalize on the existence of a good initialization to speed up the optimization.

What CART-Type Algorithms do and do not do Well

In CART-type algorithms, there are several sources of suboptimality:

The way a node is split is based on a purity criterion that is related to the real loss function only indirectly (if at all), and ignores any regularization. In other words, in CART-type algorithms there is no concept of an objective function like eq. 4. Hence, even if the purity criterion is optimized exactly, the resulting parameters are suboptimal over the whole tree. Indeed, many different purity criteria have been proposed, yet none of them stands out over the others; even significantly randomizing the purity criterion works about as well.

Optimizing the purity criterion is itself not a simple problem except for axis-aligned trees (which can be solved exactly by enumeration over features and biases). This partly explains why oblique trees have never outperformed axis-aligned trees significantly, even though the latter are clearly a much more restrictive model.

The tree growth is greedy, in that once a node is split its parameters are fixed. This means that, starting from the root, suboptimal decisions are made that pile upon each other, forcing nodes downstream to live with that. This leads to trees that are significantly suboptimal and much larger than necessary.

As we split nodes, they receive fewer and fewer instances, which makes it harder to learn a split that generalizes well. This is particularly acute with oblique splits in high dimensions.

In spite of all these problems, the greedy, recursive growth procedure—which has remained the established way to learn trees for decades—does produce trees with a decent accuracy in many cases. Why is that? We see two main reasons. Firstly, if the tree is grown large enough it will reach zero training error, however the loss is defined, because each leaf will contain a single instance. That is, it builds a perfect model of the training data (in fact, such a tree is simply a data structure that allows one to retrieve quickly the prediction of any training instance). Hence, while this will overfit (i.e., not generalize well to unseen data), it still learns a reasonable model of the data.

Second, the "cost-complexity" post-pruning of this tree does optimize a desirable objective of the form "loss plus tree complexity" (where the loss is evaluated on a validation set). This is computationally possible because post-pruning can be solved exactly by enumeration over all subtrees that can be pruned (whose number equals the number of nodes in the tree). Unfortunately, this also means that the search space that this optimization works on is a tiny subset of the parameter space, so the post-pruned tree cannot be very different from an unpruned one (note that post-pruning can only remove subtrees but not change the node parameters).

In view of this, it is then not surprising that TAO learns much better trees than CART-type algorithms: it is simply doing a proper optimization of the desired objective function and over a much larger parameter space.

3.3 a Decision Tree as a Discrete Data Structure for Fast Search

One useful way to regard a decision tree is as a fast data structure for local prediction. A decision tree defines a partition of the input instance space into disjoint regions, one per class, where a "local" predictor applies. For inference, the role of the decision nodes is to route the instance, a high-dimensional vector, to its corresponding predictor, which then outputs the prediction. Thus, the tree can be seen as a finite collection of local predictors (the leaves) augmented with a fast data structure (the decision nodes) that maps an instance to a predictor.

Indeed, if we regard the training set as a table $\{(x_n, y_n)\}_{n=1}^N$ of (input instance, label) pairs, then a decision tree containing one leaf per instance is a fast data structure to map any $x_n$ to its $y_n$. The search time is at most equal to the tree depth, which is at most $\lceil \log_2 N \rceil$ for a balanced tree; this is much faster than a $\mathcal{O}(N)$ linear search on the table. Such a tree can be easily constructed by recursive partitioning, but it will overfit, and we seek instead a smaller tree that generalizes well to instances beyond those in the training set. CART-type algorithms do this by first building a tree with (essentially) one instance per leaf and then post-pruning it. TAO fixes the tree structure and solves the tree optimization of equation 4.

4 Learning Decision Trees from Data: Definition of the Problem

4.1 Decision Trees: Definitions and Notation

We consider the machine learning problem of learning a predictive model (the decision tree) from training data such that it maps input patterns to output labels. Let $\mathcal{X}$ be an input space of patterns x; typically $\mathcal{X} \subseteq \mathbb{R}^\mathcal{D}$, i.e., x is a $\mathcal{D}$-dimensional real vector of $\mathcal{D}$ features. Let $\mathcal{Y}$ be an output space of labels. What these are depends on the problem. Typically, $\mathcal{Y} \subset \mathbb{R}$ (for density estimation or scalar regression), $\mathcal{Y} \subset \mathbb{R}^\mathcal{D}$ (for multivariate regression), $\mathcal{Y} = \{1, \ldots, K\}$ (for K-class classification) or $\mathcal{Y}$ is the regular simplex in K variables (for K-class classification but outputting class posterior probabilities).

A decision tree with parameters $\Theta = \{\theta_i : i \in N\}$ (for the decision nodes and leaves) defines a tree predictive function $T(x; \Theta): \mathcal{X} \to \mathcal{Y}$. The graph of the decision tree is a directed rooted tree, which defines the tree structure or topology as shown in FIG. 2. The tree graph will often be binary (i.e., each decision node has two children) and complete (i.e., the leaves can only appear in the deepest level of the tree, hence a complete binary tree of depth $\Delta$ has $2^\Delta - 1$ decision nodes and $2^\Delta$ leaves), but not necessarily. We will assume that each decision node has at least two children. We take this structure to be fixed and determined ahead of time. The nodes of the tree are indexed based on a finite set of indices $N = \mathcal{D} \cup \mathcal{L}$ (with $\mathcal{D} \cap \mathcal{L} = \emptyset$), where $\mathcal{D}$ and $\mathcal{L}$ are the index sets for the decision nodes and leaves. We will assume that i=1 is the root, but we will not assume any specific ordering or indexing for the rest of the nodes. A node $i \in N$ with parameters in the set $\theta_i$ (suitably defined for the machine learning task at hand), is of either of the following two types:

Decision nodes: These are the internal (non-terminal) nodes. We define $C_i \subset N$ the set of children of node i, as the set of node indices corresponding to i's children. Strictly, $C_i \subset N$ is defined as a set of node indices. For example, $C_2 = \{4, 5\}$ in FIG. 2. With binary trees (where each decision node has two children, which is the most typical type of trees in practice) we will sometimes abuse the notation for $C_i$ and write $C_i = \{\text{left, right}\}$ to mean the left and right children of i. The role of a decision node is to route an input x to one of the node's children. A decision node $i \in \mathcal{D}$ uses a decision function $f_i(x; \theta_i): \mathcal{X} \to C_i$, with parameters $\theta_i$, to map an input x to one of its children.

Leaves: These are the terminal nodes. Their role is to map an input x to an output label in $\mathcal{Y}$. A leaf $i \in \mathcal{L}$ uses a predictor model $g_i(x; \theta_i): \mathcal{X} \to \mathcal{Y}$, with parameters $\theta_i$, to map an input x to an output.

The tree computes the output for an input x by following a path from the root to exactly one leaf and outputting the latter's prediction for x. Crucially, note that the decision functions are crisp (not stochastic): exactly one child is chosen for a given input x (unlike for soft decision trees, which define a distribution over the children).

Each decision function is essentially a classifier, where each class corresponds to each child of the node (but note that exactly one class is chosen). Each leaf predictor can be a classifier (for classification trees), regressor (for regression trees), and so on depending on the machine learning task being solved. What type of model to use for the decision function and leaf predictor is up to the user. In principle, we can choose any machine learning model for them. The only restriction is that we must be able to learn such classifier or predictor on its own, since TAO will learn the tree by repeatedly learning each node's model on its own. Hence, we may choose models such as logistic regression, naive Bayes, neural net with softmax or real outputs, linear or kernel SVMs, Gaussian processes, etc.

In traditional decision trees, the model choices are very limited. The leaf predictor is typically a single class value (for classification) or a single scalar or vector value (for regression). The decision function is typically univariate (or axis-aligned), testing whether a specific input feature exceeds a threshold, e.g. "go right if $x_{\kappa_i} + b_i \geq 0$" (so the parameters are $\theta_i = \{\kappa_i, b_i\}$, i.e., the feature to test and the threshold value). Multivariate (or oblique) decision functions of the form "go right if $w_i^T x + b_i \geq 0$" (with parameters $\theta_i = \{w_i, b_i\}$) have also been used, but their performance has generally not been good enough for widespread practical use.

The routing function of the tree, $\lambda(x; \Theta): \mathcal{X} \to \mathcal{L}$, maps an input x to exactly one leaf of the tree, according to the decision functions. Strictly speaking, the parameters of $\lambda$ are $\{\theta_i\}_{i \in \mathcal{D}} \subset \Theta$, i.e., the decision functions' parameters (since the parameters at the leaves are not necessary), but for simplicity we will write $\lambda(x; \Theta)$. We can then write the tree predictive function as $$T(x; \Theta) = g_i(x; \theta_i) \text{ where } i = \lambda(x; \Theta) \qquad \text{Equation 1}$$

$$T(x; \Theta) = \sum_{i \in L} \delta(i, \lambda(x; \Theta)) g_i(x; \theta_i) \qquad \text{Equation 2}$$

where $\delta(\cdot, \cdot)$ is the Kronecker delta. This notation makes it clear that, in order to compute the prediction for an input x, we first route x to a leaf $i = \lambda(x; \Theta)$ via the decision nodes, and then the leaf makes the actual prediction $g_i(x; \theta_i)$. The routing function partitions the input space $\mathcal{X}$ into regions, one per leaf, where a specific predictor operates. FIGS. 1A-1C show an example of a decision tree and the partition of the space it defines.

Specifically, FIGS. 1A-1C illustrate a decision tree for classification with K=3 classes (colored white, light gray and dark gray). The tree structure is shown in FIG. 1A, with each node marked with an index i for reference. The leaf nodes use a constant classifier, whose label is given by the node color. The decision nodes use a decision function $f_i(x)$ that is either axis-aligned (FIG. 1B) or oblique (FIG. 1C). A decision node i sends an input instance x to its right child if $f_i(x) \geq 0$ and to its left child otherwise. FIGS. 1B-1C show how the space of the input instance x, assumed two-dimensional, is partitioned by the decision nodes. Each region corresponds to a leaf (indicated by its node index i and colored with its class label). The boundaries between regions are marked with their corresponding decision functions $f_i$. For the axis-aligned tree (bottom left), each decision function uses a single feature, so the regions are rectangles with sides parallel to the coordinate axes. For example, for node 7 we have $f_7(x)=x_1+b_7$, specifically, it thresholds $x_1$ and hence creates a vertical split. Likewise, for node 4 we have $f_4(x)=x_2+b_4$, namely it thresholds $x_2$ and hence creates a horizontal split. For the oblique tree (FIG. 1C), each decision function uses a linear combination of features $f_i(x) = w_i^T x + b_i$, so the regions are polygons. Although both trees have the same structure shown at the top, the specific choice of decision functions (hence regions) for each tree is arbitrary and intended for visualization purposes.

Referring now to FIG. 2, therein is shown a complete binary decision tree $T(\cdot; \Theta)$ of depth $\Delta=3$, with sets of decision nodes $\mathcal{D}=\{1, \ldots, 7\}$ and leaves $\mathcal{L}=\{8, \ldots, 15\}$ (so $N=\mathcal{D} \cup \mathcal{L}$), and set of parameters $\Theta=\{\theta 1, \ldots, \theta 15\}$. We show the model at each node: decision function $f_i(x; \theta_i)$ at each decision node $i \in D$, predictor model $g_i(x; \theta_i)$ at each leaf $i \in \mathcal{L}$. A given input x follows a path from the root to a single leaf which produces the output $y=T(x; \Theta)=g_i(x; \theta_i)$ where $i=\lambda(x; \theta) \in \mathcal{L}$.

The tree structure defines exactly one path $\pi_i$ from the root (node 1) to each node $i \in N$. We write the path "$1 \rightsquigarrow i$" as an ordered set $\pi_i=\{1, \ldots, i\}$. For example in FIG. 2, the path to node 6 is $\pi_6=\{1, 3, 6\}$. Hence, the root-leaf path for an input x is $\pi_{\lambda(x; \Theta)}$.

We say that two nodes i, j∈N are non-descendants of each other if no paths exist $i \rightsquigarrow j$ or $j \rightsquigarrow i$. We say that a set of nodes $S \subset N$ in the tree is a set of non-descendant nodes if $\forall i, j \in S$ neither i is a descendant of j nor j is a descendant of i. Examples of sets of non-descendant nodes in FIG. 1A-1C are: all the leaves (nodes 8 to 15); all the nodes at depth 2 (nodes 4 to 7); nodes {3, 4, 10, 11}; etc.

Any subtree of a decision tree is a decision tree itself and hence can be used to map an input x to an output y. We will write the predictive function and the routing function of the subtree rooted at node $i \in N$ as $T_i(x; \Theta_i)$ and $\lambda_i(x; \Theta_i)$, respectively, where $\Theta_i \subset \Theta$ contains the parameters for the nodes in the subtree. Hence, we write $\Theta$, $\Theta_i$ and $\theta_i$ to indicate the set of parameters in the whole tree T, in the subtree $T_i$ of node i, and in the node i (so $\Theta_1=\Theta$, where i=1 is the root)). It follows that $T_i(x; \Theta_i)=g_j(x; \theta_j)$ where $j=\lambda_i(x; \Theta_i)$ (and, if $i \in \mathcal{L}$, $j=\lambda_i(x; \Theta_i)=i$).

Finally, the reduced set $\mathcal{R}_i \subseteq \{1, \ldots, N\}$ of a node $i \in N$ (leaf or decision node) in the tree $T(\cdot; \Theta)$ is the set of training points that reach node i, i.e., $$\mathcal{R}_i = \{n \in \{1, \ldots, N\} : i \in \pi_{\lambda(x_n; \Theta)}\}. \qquad \text{Equation 3:}$$

For a leaf $i \in \mathcal{L}$, this simplifies as $\mathcal{R}_i=\{n \in \{1, \ldots, N\}: i=\lambda(x_n; \Theta)\}$. Note that, although we write "$\lambda(x_n; \Theta)$" in eq. 3, the reduced set only depends on $\{\theta_j\}_{j \in \pi_i}$, i.e., the parameters of nodes along the path from the root to i.

4.2 Optimization Problem: Learning a Decision Tree from Data

We consider the problem of learning a decision tree from data by solving an optimization problem of the following, quite general, form. We want to minimize over $\Theta$ the following objective function:

$$E(\Theta) = \sum_{n=1}^{N} L_n(T(x_n; \Theta)) + \alpha \sum_{i \in N} \phi_i(\theta_i) \qquad \text{Equation 4}$$

This problem formulation is standard with many machine learning models (such as neural networks or SVMs), but traditional decision trees have focused on a restricted subset of such problems and loss functions, namely classification and regression only. TAO substantially generalizes the kind of trees, loss functions and regularization terms that can be learned. We explain each term on the right hand side of eq. 4 in turn.

4.2.1 The First Term on the Right-Hand Side: $\Sigma_{n=1}^{N} L_n(T(x_n; \Theta))$ This is the data-dependent term, which depends on a training set, a loss function and the tree predictive function. Our notation for $L_n$ includes two types of problems:

Unsupervised tree learning: The training set has the form $\{x_n\}_{n=1}^{N} \subset \mathcal{X}$ of input vectors (instances) x (but no outputs). The loss function $L_n(z)$ can be, for example, the negative log-likelihood $L_n(z)=-\log z$, for density estimation (where $z \geq 0$).

Supervised tree learning: The training set has the form $\{(x_n, y_n)\}_{n=1}^{N} \subset \mathcal{X} \times \mathcal{Y}$ of (input, output) vectors (instances). The loss function is understood to have the form $L_n(T(x_n; \Theta))=L'_n(y_n, T(x_n; \Theta))$ in terms of another loss function $L'_n(y, z)$ which measures the disagreement between two vectors y (ground-truth label) and z (tree prediction). For K-class classification (where y, $z \in \{1, \ldots, K\}$), $L'_n$ may be, for example:

The classification error (0/1 loss): $L'_n(y, z)=0$ if y=z and 1 otherwise. This can be generalized to have costs dependent on the type of error. For example, we may have $L'_n(1, 2) \neq L'_n(2, 1)$, and more generally for K-class problems we can define the loss via a K×K matrix where entry $L'_n(i,j) \geq 0$ is the cost of classifying a class i instance as class j.

The cross-entropy: $L'_n(y, z)=-\Sigma_{k=1}^{K} y_k \log z_k$, where the ground-truth label $y=(y_1, \ldots, y_K)^T$ is encoded as 1-of-K and the tree output $z=(z_1, \ldots, z_K)^T$ is a partition of unity representing the posterior probability of each class.

The hinge loss: $L'_n(y, z)=\max(0, 1-y\ z)$, for binary classification assuming a ground-truth label $y \in \{-1, +1\}$ and a tree output $z \in \mathbb{R}$.

And more sophisticated losses, such as those designed for rankings. The loss function may be understood to incorporate constraints, as for the hinge loss with SVMs.

For regression, $L'_n$ may be, for example:

The squared error: $L'_n(y, z)=\|y-z\|_2^2$.

The absolute deviation: $L'_n(y, z)=\|y-z\|_1$ (and generalizations such as quantile regression).

A robust error: $L'_n(y, z)=\rho(y-z)$ where $\rho(t)=0$ if t=0 and otherwise $\rho(t)$ increases with t until it saturates.

Note the following:

Although $L'_n$ typically takes the same form for every point n (e.g. squared error $\|y_n-z_n\|^2$), sometimes it may be useful to make it depend on the point, e.g. by using a different weight for each point (e.g. weighted squared error $w_n \|y_n - z_n\|^2$ where $w_n \in \mathbb{R}^+$).

Consider a problem where the output to be predicted is a K-dimensional vector and the loss function separates additively over its K dimensions. A typical example is least-squares regression. Then, the overall loss can be written as a loss over a K-dimensional vector; or as the sum of K losses each over a scalar; or anything in between, by partitioning the K-dimensional output vector in subsets. Correspondingly, the resulting model would be a single tree whose leaves' predictors output the K-dimensional vector directly; or the concatenation of the scalar outputs of K trees; and so on. Which one of these options will be best, in terms of accuracy and size of the tree(s), depends on the case. Our notation in eq. 4 is intended to be general and concise, abstracting away details about the particular machine learning task or loss inside the function $L_n$, and focusing on the optimization over the tree. With a supervised problem, the training set and loss function should be understood to include a label $y_n$ as needed.

4.2.2 The Second Term on the Right-Hand Side: $\alpha \Sigma_{i \in N} \phi_i(\theta_i)$ This is the regularization term, which depends only on the parameters $\Theta$ of the tree predictive function (although sometimes it will be convenient to have it depend on the training set as well). The regularization functions $\phi_i$ are typically defined via a suitable $\ell_p$ norm, such as $\ell_0$, $\ell_1$ or $\ell_2$, or combinations thereof (as used in the Lasso, group Lasso and its variations). The hyperparameter $\alpha \geq 0$ controls the tradeoff between the loss and the regularization. The regularization for each node can be defined by a penalty, as explicitly notated in eq. 4, or as a constraint, in which case $\phi_i$ is the indicator function over the constraint's feasible set (i.e., $\phi_i(\theta_i)$ is zero if $\theta_i$ satisfies the constraint and infinity otherwise). For example, for the decision nodes we can constrain $\|\theta_i\|_p \leq \alpha$ (for a suitable $\ell_p$ norm), or $\theta_i \geq 0$ (nonnegative parameters). As with the regularization functions, we assume each constraint applies to a single node.

4.3 Assumptions of the Optimization Problem

In order to understand how the TAO algorithm works, it is important to note that our formulation makes the following assumptions:

A1: instance additivity: The loss term separates additively over the N training points: $\Sigma_{n=1}^N L_n(T(x_n; \Theta))$.

A2: node additivity: The regularization term separates additively over the nodes of the tree: $\Sigma_{i \in N} \phi_i(\theta_i)$.

A3: private parameters: The parameters are not shared across nodes: i, $j \in N$, $i \neq j \Rightarrow \theta_i \cap \theta_j = \emptyset$.

It is possible to apply the TAO algorithm more generally, even if none of these three assumptions hold, but for now we will assume that they do hold. At this point we make no further assumptions about the loss or regularization functions $L_n$ and $\phi_i$ (such as differentiability or convexity). TAO can work with nonconvex, nonsmooth or even nondifferentiable functions. All it needs is for the node optimization problem defined later to be solvable, at least approximately.

5 Basic Mathematical Results Underlying TAO

TAO is based on two results concerning how the objective function $E(\Theta)$ of eq. 4 simplifies when we fix some of the parameters in $\Theta$: 1) the separability of $E(\Theta)$ when considered as a function of the parameters of a set of non-descendant nodes; and 2) the form of $E(\Theta)$ when considered as a function of the parameters of a single node (decision node or leaf). These two results make it possible to apply alternating optimization to $E(\Theta)$ over sets of non-descendant nodes. In turn, these two results hold because the tree structure induces a simple structure over the reduced sets of all nodes. We state and prove these results in this section: about the structure of the nodes' reduced sets in the tree (section 5.1), about the separability of the problems over non-descendant nodes (section 5.2), and about the reduced problem over a node (section 5.3). We state these results in full generality over the type of tree structure (which need be neither binary nor complete), and the type of loss, regularization term and node model. All we assume are the assumptions in section 4.3.

5.1 Structure of the Nodes' Reduced Sets in the Tree

Each node (decision node or leaf) in the tree contains its own reduced set. The tree structure and the fact that each node partitions (throughout, we use the term "partition" in its mathematical sense. Let $\mathcal{R}_0, \mathcal{R}_1, \ldots, \mathcal{R}_K$ be sets. We say $\mathcal{R}_1, \ldots, \mathcal{R}_K$ is a partition of set $\mathcal{R}_0$ if $\mathcal{R}_0 = \mathcal{R}_1 \cup \ldots \cup \mathcal{R}_K$ and $\mathcal{R}_i \cap \mathcal{R}_j = \emptyset \, \forall i, j \in \{1, \ldots, K\}$. That is, the sets $\mathcal{R}_1, \ldots, \mathcal{R}_K$ are pairwise disjoint and their union is $\mathcal{R}_0$) its reduced set among its children induces the following properties on these reduced sets. Consider a decision tree whose graph is a directed rooted tree, not necessarily binary or complete, where each decision node has at least two children. Let $\mathcal{R}_i \subset \{1, \ldots, N\}$ be the reduced set of node $i \in N$ (decision node or leaf).

Theorem 5.1. If i, $j \in N$ are not descendants of each other, then their reduced sets are disjoint.

Theorem 5.2. The reduced sets of the nodes along a path from the root to a leaf define a nested sequence of sets: root→i→j→ . . . →k→leaf ⇒ $\{1, \ldots, N\} = \mathcal{R}_{root} \supset \mathcal{R}_i \supset \mathcal{R}_j \supset \ldots \supset \mathcal{R}_k \supset \mathcal{R}_{leaf}$.

Theorem 5.3. Let $\mathcal{R}^d = \cup_{i \in N_d} \mathcal{R}_i$ be the union of the reduced sets of all nodes at depth d. Then $\{1, \ldots, N\} = \mathcal{R}^0 \supset \mathcal{R}^1 \supset \ldots \supset \mathcal{R}^\Delta$. If the tree is complete, then $\{1, \ldots, N\} = \mathcal{R}^0 = \mathcal{R}^1 = \ldots = \mathcal{R}^\Delta$.

Theorem 5.4. Let $N_d \subset N$ be the set of all nodes at depth d in the tree, where $d \geq 0$, and assume $N_d \neq \emptyset$. Then $\forall i, j \in N_d$, $i \neq j \Rightarrow \mathcal{R}_i \cap \mathcal{R}_j = \emptyset$. Also, if $d > 0$ and none of the nodes at depth $d-1$ are leaves ($N_{d-1} \cap \mathcal{L} = \emptyset$) and $\cup_{i \in N_{d-1}} \mathcal{R}_i = \{1, \ldots, N\}$, then $\cup_{i \in N_d} \mathcal{R}_i = \{1, \ldots, N\}$, hence $\{\mathcal{R}_i : i \in N_d\}$ define a partition of $\{1, \ldots, N\}$.

Corollary 5.5. Consider a decision tree that is binary and complete of depth $\Delta$. Then the reduced sets of all the nodes at depth $0 \leq d \leq \Delta$ form a partition of $\{1, \ldots, N\}$.

5.2 Separability of Non-Descendant Nodes' Problems

Consider two nodes i, $j \in N$, $i \neq j$. We say j is a descendant of i if there is a path i⤳j in the tree graph. We say i, j are non-descendants of each other if no paths exist i⤳j or j⤳i. We say that a set of nodes $S \subset N$ in the tree (which may include any combination of decision nodes and/or leaves) is a set of non-descendant nodes if $\forall i, j \in S$ neither i is a descendant of j nor j is a descendant of i.

Theorem 5.6 (Separability). Let $T(x; \Theta)$ be the predictive function of a rooted directed decision tree and $S \subset N$ a nonempty set of non-descendant nodes in the tree. Then, as a function of the parameters $\{\theta_i : i \in S\}$ (i.e., fixing all other parameters $\Theta_{rest} = \Theta \setminus \{\theta_i : i \in S\}$), the function $E(\Theta)$ of eq. 4 can be equivalently written as $$E(\Theta) = \sum_{i \in S} E_i(\Theta_i, \Theta_{rest}) + E_{rest}(\Theta_{rest}) \qquad \text{Equation 5}$$

where $\{E_i: i \in S\}$ and $E_{rest}$ are certain functions.

The important statement that theorem 5.6 makes is about the dependence structure of $E(\Theta)$, which becomes an additively separable function of the non-descendant nodes' parameters given the parameters of all other nodes. The specific form of the resulting function for each node is derived in section 5.3.

5.2.1 Separability in Non-Tree Graphs

The separability condition can be extended in a straightforward way to certain graphs beyond directed trees. For example, imagine we draw an arrow from node 3 to node 5 in the tree of FIG. 2, so that node 5 has three children (left, middle and right). The graph is not a directed tree anymore, but it is a directed acyclic graph (DAG). It is clear that the separability condition applies, and the reduced set of node 5 consists of instances going right in node 2 and left in node 3. The reduced problem is defined on that reduced set.

More generally, the separability condition applies to DAGs satisfying the following:
- The DAG has two types of nodes: decision nodes and leaves.
- One of the decision nodes is the root, and all other nodes are reachable from it.
- Arrows can only go from a decision node to either another decision node or a leaf (And, of course, there are no cycles, since the graph is a DAG.)
- Each decision node sends its input instance to exactly one of its children.

This means that a node (decision node or leaf) can have multiple parents; such nodes (and the subtrees they define) are "shared" among the parents. The DAG is equivalent to a regular decision tree where each shared node having C parents is replicated into C identical subtrees (one per parent), i.e., each of these C subtrees has the same parameter values. The DAG has the advantage over such a decision tree of being more compact. However, its structure should be determined ahead of time.

5.3 Reduced Problem Over a Node
5.3.1 Reduced Problem Over a Decision Node Theorem 5.7 (Reduced problem over a decision node). Consider the objective function $E(\Theta)$ of eq. 4 and a decision node $i \in \mathcal{D}$. Assume the parameter values $\Theta \setminus \{\theta_i\}$ of all the nodes except i are fixed. Then, as a function of $\theta_i$, we can write eq. 4 equivalently as:

$$E(\Theta) = E_i(\theta_i) + E_{rest}(\Theta \setminus \{\theta_i\}) \text{ with } E_i(\theta_i) = \sum_{n \in \mathcal{R}_i} l_{in}(f_i(x_n; \theta_i)) + \alpha \phi_i(\theta_i) \quad \text{Equation 6}$$

where $\mathcal{R}_i$ is the reduced set of node i, and we define the function $l_{in}: C_i \to \mathbb{R}$ as $l_{in}(z) = L_n(T_z(x_n; \Theta_z))$ for any $z \in C_i$ (child of i), where $T_z(\cdot; \Theta_z)$ is the predictive function for the subtree rooted at node z.

The function $l_{in}(z) = L_n(T_z(x_n; \Theta_z))$ maps a child $z \in C_i$ of node i to the value of the loss $L_n$ incurred by instance $x_n$ in the leaf that it reaches when propagated down z's subtree. We can make this more obvious by abusing notation as in footnote 1 and writing the children of node i as left, right $\in$ N. Then we can write $l_{in}$: {left right} $\to \mathbb{R}$ as follows:

$$l_{in}(z) = \begin{cases} l_{in,left} = L_n(T_{left}(x_n, \Theta_{left})), & \text{if } z = \text{left} \\ l_{in,right} = L_n(T_{right}(x_n, \Theta_{right})), & \text{if } z = \text{right} \end{cases}$$

where $T_{left}(\cdot; \Theta_{left})$ and $T_{right}(\cdot; \Theta_{right})$ are the predictive functions for the left and right subtrees of node i, respectively.

5.3.2 Reduced Problem Over a Decision Node as a Weighted 0/1 Loss Problem

We now show that the reduced problem defined above can be equivalently reformulated as a supervised problem, namely a weighted 0/1 loss classification problem, with suitably defined pseudolabels $\{\bar{y}_{in}\}$. We call them pseudolabels to emphasize the artificial nature of these labels: they define a subproblem during each TAO iteration that is a classification problem with one class per child of node i, and which depends on the reduced set $\mathcal{R}_i$ at the iteration. These pseudolabels should not be confused with the ground-truth labels in the original problem over the tree in eq. 4 if this happens to be a supervised classification problem: the latter defines a training set $\{(x_n, y_n)\}_{n=1}^N \subset \mathcal{X} \times \mathcal{Y}$ over the whole tree, while the reduced problem defines a training set $$\{(x_n, \bar{y}_{in})_{n \in \mathcal{R}_i}\} \subset \mathcal{X} \times C_i$$

over the node i. The reduced problem is in general a multiclass classification problem, with $|C_i|$ classes (where $C_i$ are the children of node i). For binary trees, which is the typical case, the problem is a binary classification.

Theorem 5.8 (Reduced problem over a decision node as a weighted 0/1 loss problem). Consider the objective function $E(\Theta)$ of eq. 4 and a decision node $i \in \mathcal{D}$. Assume the parameter values $\Theta \setminus \{\theta_i\}$ of all the nodes except i are fixed. Then, the optimization problem $\min_{\theta_i} E(\Theta)$ is equivalent to the following optimization problem:

$$\min_{\theta_i} \bar{E}_i(\theta_i) = \sum_{n \in \mathcal{R}_i} \bar{L}_{in}(\bar{y}_{in}, f_i(x_n; \theta_i)) + \alpha \phi_i(\theta_i) \quad \text{Equation 7}$$

where $\mathcal{R}_i$ is the reduced set of node i, the function $l_{in}: C_i \to \mathbb{R}$ is defined as in theorem 5.7, and the weighted 0/1 loss $\bar{L}_{in}(\bar{y}_{in}, \cdot): C_i \to \mathbb{R}^+ \cup \{0\}$ for instance $n \in \mathcal{R}_i$ is defined as $\bar{L}_{in}(\bar{y}_{in}, y) = l_{in}(y) - l_{in}(\bar{y}_{in})$ $\forall y \in C_i$, where $\bar{y}_{in} = \arg\min_{y \in C_i} l_{in}(y)$ is the "best" child of i for n (or any $\bar{y}_{in} \in \arg\min_{y \in C_i} l_{in}(y)$ in case of ties).

The meaning of this theorem is that the reduced problem over decision node i is an artificial, supervised classification problem, defined over the instances in the reduced set and their pseudolabels. There are $|C_i|$ classes, once per child of node i. The pseudolabel $\bar{y}_{in}$ for instance $x_n$ satisfies $\bar{y}_{in} = \text{argmin}_{y \in C_i} l_{in}(y)$, i.e., it is the (or a) child that results in the lowest loss downstream; it acts as "ground-truth" label for that instance. The loss function $\bar{L}_{in}(\bar{y}_{in}, \cdot)$ is defined as $\bar{L}_{in}(\bar{y}_{in}, y) = l_{in}(y) - l_{in}(\bar{y}_{in}) \forall y \in C_i$, or more explicitly:

$$\bar{L}_{in}(\bar{y}_{in}, y) = \begin{cases} 0, & \text{if } y = \bar{y}_{in} \\ l_{in}(y) - l_{in}(\bar{y}_{in}) \geq 0, & \text{otherwise} \end{cases}.$$

For example, consider binary trees (the most typical case of trees), where $C_i = \{\text{left, right}\}$, so the problem is a binary classification. Say that $l_{in}(\text{left}) > l_{in}(\text{right})$. Then $\bar{y}_{in} = \text{right}$, $\bar{L}_{in}$(right, right)=0 and $\bar{L}_{in}$(right, left)>0. Note that, although $\bar{L}_{in}(\cdot, \cdot)$ has two arguments, the first one is fixed: $\bar{L}_{in}(\bar{y}_{in},\cdot)$.

Thus, the loss for instance n is lowest (zero) if we predict the pseudolabel correctly; otherwise it is a positive value, and this value depends on the instance. This makes it clear that the loss is a weighted 0/1 loss (zero if correct, a positive value or "weight" otherwise). If the objective function eq. 4 of the tree is the 0/1 loss for classification (binary or multiclass), then the reduced problem is a regular (unweighted) 0/1 loss problem itself. In any other case (e.g. for classification with losses other than the 0/1 loss, regression, density estimation, etc.) it is always a weighted 0/1 loss problem. With more than two children, each child has a different loss as well.

The pseudolabel $\bar{y}_{in}$ is the ideal prediction for instance n, and predicting them for each instance in the reduced set would give a loss of zero, which is the minimum achievable (perfect classification). The function class of $f_i(\cdot; \theta_i)$ (say hyperplanes) will in general not be able to achieve this, but there will still be an optimal $\theta_i$ achieving the minimal loss (including the regularization term, see eq. 7), and this is the optimal solution of the reduced problem. In section 7.4 we rewrite the reduced problem as a constrained optimization problem (eq. 14), which makes this more obvious.

5.3.3 Reduced Problem Over a Decision Node with Don't Care Instances

The reduced problem holds on a subset of the reduced set where we remove "don't care" instances, which are those instances whose prediction by the tree does not depend on which child of node i we send them to. Define the reduced set without don't care instances as equation 8:

$$\mathcal{R}'_i = \{n \in \mathcal{R}_i : l_{in}(y) \text{ is not a constant function of } y \in C_i\} = \mathcal{R}_i \setminus \{n \in \mathcal{R}_i : \bar{L}_{in}(\bar{y}_{in}, y) = 0 \forall y \in C_i\}, \quad \text{Equation 8}$$

i.e., $\mathcal{R}'_i$ discards those points of $\mathcal{R}_i$ ("don't care" points) for which the function $l_{in}(\cdot)$ is constant or the function $\bar{L}_{in}(\bar{y}_{in}, \cdot)$ is identically zero. Note that if a node i is binary then a tie between its two children for an instance n means the instance is don't-care, since $l_{in}$(left)=$l_{in}$(right) and $\bar{L}_{in}$(left, left)=$\bar{L}_{in}$(left, right)=0. If a node has more than two children, then an instance can have tied children without being don't-care.

Theorem 5.9 (Reduced problem over a decision node with don't care instances). In theorems 5.7 and 5.8, the statements hold if replacing the reduced set $\mathcal{R}_i$ with the reduced set without don't care instances $\mathcal{R}'_i$ of eq. 8.

5.3.4 Reduced Problem Over a Leaf

Finally, we have a similar reduced-problem result but for a leaf instead of a decision node.

Theorem 5.10 (Reduced problem over a leaf). Consider the objective function $E(\Theta)$ of eq. 4 and a leaf node $i \in \mathcal{L}$. Assume the parameter values $\Theta \setminus \{\theta_i\}$ of all the nodes except i are fixed. Then, as a function of $\theta_i$, we can write eq. 4 equivalently as:

$$E(\Theta) = E_i(\theta_i) + E_{rest}(\Theta \setminus \{\theta_i\}) \text{ with} \quad \text{Equation 9}$$

$$E_i(\theta_i) = \sum_{n \in \mathcal{R}_i} L_n(g_i(x_n; \theta_i)) + \alpha \phi_i(\theta_i)$$

where $\mathcal{R}_i$ is the reduced set of node i.

5.3.5 Putting it all Together

For ease of later reference, we collect the statements about the reduced problems for a decision node or leaf in the following corollary.

Corollary 5.11 (Reduced problem). Consider the objective function $E(\Theta)$ of eq. 4 and a node $i \in \mathcal{N}$. Assume the parameter values $\Theta \setminus \{\theta_i\}$ of all the nodes except i are fixed. Then, the optimization problem $\min_{\theta_i} E(\Theta)$ is equivalent to the following optimization problem:

If i is a decision node having a decision function $f_i$: $\mathcal{X} \to C_i$ (where C is the set of children of i):

$$\min_{\theta_i} E_i(\theta_i) = \sum_{n \in \mathcal{R}'_i} l_{in}(f_i(x_n; \theta_i)) + \alpha \phi_i(\theta_i) \quad \text{Equation 10}$$

or, as a weighted 0/1 loss classification problem:

$$\min_{\theta_i} \bar{E}_i(\theta_i) = \sum_{n \in \mathcal{R}'_i} \bar{L}_{in}(\bar{y}_{in}, f_i(x_n; \theta_i)) + \alpha \phi_i(\theta_i) \quad \text{Equation 11}$$

where:

$\mathcal{R}_i$ is the reduced set of node i;

$\mathcal{R}'_i$ is the reduced set of node i without don't-care instances;

the function $l_{in}$: $C_i \to \mathbb{R}$ is defined as $l_{in}(z) = L_n(T_z(x_n; \Theta_z))$, where $T_z(\cdot; \Theta_z)$ is the predictive function for the subtree rooted at node $z \in C_i$, and it maps a child z of i to the value of the loss $L_n$ incurred by instance $x_n$ in the leaf that it reaches when propagated down z's subtree;

the weighted 0/1 loss $\bar{L}_{in}(\bar{y}_{in}, \cdot)$: $C_i \to \mathbb{R}^+ \cup \{0\}$ for instance $n \in \mathcal{R}'_i$ is defined as $\bar{L}_{in}(\bar{y}_{in}, y) = l_{in}(y) - l_{in}(\bar{y}_{in}) \forall y \in C_i$, where $$\bar{y}_{in} = \arg\min_{y \in C_i} l_{in}(y)$$

is the "best" child of i for n (or any $\bar{y}_{in} \in \arg\min_{y \in C_i} l_{in}(y)$ in case of ties).

If i is a leaf having a predictive function $g_i$: $\mathcal{X} \to \mathcal{Y}$:

$$\min_{\theta_i} E_i(\theta_i) = \sum_{n \in \mathcal{R}_i} L_n(g_i(x_n; \theta_i)) + \alpha \phi_i(\theta_i) \quad \text{Equation 12}$$

where $\mathcal{R}_i$ is the reduced set of node i.

The previous results apply quite generally to trees of any structure (not necessarily binary or complete) and regardless of how the loss and regularization functions $L_n$ and $\phi_i$ are defined. The validity of the results follows purely from the structure of the tree (which induces disjoint reduced sets) and the structure of the objective function (separability over instances and nodes).

Note that the reduced problems for a decision node (eq. 10) and for a leaf (eq. 12) have the same form: a regularization term $\phi_i$ on the node's parameters $\theta_i$, and a real-valued loss function ($l_{in}$ or $L_n$) that applies on the node's output (child $f_i(x_n, \theta_i)$ or prediction $g_i(x_n, \theta_i)$) and depends only on the node's parameters $\theta_i$. We recognize this as a standard machine learning problem of learning a parametric function ($f_i$ or $g_i$) with a regularization term on a training set $\mathcal{R}_i$—just as the original problem over the tree (eq. 4), but now over a node on a reduced set. So the reduced problem can be solved by standard machine learning algorithms, as we will show in sections 6-7. However, there is a critical difference between the loss $l_{in}$ in a decision node and the loss $L_n$ in a leaf: the former gives rise to a harder problem (essentially a weighted 0/1 loss classification problem), while the latter gives rise to a problem of the same type as the original problem (classification, regression, etc.).

6 The Node Optimization Subproblem for a Leaf

We show now how to solve the optimization subproblem over a leaf and over a decision node, defined in corollary 5.11 (reduced problem). We start with the case of a leaf node. Which is simpler than that of a decision node.

Figure 4:
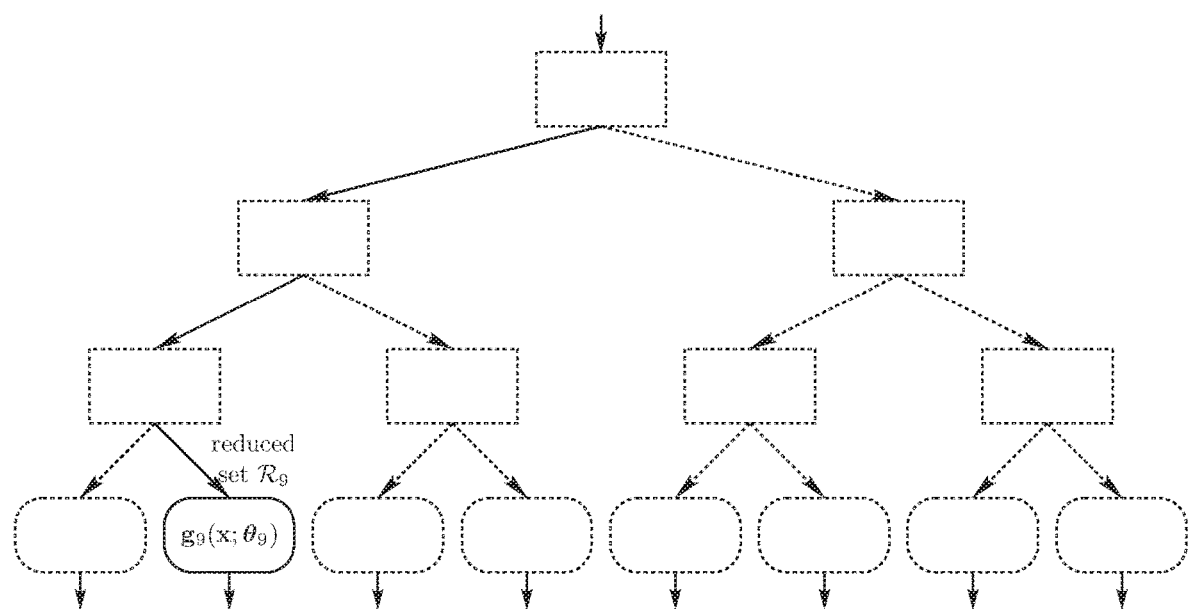
FIG. 4 is a schematic representation of the optimization using TAO over node 9 in the tree of FIG. 2.

From corollary 5.11, we have the following optimization problem over the parameters $\theta_i$ of leaf $i \in \mathcal{L}$, assuming the parameters at all other nodes are fixed:

$$\min_{\theta_i} E_i(\theta_i) = \sum_{n \in \mathcal{R}_i} L_n(g_i(x_n; \theta_i)) + \alpha \phi_i(\theta_i) \qquad \text{Equation 12'}$$

where $\mathcal{R}_i = \{n \in \{1, \ldots, N\} : i \in \pi_{\lambda(x_n; \Theta)}\} = \{n \in \{1, \ldots, N\} : i = \lambda(x_n; \Theta)\}$ is the reduced set of leaf i (see FIG. 4, which shows a schematic representation of the optimization over node 9 (a leaf, with parameters $\theta_9$) in the tree of FIG. 2. Only the training instances that reach node 9 under the current tree (the reduced set $\mathcal{R}_9$ of node 9) participate in the optimization). As noted in section 5.3, minimizing eq. 12' over $\theta_i$ takes the form of a standard machine learning problem of learning the predictor $g_i$ (with parameters $\theta_i$ on a training set given by $\mathcal{R}_i$ to minimize the losses $L_n$ with regularization $\alpha \phi_i(\theta_i)$, which can be solved using an appropriate algorithm, depending on the case. Some representative examples that show the generality of the problem are as follows:

- Constant prediction: here, $g_i(x; \theta_i) = \theta_i$ always predicts a constant value $\theta_i \in \mathcal{Y}$ regardless of x, and there is no regularization. If the loss is the classification error, then the optimal $\theta_i$ is the majority class label in $\mathcal{R}_i$. If the loss is the least-squares error, then the optimal $\theta_i$ is the average of the output labels in $\mathcal{R}_i$. This is the typical leaf model with traditional decision trees trained with algorithms such as CART and C4.5.
- Constant distribution: here, $g_i(x; \theta_i) = \theta_i$ always predicts a constant probability distribution $\theta_i$ (in the regular simplex in K variables for K-class classification) regardless of x, and there is no regularization. $\theta_i$ is the empirical distribution of class labels (i.e., a histogram of the K classes) in $\mathcal{R}_i$.
- If the loss is the hinge loss and $g_i(x; \theta_i)$ is a linear or kernel SVM, we may have (say) an $\ell$1- or $\ell$2-regularized SVM, which may be learnt with a variety of algorithms, such as those implemented by LIBLINEAR or LIBSVM.
- If the loss is the cross-entropy and $g_i(x; \theta_i)$ is a neural net with a K-class softmax output layer, we may use (stochastic) gradient descent.
- If the loss is the negative likelihood (for density estimation) and $g_i(x; \theta_i)$ is a Gaussian mixture, we may use the Expectation-Maximization (EM) algorithm to fit the Gaussian mixture to the points in $\mathcal{R}_i$.
- If the loss is the negative likelihood (for regression) and $g_i(x; \theta_i)$ is a Gaussian process, we may use a suitable optimization algorithm to fit the Gaussian process parameters to the points in $\mathcal{R}_i$.

Etc.

Note that approximately solving equation 12', i.e., reducing the value of $E_i(\theta_i)$ but not exactly minimizing it, will also reduce the value of the objective eq. 4 over the tree and therefore make progress. Whether to minimize exactly or approximately $E_i(\theta_i)$ will depend on the computational difficulty of minimizing $E_i(\theta_i)$. For example, if the predictor is a constant parameter (independent of the input x), then we should compute this exactly as the label of the majority class (if $L_n$ is a classification loss), or the average of the labels (if $L_n$ is the least-squares error for regression). With large-scale problems, where the number of training points is large, one should likely obtain an approximate solution using a stochastic optimization algorithm such as SGD.

7 The Node Optimization Subproblem for a Decision Node

Figure 3:
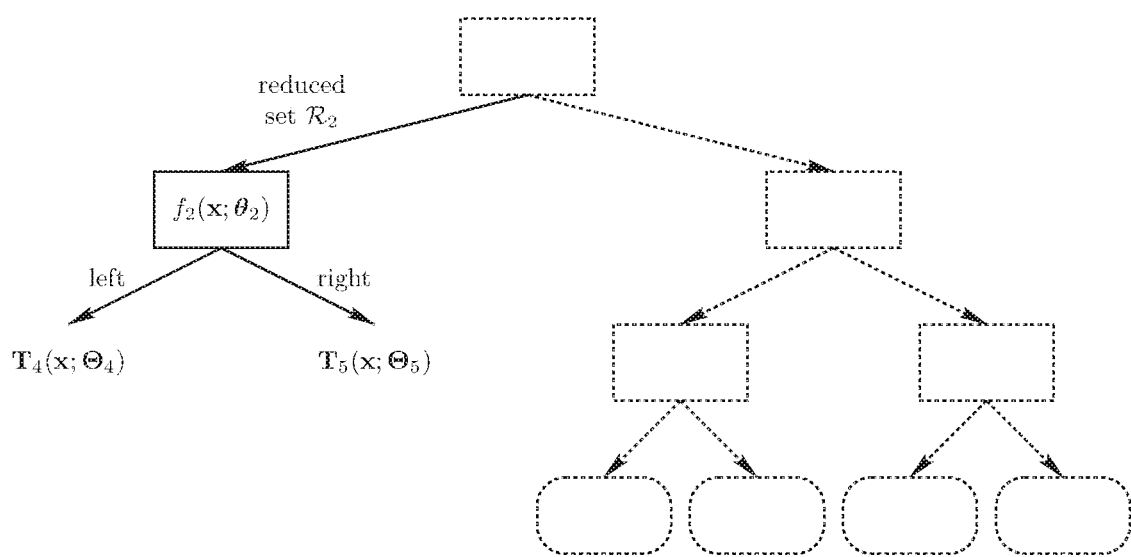
FIG. 3 is a schematic representation of the optimization using TAO over node 2 in the tree of FIG. 2.

Now we show how to solve the optimization subproblem over a decision node. From corollary 5.11 (reduced problem), we have the following optimization problem over the parameters $\theta_i$ of decision node $i \in \mathcal{D}$, assuming the parameters at all other nodes are fixed:

$$\min_{\theta_i} E_i(\theta_i) = \sum_{n \in \mathcal{R}'_i} l_{in}(f_i(x_n; \theta_i)) + \alpha \phi_i(\theta_i) \qquad \text{Equation 10'}$$

or, as a weighted 0/1 loss classification problem:

$$\min_{\theta_i} \bar{E}_i(\theta_i) = \sum_{n \in \mathcal{R}'_i} \bar{L}_{in}(\bar{y}_{in}, f_i(x_n; \theta_i)) + \alpha \phi_i(\theta_i) \qquad \text{Equation 11'}$$

where $\mathcal{R}_i = \{n \in \{1, \ldots, N\} : i \in \pi_{\lambda(x_n; \Theta)}\}$ is the reduced set of node i (see FIG. 3, which is a schematic representation of the optimization over node 2 (a decision node, with parameters $\theta_2$) in the tree of FIG. 2. The left and right subtrees of node 2 behave like two fixed predictor functions $T_4(x; \Theta_4)$ and $T_5(x; \Theta_5)$ which produce an output for an input x when going left or right in node 2, respectively. Only the training instances that reach node 2 under the current tree (the reduced set R2 of node 2) participate in the optimization), $\mathcal{R}'_i \subseteq \mathcal{R}_i$ is the reduced set without don't-care instances, and the loss functions $l_{in}: C_i \to \mathbb{R}$ and $\bar{L}_{in}(\bar{y}_{in}, \cdot): C_i \to \mathbb{R}^+ \cup \{0\}$ were defined in corollary 5.11. Classification problems using the 0/1 loss are in general NP-hard (see section 11.1.2), which makes the optimization over a decision node a harder problem than over a leaf. However, 1) in some special but practically important cases the problem is not NP-hard and can be solved exactly and efficiently; and 2) in the general, NP-hard case, the problem admits an approximate solution that is easy to compute by fitting a classifier with a surrogate loss. We describe this next.

7.1 Exact Solution Via Enumeration, for Axis-Aligned Trees

In some cases problem 10' can be solved exactly and efficiently. One such case, practically important, is with axis-aligned binary trees, where $f_i(x, \theta_i)$=right if $x_{K_i} + b_i \geq 0$ and left otherwise, and the parameters $\theta_i = \{K_i, b_i\}$ are the index $K_i$ of an input feature (an element of x) and a threshold $b_i \in \mathbb{R}$. Minimizing $E_i(\theta_i)$ can be done by enumeration over all possible feature indices and all possible threshold values for each feature (usually given as the $|\mathcal{R}'_i|-1$ midpoints between consecutive values of $x_{K_i}$, assumed in increasing order. This is exactly the way in which one finds the best feature and threshold in traditional tree learning algorithms such as CART or C4.5, when determining how best to split a node into two children. However, in such algorithms one optimizes a measure of purity of the split (such as the Gini index or entropy), which is not equivalent to minimizing the original objective function over the tree. Also, since those algorithms are greedy, the node parameters are not updated ever again. This can be efficiently computed by processing thresholds in order and using incremental updates of the relevant values.

7.2 Exact Solution with "Small" Reduced Sets

With oblique trees, where the decision function is a hyperplane, eq. 10' can be solved exactly and efficiently if $N \leq D+1$, where N is the number of instances in the reduced set and D their dimension (see section 11.1.4). In that case, the problem is necessarily linearly separable and a separating hyperplane can be found in polynomial time. We do not consider this case specially since it will occur automatically if using a surrogate loss in the general case, as described next.

With instances that are not linearly separable, we may still expect an exact solution to be efficiently computable if the decision function $f_i(\cdot; \theta_i)$ is nonlinear and there is a value of $\theta_i$ that separates the instances.

7.3 Approximate Solution Via a Surrogate Loss, Directly

Eq. 11' is a classification problem using the 0/1 loss $L_{in}$. While the unweighted 0/1 loss has received considerable attention in the machine learning literature (both from a theoretical and computational point of view), the weighted 0/1 loss has been rarely investigated, if at all. Consider then the unweighted 0/1 loss first. A standard approach to find a good approximate solution to a 0/1 loss problem is to solve instead a classification problem using a surrogate loss (typically convex), such as the logistic loss, squared loss, hinge loss, squared hinge loss, exponential loss, etc., which can be solved efficiently in polynomial time. For example, using the logistic loss (for a binary oblique tree) we solve a standard $\ell_1$-penalized logistic regression problem:

$$\min_{\theta_i} \sum_{n \in R'_i} \log\left(1 + e^{-z_{in}(w_i^T x_n + b_i)}\right) + \alpha \|\theta_i\|_1$$

where we define the label $z_{in}$ to be +1 (−1) if the right (left) child is the correct child, and the binary classifier is such that $w_i^T x_n + b_i \geq 0$ (<0) corresponds to the right (left) child. If instead we use the hinge loss, we solve a maximum-margin problem. The logistic and hinge loss are conveniently available in LIBLINEAR, LIBSVM and other machine learning libraries. This approximation is widely used in practice when facing a 0/1 loss classification problem, and it generally gives good solutions, though not always. It was also the approach used by Carreira-Perpiñán, U.S. application Ser. No. 16/419,917, filed May 22, 2019, incorporated herein by reference ("Carreira-Perpiñán"), which is a special case of the more general approach described in section 7.4.

In order to see how to handle the weighted 0/1 loss, we will rewrite equation 11' using weights explicitly. We consider binary trees, so the problem is a binary classification (the argument carries over to nodes having more than two children, but the notation is more involved). Then, equation 11' is equivalent to $$\min_{\theta_i} \bar{E}_i(\theta_i) = \sum_{n \in R'_i} \omega_{in} L_0(\bar{y}_{in}, f_i(x_n; \theta_i)) + \alpha \phi_i(\theta_i) \quad \text{Equation 13}$$

where $L_0$ is the regular 0/1 loss (i.e., $L_0(y, z)=0$ if y=z and 1 otherwise) and the weight $\omega_{in}$ is the loss incurred if not predicting the correct pseudolabel for $x_n$, i.e., $\omega_{in}=l_{in}(y)-l_{in}(\bar{y}_{in}) \geq 0$ where $y \neq \bar{y}_{in}$. The simplest approach (weighted surrogate loss) to approximate eq. 13 by a surrogate loss is to use the weights directly as multipliers in the surrogate loss. For the logistic loss we get:

$$\min_{\theta_i} \sum_{n \in R'_i} \omega_{in} \log\left(1 + e^{-z_{in}(w_i^T x_n + b_i)}\right) + \alpha \|\theta_i\|_1.$$

LIBLINEAR accepts weights both for the logistic and hinge loss.

We mention two approaches that approximate equation 13 by a regular (unweighted) 0/1 loss, so that then the surrogate does not need weights either:

Binarization: we simply replace the weight $\omega_{in}$ (if positive) of every instance with 1. This considers as equally important a mistake no matter what instance it happens in, so it is a crude approximation, since the weights for different instances may be very different. A variation is to discard instances if $\omega_{in} \leq \epsilon$ for a fixed value $\epsilon \geq 0$; this allows us to ignore instances for which going left or right makes a small difference.

Instance replication: we create a new dataset by replicating instances proportionally to their $\omega_{in}$ values (a variation of this (sometimes used in boosting algorithms) is to sample instances proportionally to their $\omega_{in}$ values. However, this introduces significant randomness and is less efficient). That is, if we have N instances in the reduced set, we create a replicate dataset of M instances such that the number of times instance n appears is (approximately) proportional to its $\omega_{in}$ value. We then use the unweighted 0/1 loss in the replicate dataset. This has the advantage that as $M \to \infty$, the unweighted problem on the replicate dataset becomes equivalent to the weighted problem on the original dataset. However, one has to keep M not much bigger than N to limit the training time.

Nodes with Multiway Splits

A node with C children defines a C-way split, and its decision function is effectively a C-class classifier. For example, with oblique trees we can use $f_i(x)=\arg\max (W_i x + b_i) \in \{1, \ldots, C\}$. The node optimization problem is a C-class 0/1 classification problem and we can approximate it via a surrogate (e.g. a linear softmax with the cross-entropy loss).

7.4 Approximate Solution Via the Method of Auxiliary Coordinates

A better solution can be found as follows. In equation 10', we can regard $E_i$ as a nested function, which for a given instance n first applies the function $f_i$ to compute $f_i(x_n, \theta_i)$, and then applies the function $l_{in}$ to compute $l_{in}(f_i(x_n, \theta_i))$. A generic technique to optimize such nested functions is the method of auxiliary coordinates (MAC). It is particularly convenient when the individual functions are not differentiable, as is the case here (since $f_i$ outputs a discrete value), so that the chain rule does not apply and we cannot use gradient-based optimization over $\theta_i$. In MAC, we follow the following pattern in order to design the algorithm: 1) we first introduce auxiliary "coordinates" judiciously for each training instance, accompanied by constraints that break the nesting of $E_i$; 2) we reformulate the resulting constrained optimization problem using a penalty method (such as the quadratic penalty or augmented Lagrangian method); and 3)

we solve this using alternating optimization over the original parameters and the auxiliary coordinates. In our case, these three steps unfold as follows.

First, we define an auxiliary coordinate $z_n = f_i(x_n, \theta_i)$ for each training instance $n \in \mathcal{R}'_i$. It represents the child that instance n is sent to; its value is unknown and will be found by optimization. Then we have the constrained optimization equation:

$$\min_{\theta_i, z} \sum_{n \in \mathcal{R}'_i} l_{in}(z_n) + \alpha \phi_i(\theta_i) \qquad \text{Equation 14}$$

$$\text{s.t. } z_n = f_i(x_n; \theta_i) \in C_i, n \in \mathcal{R}'_i.$$

This is equivalent to the original equation 10' but it now lives in an augmented space $\{\theta_i, z\}$ where $z=(z_n) n \in \mathcal{R}'_i$ must be optimized over. Note that $l_{in}(z_n)$ is minimal when $z_n$ is the ideal pseudolabel (best child) for $x_n$, i.e., $z_n = \bar{y}_{in}$.

Second, we apply a penalty method to construct a sequence of unconstrained, penalized problems indexed by a penalty parameter $\mu \geq 0$. Here we give a simple version to keep the notation simple (in practice we would use the more effective augmented Lagrangian version).

$$\min_{\theta_i, z} Q(\theta_i, z; \mu) = \sum_{n \in \mathcal{R}'_i} l_{in}(z_n) + \alpha \phi_i(\theta_i) + \mu \sum_{n \in \mathcal{R}'_i} P(z_n, f_i(x_n; \theta_i)), \qquad \text{Equation 15}$$

$$\{z_n\}_{n \in \mathcal{R}'_i} \subset C_i$$

where the penalty function P: $C_i \times C_i \to \mathbb{R} \cup \{0\}$ satisfies P (z, z)=0 and P (z, z')>0 if z≠z'. (Typically in optimization over continuous variables one uses the quadratic penalty P (z, z')=(z−z')², but others are possible.) We have to optimize Q as $\mu \to \infty$, which eventually leads to all constraints being satisfied: $z_n = f_i(x_n, \theta_i) \forall n \in \mathcal{R}'_i$. (In fact, this will happen for a finite value of $\mu$, because $C_i$ is finite.)

Third, we apply alternating optimization to Q over $\theta_i$ and z, to capitalize on the decoupling that the auxiliary coordinates have introduced. This results in the following two steps:

Over z: the optimization separates for each n, as follows:

$$\min_{z_n \in C_i} l_{in}(z_n) + \mu P(z_n, f_i(x_n; \theta_i)) \quad n \in \mathcal{R}'_i \qquad \text{Equation 16}$$

which can be solved exactly by enumeration over $z_n$, since $C_i$ is finite and usually very small (e.g. $|C_i|=2$ for binary nodes). This is true regardless of how the loss $l_{in}$ and hence the loss $L_n$ of the original problem is defined; all we need is to be able to evaluate it (we do not need $L_n$ to be differentiable or convex, for example).

Over $\theta_i$: the optimization problem takes the form $$\min_{\theta_i} \sum_{n \in \mathcal{R}'_i} P(z_n, f_i(x_n; \theta_i)) + \frac{\alpha}{\mu} \phi_i(\theta_i). \qquad \text{Equation 17}$$

This is a multiclass classification problem with $|C_i|$ classes over the decision function (classifier) $f_i$, with regularization term $\phi_i$, using a training set of labeled instances $\{(x_n, z_n)\} n \in \mathcal{R}'_i$, where $z_n$ is the label of $x_n$. Note that the form of this problem does not depend on the loss $L_n$ of the original problem over the tree; it does not even depend on the type of problem that the original problem was (classification, regression, density estimation, etc.). It is always a supervised classification problem. The penalty function P effectively behaves like the loss in this classification problem. We can take P to be a convex surrogate loss so the step over $\theta_i$ is easy. And, unlike in the previous section, we have no weights.

Thus, the actual optimization algorithm proceeds by alternating a step where we set the pseudolabels z given the classifier $f_i$ and a step where we fit the classifier $f_i$ to a training set $\{(x_n, z_n)\}_{n \in \mathcal{R}'_i}$ using the current pseudolabels. We do this while progressively increasing $\mu$, as is common in homotopy methods, effectively following the solution path $(\theta_i(\mu), z(\mu))$ containing the minimizers of Q as a function of $\mu$, starting from $\mu=0$. The desired solution corresponds to a large enough value of $\mu$.

Relation with the simple method of the previous section: The simple method is a special case of MAC, corresponding to the beginning of the solution path, for $\mu \to 0^+$. Indeed, minimizing eq. 15 over (z, $\theta_i$) in the limit $\mu \to 0^+$ produces $z_n = \arg\min_{z \in C_i} l_{in}(z) = \bar{y}_{in}$ (since the $\mu$-term is negligible), and (assuming $\alpha$=0) $\theta_i$ results from minimizing the classification loss $L_{in}$ using $\bar{y}_{in}$ as labels. In other words, we fit a classifier $f_i$ to the pseudolabels $\bar{y}_{in}$, as the simple method does. The case "$\mu \to 0^+$" is called direct fit in the context of MAC algorithms, and generally corresponds to an algorithm that first sets the auxiliary coordinates and, given these, sets the remaining parameters (rather than iterating these two steps, as MAC does).

The pseudolabels $\bar{y}_{in}$ are the ideal solution of eq. 14 if we ignore the fact that z is constrained to equal the output of the classifier $f_i$. Hence, these "ideal pseudolabels" give a lower bound on the objective function value that can be achieved. With an ideal, perfectly flexible classifier, the constraints would be satisfied and the classification would be perfect. But this will not generally be possible with an actual classifier of limited flexibility (e.g. a linear classifier). The advantage of the MAC solution over the simple, direct fit solution is that z and $f_i$ can coadjust over MAC iterations, exploring other label assignments for z, and eventually find a value of $\theta_i$ that makes $E_i(\theta_i)$ smaller in eq. 10'. A very similar situation arises in learning binary autoencoders, for which MAC can provide good approximate solutions. The simple method of the previous section forces each $z_n$ to equal the pseudolabel $\bar{y}_{in}$ and then forces $f_i$ to fit those values, but this can be a difficult classification problem for $f_i$ and result in a suboptimal solution. Generally, we expect better solutions using MAC, at the cost of a slightly more complex node optimization.

8 The General TAO Algorithm

Intuitively, what TAO does is repeatedly train a simple classifier at each decision node and a simple predictor at each leaf while monotonically decreasing the objective function E(Θ). In doing so, the reduced set on which each classifier or predictor is trained changes over iterations, which are repeated until convergence. However, the TAO algorithm can take different forms depending on how the sets of non-descendant nodes are constructed and in what order they are optimized, and how the node optimization subproblems are solved. Also, various heuristics may be used. We will rely on the existence of standard optimization and machine learning techniques to solve some of the subproblems that arise in a TAO iteration. TAO applies to any type of loss and regularization functions, and to any type of model at each node (both in the decision nodes and leaves), as long as the corresponding subproblems can be solved; and to trees where a decision node may have more than two children and be complete or not.

The tree alternating optimization (TAO) algorithm was first presented in Carreira-Perpiñán in a special form (for classification trees using the 0/1 loss and an $\ell_1$ penalty, having linear decision functions and constant leaf classifiers, and processing nodes in reverse BFS order). Here we describe it more generally. We will refer to it as "General TAO algorithm" or just as "TAO algorithm" if there is no confusion.

TAO assumes an initial tree is given, that is, a tree structure and values for the node parameters $\Theta$. This initial tree can be obtained in any way, in particular by another tree learning algorithm such as CART or C4.5. In practice we usually take an initial tree that is complete of depth $\Delta$ (such as that of FIG. 2) with random parameters, where $\Delta$ is set by the user to be large enough.

We now describe the algorithm and give pseudocode for it. First, in section 8.1, we give an algorithmic framework, which leaves unspecified issues such as the construction of the non-descendant node sets, but which shows the essence of any TAO algorithm. Then we describe the algorithm and important data structures in more detail, as follows. We discuss functions to evaluate the models (leaf predictive function, node decision function, tree predictive function) in section 8.2, functions to train such models in section 8.3, and efficient data structures for the tree and the reduced sets at the nodes in section 8.4. Then, in section 8.5, we give the algorithm for three specific ways of visiting nodes: reverse breadth-first search, direct breadth-first search and depth-first search. We then discuss how to postprocess the resulting tree by pruning (section 8.6) and discuss the computational complexity of TAO (section 11.3).

8.1 Algorithmic Framework

Referring now to FIG. 5, therein is shown pseudocode for the TAO algorithmic framework, that is, in a general form where some aspects which can be done in different ways are left unspecified. A specific choice for these aspects will result in a specific form of TAO. "parfor" indicates a for loop where the iterations can be carried out in parallel. The training set consists of the input instances $x_1, \ldots, x_N$ and (for a supervised problem) their corresponding ground-truth labels $y_1, \ldots, y_N$.

Note how the separability condition enters in the loop "parfor $i \in N_d$" (which nodes to optimize jointly and in parallel), while the reduced problem theorem enters in the two reduced-problem minimizations "$\theta_i \leftarrow \ldots$" (how to optimize a single node).

The choice of the sets of non-descendant nodes $N_1, \ldots, N_J$ is critical in TAO. Later, we describe in detail three specific ways to do this (reverse BFS, direct BFS and DFS), although other ways may be of interest depending on the case. Typically, the sets $N_1, \ldots, N_J$ are the same for every TAO iteration, and they form a partition of the tree nodes, that is, the sets are pairwise disjoint and their union is N. However, this need not be so. The node sets may be chosen differently at each iteration (indeed, this happens in the DFS order). They need not be disjoint, which means that some nodes may be optimized multiple times during a given TAO iteration. And their union need not be N, which means that some nodes may not be optimized during a given TAO iteration (indeed, this happens with nodes having empty reduced sets). That said, we must ensure that each node is updated every now and then, so the algorithm makes progress jointly over all nodes.

Figure 6A:
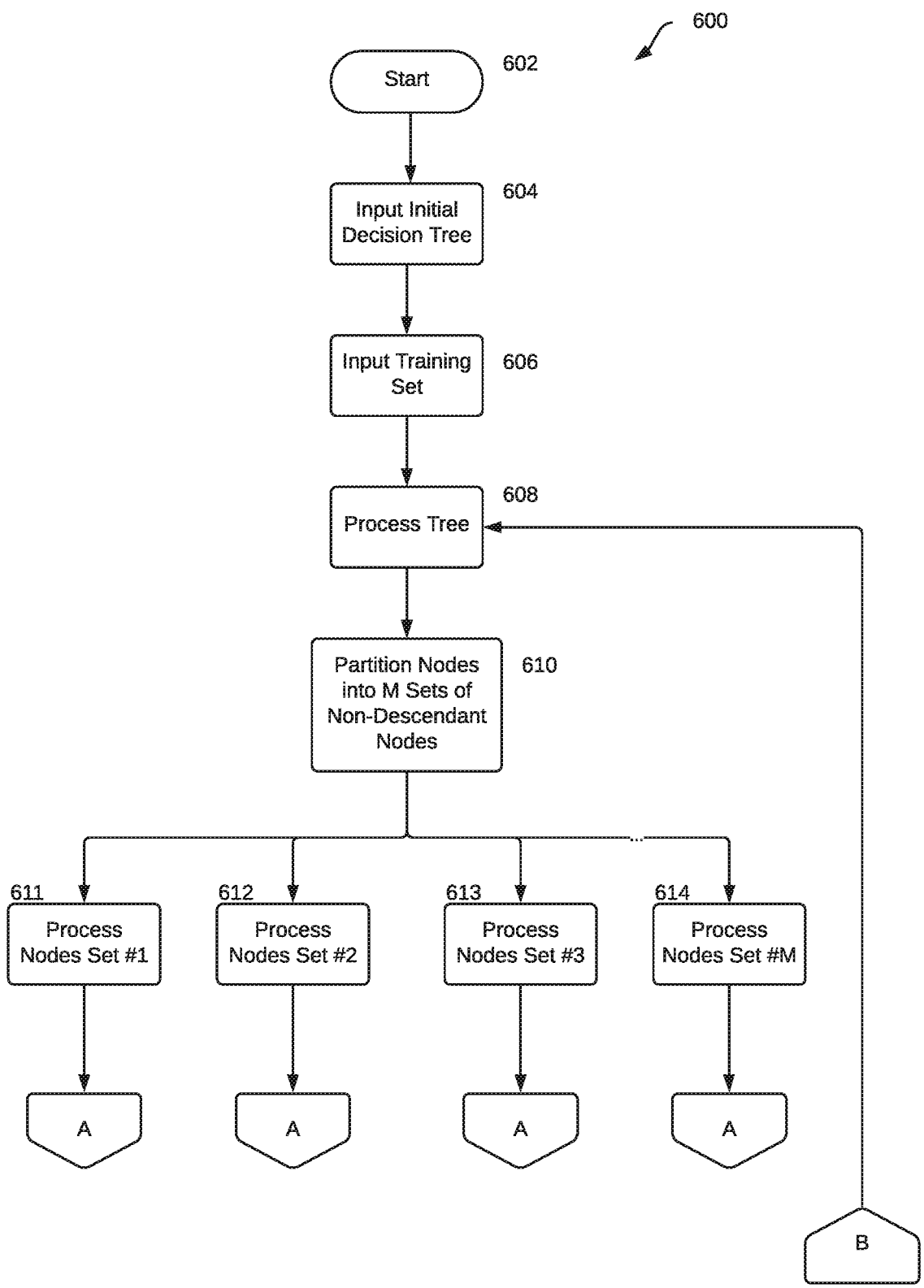
FIGS. 6A and 6B show a flowchart diagram for the TAO algorithmic framework of FIG. 5.
Figure 6B:
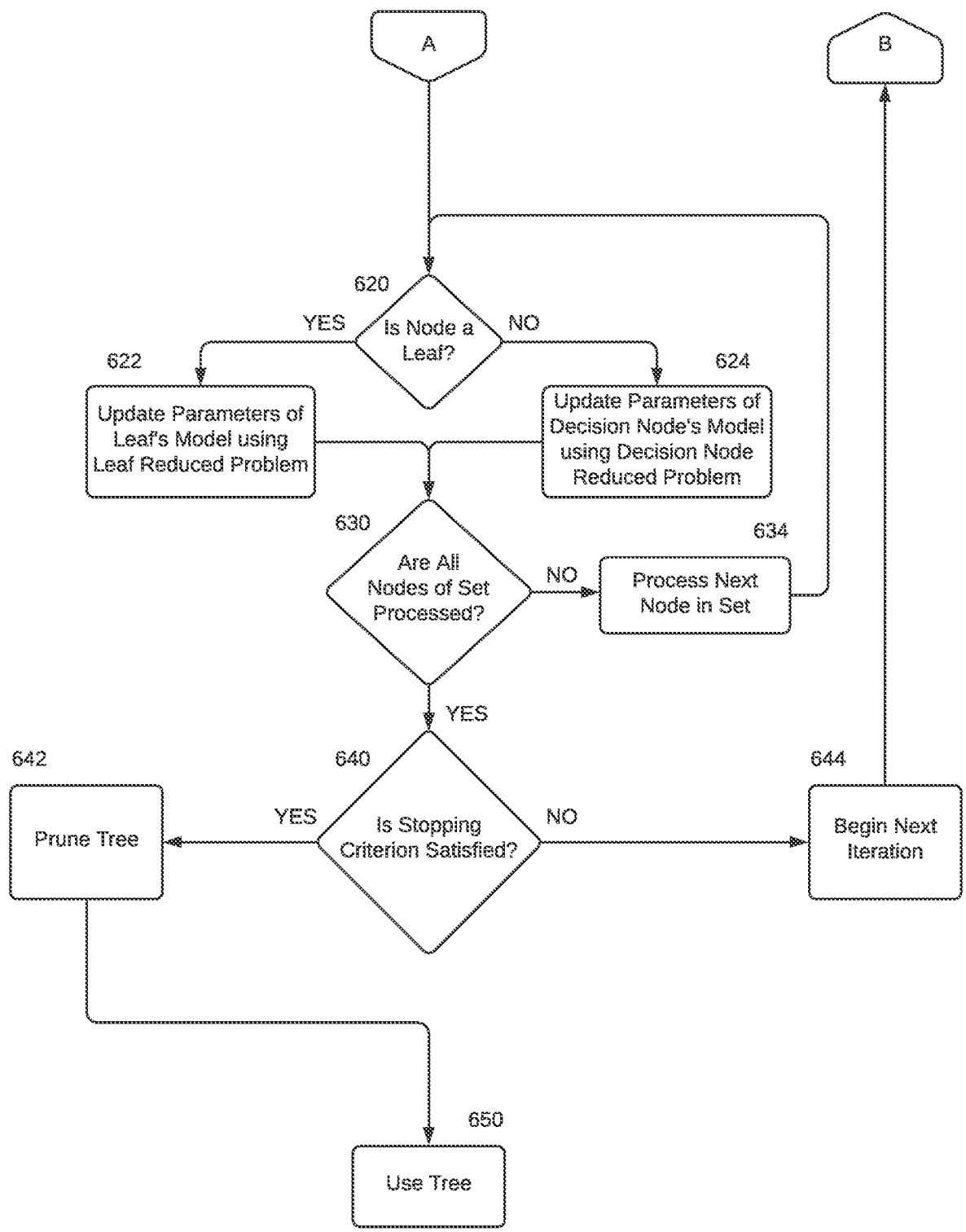

Referring now to FIGS. 6A and 6B, therein is shown a flowchart for a method 600 for learning decision trees utilizing the general TAO algorithm. The method starts at step 602 of FIG. 6A. At step 604 an initial decision tree is input. The initial tree may be complete or incomplete, and it may comprise binary nodes, ternary nodes, quaternary nodes, etc., or any combination thereof. For example, the initial tree may be binary and complete, or binary and incomplete, ternary and complete, ternary and incomplete, etc. Additionally, the splits at the nodes may be generated randomly, or the initial tree may be a tree obtained by a conventional algorithm. Most typically, the tree will be binary and complete. In some embodiments the initial decision tree may be one tree in an ensemble of trees. In such embodiments, the TAO algorithm may be used to train each tree in the ensemble. In other embodiments, the initial tree input may be a single leaf, and the TAO algorithm may be used to optimize the single leaf (see e.g., section 8.11 describing growing a decision tree from a single leaf and utilizing the TAO algorithm to optimize the decision tree as it is grown.

At step 606, a training set of instances is input. The training set may be any conventional set of instances used to train decision trees, or may be less convention training sets, including but not limited to a D-dimensional vector of features of nominal, ordinal, categorical, encoded as one-hot encoding, or scale (continuous) type, a D-dimensional vector of features derived from a conventional model, a graph, a string, or other structured input not represented by a D-dimensional vector.

The method then proceeds at step 608 by processing the initial decision tree. To do so, at step 610, the method partitions the initial tree in sets of non-descendant nodes, (i.e., Set #1, Set #2, Set #3 . . . Set #M). Such non-descendant node sets may be generated in breadth-first search (BFS) order, reverse BFS order, depth-first search order, by generating a random set of non-descendant nodes, or by any other means that produces node sets where none of the nodes in the set are descendants of other nodes in the set.

Each set of non-descendant nodes 1, 2, 3 . . . M are then processed at steps 611-614. In some embodiments, the sets of non-descendant nodes may be processed in parallel. Processing of each set of non-descendant nodes is shown in FIG. 6B. The method takes a first node of a set and determines at step 620 whether the node is a leaf. If the node is a leaf, the method updates the parameters of the leaf's predictor model at step 622 by utilizing the leaf reduced problem (eq. 12). On the other hand, if the node is a decision node, the method updates the parameters of the node's decision function model at step 624 utilizing the decision node's reduced problem (eq. 10).

The leaf's predictor model in the leaf's reduced problem may be a classifier, a univariate classifier, a linear multivariate classifier, a sparse linear multivariate classifier, a nearest-neighbor classifier, a logistic classifier, a softmax classifier, a constant classifier, a naïve Bayes classifier, a kernel machine classifier, a radial basis function network classifier, a generalized linear model classifier, a Gaussian process classifier, a neural network classifier, a classification tree, a linear regressor, a polynomial regressor, a nearest-neighbor regressor, a SVM regressor, a radial basis function network regressor, a generalized linear model regressor, a neural network regressor, a Gaussian process, a spline, a regression tree, a probability density model, a graphical model, a mixture density, a Gaussian mixture, a kernel density estimate, a probability output, or a neural network with a softmax output layer.

The decision node's decision function model in the node's reduced problem may be a classifier, a univariate classifier, a linear multivariate classifier, a sparses linear multivariate classifier, a nearest-neighbor classifier, a logistic classifier, a softmax classifier, a constant classifier, a naïve Bayes, a kernel machine, a radial basis function network, a generalized linear model, a Gaussian process, a neural net, or a classification tree.

The loss function $L_n$ in the leaf's reduced problem may be a misclassification error (0/1 loss), logistic loss, cross-entropy, hinge loss, squared error, absolute deviation, quantile regression, robust errors, log-likelihood, reconstruction error, autoencoder error, siamese distances, pairwise distances, or non-linear embedding. The regularization may be restricting a set of features at each node, penalties or constraints based on L0, L1, L2, L1+L2 or other Lp norms or combinations thereof, restricting a number of features via L1, L0 or other sparsity regularizers, penalizing a number of nodes in the tree via a delta penalty, restricting a number of classes in a leaf, regularization dependent on a size of the reduced set, restricting a structure of the tree, constraints on a tree predictive function, non-negativity constraints on the parameters, or combinations thereof.

Additionally, the parameters of the initial decision tree may be random, equal to the parameters of the previously processed tree, or equal to the parameters of a tree obtained by another algorithm.

At step 630, it is determined whether all nodes of a set are processed. If no (some nodes are not yet processed), then at step 634, the next node in the set is processed by returning to step 620 and continuing to iterate the steps 620 to 630 until all nodes in the set are processed. When all nodes of the set have been processed then the method proceeds to step 640 and asks where a stopping criterion has been satisfied.

Stopping criterion may be when a user specified number of iterations is reached, or the parameters change less than a user set tolerance. In some embodiments, the set tolerance may be "0," meaning none of the parameters change from a previous iteration. If the stopping criterion has not been satisfied, at step 644 another iteration of the method begins again by returning to step 608, and processing the tree. If the stopping criterion has been satisfied, then at step 642, the tree is pruned.

In some embodiments, pruning may be accomplished as follows: (1) if a node's reduced set has instances all of a same class, the node is replaced with a leaf that predicts the same class, and the node's subtree is discarded; (2) if the node's reduced set is empty, but its parent node's reduced set is non-empty and the parent node is binary, replacing the parent node with its non-empty child and discarding the parent node's decision function and the second node's subtree; or (3) if the node's reduced set is empty, but its parent node's reduced set is non-empty, and the node's parent node has more than two children, leaving the parent node in the tree, discarding the node's decision function, and changing the parent's node's decision function such that if the parent node's output equals the node, the output is changed to an arbitrary child of the remaining children of the parent.

At step 650 and after the tree is pruned, the tree may be used for any machine learning tasks. Such machine learning tasks may include predicting target values for binary classification, multiclass classification, a receiver operating characteristic (ROC) curve, regression, ranking, density estimation, dimensionality reduction, clustering, quantization, coding, or semisupervised learning. In other embodiments, the machine learning task may be data mining operation for discovering patterns in the training set of instances, constructing decision rules from the pruned tree, explaining the prediction for a given input by tracing a path the input followed from a root to a leaf, using the pruned tree to interpret another model, or using the pruned tree to find a clustering or segmentation of the training set of instances, among other possible uses.

8.2 Evaluating Parametric Model Functions

FIG. 7 shows pseudocode for computing the tree predictive function $y=T_i(x; \Theta_i)$ of the subtree rooted at node i on input instance x. APPLY-PREDICTOR (g, x) computes $y=g(x; \theta)$ by applying the predictor model g to x. APPLY-DECISION (f, x) computes $i=f(x; \theta)$ by applying the decision function f to x.

Specifically, FIG. 7 gives pseudocode to compute the following functions (given by parametric models):

APPLY-PREDICTOR (g, x) computes an output label $y=g(x; \theta) \in \mathcal{Y}$ by applying the predictor model g: $\mathcal{X} \to \mathcal{Y}$ (with parameters $\theta$) to an input instance $x \in \mathcal{X}$. This is used for the predictor models at the leaves.

APPLY-DECISION (f, x) computes a class label (child's index) $i=f(x; \theta) \in C$ by applying the |C|-class classifier (decision function) $f: \mathcal{X} \to C$ (with parameters $\theta$) to an input instance $x \in \mathcal{X}$. This is used for the decision function models at the decision nodes. As mentioned above, the indices in the set $C$ of any given node (or $C_i$ for node i) point to specific nodes in the tree, even if we may abuse the notation and refer to them as the "left" or "right" children.

APPLY-TREE-PREDICTOR (i, x) computes an output label $y=T_i(x; \Theta_i) \in \mathcal{Y}$ of the predictive function of the subtree rooted at node i on an input instance $x \in \mathcal{X}$. This is used to make a prediction using the trained tree (where i=1 is the root), and during TAO training to compute the instance pseudolabels at a decision node. All APPLY-TREE-PREDICTOR does is traverse a path to a leaf, by calling APPLY-DECISION, APPLY-PREDICTOR or APPLY-TREE-PREDICTOR itself recursively.

Both APPLY-PREDICTOR and APPLY-DECISION are done using standard models in machine learning. For example, APPLY-PREDICTOR can be as simple as returning the model's class label $\theta$ (for a constant classifier), or as complex as applying a neural network with a softmax output layer and returning a probability distribution over the possible classes. APPLY-DECISION can be, for example, applying a binary linear classifier, as in oblique trees. Typically, APPLY-PREDICTOR and APPLY-DECISION will simply be subroutine calls to some machine learning library function, e.g. from SCIKIT-LEARN or TENSORFLOW. This is what we mean by "call existing algorithm" in the pseudocode.

In the remaining pseudocodes, for clarity, we use mathematical notation rather than the previous pseudocode function names. Specifically, we write things such as "$g_i(x_n, \theta_i)$", "$f_i(x_n, \theta_i)$" and "$T_i(x_n; \Theta_i)$" rather than APPLY-PREDICTOR $(g_i, x_n)$, APPLY-DECISION $(f_i, x_n)$ and APPLY-TREE-PREDICTOR $(i, x_n)$.

8.3 Functions for Training Models

FIG. 8 shows pseudocode for the auxiliary functions for the TAO algorithm (training models). Specifically, FIG. 8 gives pseudocode for the following functions, each of which trains a given parametric model (corresponding to those of section 8.2):

TRAIN-PREDICTOR (g, $\mathcal{R}$) trains the predictor model g (with parameters θ) on the training set instances indexed in the set $\mathcal{R}$, and corresponding ground-truth output labels in the training set (if the problem is supervised), and returns the model's parameters θ. This is used for the predictor models at the leaves.

TRAIN-DECISION (f, $\mathcal{R}$) trains the decision function model f (with parameters θ) on the training set instances indexed in the set $\mathcal{R}$, with corresponding output labels ("pseudolabels") computed internally, and returns the model's parameters θ. This is used for the decision function models at the decision nodes.

TRAIN-CLASSIFIER (f, $\mathcal{R}$, $\{\bar{y}_n\} n \in \mathcal{R}$) trains a classifier f (with parameters θ) on the training set instances indexed in the set $\mathcal{R}$, with corresponding output labels $\bar{y}_n$, and returns the classifier's parameters θ. This is used for the decision function models at the decision nodes.

Both TRAIN-PREDICTOR and TRAIN-CLASSIFIER are done using standard training algorithms in machine learning. For example, TRAIN-PREDICTOR can be as simple as finding the label θ of the majority class (for a constant classifier), or as complex as training (approximately) a neural network with SGD. TRAIN-CLASSIFIER can be, for example, training an $\ell_1$-regularized logistic regression binary classifier, as in oblique trees. Typically, TRAIN-PREDICTOR and TRAIN-CLASSIFIER will simply be a subroutine call to some machine learning library. This is what we mean by "call existing algorithm" in the pseudocode. The actual algorithm that TRAIN-CLASSIFIER uses should correspond to a surrogate loss (including the node regularization) that is appropriate to solve the decision node optimization. The actual algorithm that TRAIN-PREDICTOR uses should correspond to the machine learning task the tree is intended to solve (loss, regularization, predictor model).

TRAIN-DECISION needs to produce a classifier that maps an instance x to one of the classes (decision node children) in set C So TRAIN-DECISION ends up calling TRAIN-CLASSIFIER, but first it needs to remove don't-care instances from the reduced set, and to compute the pseudolabel for each care instance. The care instances are defined via a hyperparameter η≥0 in an approximate way; setting η=0 recovers the strict care instances, for which all children produce the same loss (see section 8.13). If the care set ends up being empty, we may skip the optimization and leave the parameters unchanged (see section 8.6).

In the pseudocode for TRAIN-DECISION, we process one instance at a time: we use an outer loop over n (reduced set instances), an inner loop over i (children of the node) and a recursion over the subtree of the node i (within the call to $L_n(T_i(x_n; \Theta_i))$), i.e., a call to APPLY-TREE-PREDICTOR). In order to improve the locality of the memory accesses, it may be preferable to exchange the loops so that we process one node of the subtree at a time, and for each node we loop over its reduced set instances (with a suitable modification of the pseudocode, and using an array similarly to R in section 8.4.3).

As is common in machine learning and optimization, solving inner-loop optimizations such as TRAIN-PREDICTOR and TRAIN-CLASSIFIER is usually best done approximately and fast rather than exactly and slowly (even if they can be solved exactly with a finite computation). This is because such subproblems are only an intermediate step towards solving the overall problem, and it may be faster to do many fast iterations than few slow ones. How approximately to solve the subproblems depends on the case and is found by trial and error. With large-scale training sets (having many instances), each node optimization should be done by a few epochs of SGD.

8.4 Data Structures

The TAO algorithm can work with a great variety of loss and regularization functions, and of type of models at each node of the decision tree (decision node or leaf). We will not address here how to store, evaluate or train those models, since this can be done in standard ways and TAO will simply call an existing subroutine as needed. Likewise, we will assume that the loss functions $L_n$ and regularization functions $\phi_i$ can be called via handles (for example, in TRAIN-DECISION, TRAIN-PREDICTOR and TRAIN-CLASSIFIER). Here, we describe data structures that are essential to TAO and which can help implement its pseudocode in an efficient way.

8.4.1 The Decision Tree

If the tree is binary and complete (the most common case), an efficient structure both in time and memory is a binary heap (note we do not need the heap to be a max- or min-heap). This stores the tree without pointers and can compute the index of a parent or child (left or right) via binary arithmetic operations. For a complete tree where each node has C children, a C-ary heap may be used.

If the tree is binary but not complete, a data structure using pointers is more convenient. Each node (decision or leaf) is a structure containing pointers to the left and right child (which, for a leaf, point to NIL) and to the parent (although TAO does not need this). If the number of children varies depending on the decision node, instead of pointers to the left and right child we have a pointer to a list of children.

The above data structures represent the tree structure and allow us to move around the tree as needed in the BFS and DFS walks, such as scanning the children of a node i in a loop of the form "parfor j∈$C_i$". In addition, each node should contain a pointer to its reduced set (which is simply a range within an array, see below); and a pointer to a data structure for the node's model (containing its parameters and other necessary information).

The tree after TAO has finished iterating may be pruned and typically this will cause the tree not to be complete anymore, so this requires that we return the tree as a pointer data structure (not as a heap).

8.4.2 the Sets of Non-Descendant Nodes for (Reverse) BFS Order

For (reverse) BFS order, at each iteration we need to determine the set $N_d$ of nodes at depth d, for d=0, ..., Δ. It is more efficient to precompute these sets before the first iteration. This can be done via array ranges if using a heap, or as an array of Δ+1 lists if using pointers, with list d corresponding to set $N_d$.

8.4.3 The Reduced Sets

Figures 9A, 9B, 9C:
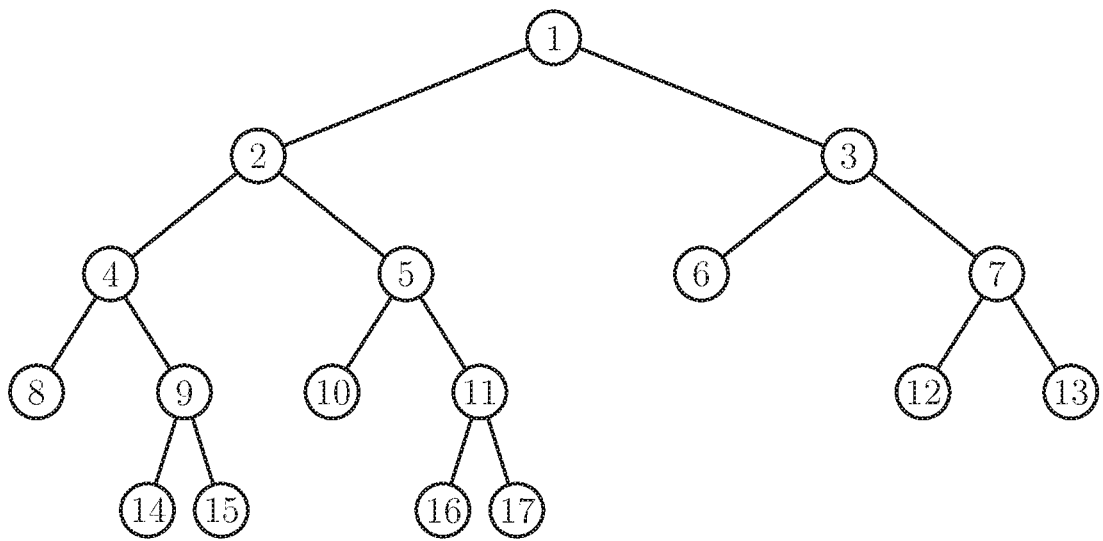
FIG. 9A show a binary tree of a depth four having seventeen nodes.
FIG. 9B shows arrays constructed by DFS or BFS.
FIG. 9C shows a final array indicating how to retrieve all reduced sets of all nodes.

Storing each reduced set $\mathcal{R}_i$ could be simply done using linked list data structures, but it is more efficient in time and space to store them with arrays; in fact, a single integer array of size N is sufficient. We first describe a version using a 2D integer array, which is easier to understand, and then show how to use a single integer array of size N. FIG. 9A-9C are an illustration of the reduced sets data structure for a dataset containing N=9 instances (represented by boldface digits 1-9) and a binary tree of depth Δ=4 with 17 nodes (including decision nodes and leaves). FIG. 9A shows a tree. FIG. 9B shows an array $\mathcal{R}(d, n)$ of $(\Delta+1) \times N$ (left) and an array $\mathcal{R}(n)$ of N elements (right). In both FIGS. 9A and 9B, the results are made up, but they are the same for both $\mathcal{R}(n, d)$ and $R(n)$, and they simulate how each array would have been constructed by DFS or BFS, proceeding top to bottom, so that each parent creates its children's reduced sets. For $\mathcal{R}(n, d)$, it is filled row by row from d=0 to d=4, and each row is explicitly stored; the vertical lines indicate the ranges as they are discovered (as this happens, each node is labeled with its reduced set's range). For $\mathcal{R}(n)$, we have a single row containing all reduced sets. $\mathcal{R}$ is progressively permuted in-place, hence the 5 arrays shown correspond (top to bottom) to how $\mathcal{R}$ changes as the reduced sets are computed; the last array is the final one. As each parent computes its children's reduced sets and $\mathcal{R}$ is permuted accordingly, each node is labeled with its reduced set's range, as shown in the bottom panel. FIG. 9C shows the final array $\mathcal{R}(n)$ indicating how all the reduced sets of all nodes can be retrieved from it. The range $\mathcal{R}(l_i \ldots r_i)$ of $\mathcal{R}_i$ for each node i is shown by the horizontal lines and explicitly by the small numbers in parentheses (e.g. "(4 ... 6)" indicates that $\mathcal{R}_5$ is contained in R(4 ... 6)). Note that $\mathcal{R}_{12}=\phi$; its range (not shown) would be "(9 ... 8)". Hence, both $\mathcal{R}(d, n)$ or $\mathcal{R}(n)$ (together with the range of each node) allow us to find the reduced sets, such as $R_6=\{5, 8\}$, $\mathcal{R}_4=\{4, 1, 9\}$ or $\mathcal{R}_{15}=\{9\}$.

From section 5.1, we know the reduced sets of all the nodes at depth d of the tree represent a partition of $\{1, \ldots, N\}$. Define an integer, global array $\mathcal{R}(d, n)$ of dimension $(\Delta+1) \times N$ so that row $d \in \{0, \ldots, \Delta\}$ contains the reduced sets of all nodes at depth d (where each reduced set is a set of integers in $\{1, \ldots, N\}$). The reduced set $\mathcal{R}_i$ of a node $i \in N$ in the tree consists of a range $\mathcal{R}(d_i, l_i \ldots r_i)$ of consecutive elements in that row (i.e., $\mathcal{R}(d_i, l_i)$, $\mathcal{R}(d_i, l_i+1), \ldots, \mathcal{R}(d_i, r_i)$), so all that node i needs in order to determine $\mathcal{R}_i$ are three integer variables $d_i, l_i, r_i$: one for the depth $d_i$ of i, and the other two to point to the left (first) $l_i$ and right (last) $r_i$ element in row $d_i$ of $\mathcal{R}$ (an empty $\mathcal{R}_i$ will have $l_i > r_i$. Scanning the reduced set $\mathcal{R}_i$ is achieved with a for loop scanning the range $\mathcal{R}(d_i, l_i \ldots r_i)$. There is no need to keep the instances' indices sorted within each $\mathcal{R}_i$, and in fact they are always unsorted due to the way the nodes are processed.

Creating the reduced sets is done as follows (see ALL-REDUCED-SETS and CHILDREN-REDUCED-SETS in FIGS. 10 and 11). A parent node i at depth $d_i$ computes the reduced sets of all its children (at depth $d_i+1$) by scanning $\mathcal{R}_i$ (with a for loop over $\mathcal{R}(d_i, l_i \ldots r_i)$, as mentioned above) and adding instance index n to the child's reduced set ($\mathcal{R}_j \leftarrow \mathcal{R}_j \cup \{n\}$), in $\mathcal{R}(d_i+1, \cdot)$. Inserting indices in $\mathcal{R}(d_i+1, \cdot)$ for the different children can be done in linear time and in place (e.g., without using an auxiliary array) in a similar way to how QUICKSORT'S PARTITION works. The original PARTITION is designed to split the array in two consecutive subarrays, but it is straightforward to extend this to more than two subarrays. As we scan the array left to right element by element, we keep the subarrays for the first, second, etc. children starting from the left of the array. We insert a new element in the right boundary of its subarray, possibly replacing an element from the next subarray. This element is then inserted in the right boundary of its subarray, and so on. If the number of children $|C_i|$ is bigger than 4 or so, it is faster (but not in-place) to use an auxiliary array for each group to keep its elements, and concatenate all the auxiliary arrays back into $\mathcal{R}$. This works even if nodes at different depths are being processed in parallel (as in the DFS order). Since the range of $\mathcal{R}_i$ (at depth $d_i$) is known (namely, $\mathcal{R}(d_i, l_i \ldots r_i)$), a parent i knows where its range $\mathcal{R}(d_i+1, l_i \ldots r_i)$ is at depth $d_i+1$ (the children's depth), so that different parents have known, disjoint ranges and can concurrently write to the array $\mathcal{R}$ without risk.

Now it is easy to see that we can achieve all of the above using a single integer, global array $\mathcal{R}$ of dimension N. This is because: 1) the reduced sets are nested according to the tree structure; 2) when processing a given node i, we know its range into $\mathcal{R}$; and 3) no other node that is either an ascendant or a descendant of i is processed at the same time as i. Hence, when node i modifies its range of $\mathcal{R}$, no other node can modify that range. Therefore, we can process the reduced sets of non-descendant nodes in parallel without fear of interference. Every time a node processes its reduced set, it permutes it according to its children, using the PARTITION-like procedure described above. It follows that, at any time during the execution of TAO, the array $\mathcal{R}$ is a permutation of $\{1, \ldots, N\}$, containing the reduced sets of all nodes in the tree (at all depths), with each node's reduced set being a consecutive range into $\mathcal{R}$. The range of i contains the range of any descendant node of i.

Having a single array of size N works during the TAO optimization because we can always recover the correct reduced set for a node as needed. If optimizing top-bottom, as in (direct) BFS, node i first optimizes its parameters $\theta_i$ and then permutes its reduced set according to its children, rewriting its range in $\mathcal{R}$ in-place, so each child's reduced set is ready. If optimizing bottom-up, as in reverse BFS or DFS, once the parameters $\theta_i$ of i's children have been updated, we trivially recover node i's reduced set as the union of its children's reduced sets (since these do not change after updating the parameters). This union requires no computation: it equals the concatenation of the ranges of i's children, which equals the range of i.

Note that refining a reduced set $\mathcal{R}_i$ into a care set $\mathcal{R}_i'$ is done within TRAIN-DECISION ($f_i$, $\mathcal{R}_i$) separately for each node. We simply need to keep a separate pointer $l_i'$ to the last element of $\mathcal{R}_i'$ (since $l_i$ is the same as for $\mathcal{R}_i$). Again, this can be done by accessing the range $\mathcal{R}(l_i \ldots r_i)$ of $\mathcal{R}_i$ sequentially (determining the pseudolabel for each instance in $\mathcal{R}_i$) and permuting it as in PARTITION, in linear time and in place. The care set $\mathcal{R}_i'$ will then have a range $\mathcal{R}(l_i \ldots l_i')$ with $l_i' \leq r_i$.

8.5 Different Ways to Define the Sets of Non-Descendant Nodes

There are many ways to define sets of non-descendant nodes. We describe several systematic ways of doing so: reverse breadth-first search (reverse BFS), direct breadth-first search (BFS) and depth-first search (DFS). Most importantly, they differ in how they make use of available parallelism. In each case, we always skip the optimization over empty nodes (see section 8.6). Generally, DFS is the better option.

8.5.1 TAO with Reverse Breadth-First Search (BFS) Order

FIG. 10 gives pseudocode for the TAO algorithm with reverse breadth-first search (BFS) order. The pseudocode for CHILDREN-REDUCED-SETS is as in FIG. 11. The code lines outside the repeat . . . until loop are as in FIG. 5, except that the sets $N_0, \ldots, N_\Delta$ of nodes at depth $0, \ldots, \Delta$, respectively, and the root's reduced set $\mathcal{R}_1$ are computed before the repeat loop iteration (using the array data structure mentioned earlier).

ALL-REDUCED-SETS computes the reduced sets for all nodes (except the root, which is always $\mathcal{R}_1=\{1, \ldots, N\}$) given the current tree. We give two ways to do this. For the version on the left of FIG. 10, we proceed sequentially layer by layer starting from the root (i.e., in BFS order). At each layer, each parent node partitions its reduced set among its children by applying its current decision function to each instance and adding it to the corresponding child's reduced set. For the version on the right, we process each point separately (by propagating it from the root to its leaf and adding it to the corresponding node's reduced set). In each version, all the for loops (except the loop over d) may be done in parallel. Note that the concurrent write "$\mathcal{R}_i \leftarrow \mathcal{R}_i \cup \{n\}$" into the reduced sets array $\mathcal{R}$ can be done safely, as noted earlier, because each node writes to a range of $\mathcal{R}$ that is guaranteed to be disjoint with any other node currently being optimized. The version of ALL-REDUCED-SETS on the right has more parallelism, but the version on the left likely has better locality of memory access.

Concerning the tree initialization, it is interesting to note that, in reverse BFS order, it is not necessary to know the initial parameter values at any node. All we need to know are the reduced sets at the leaves. From those, we optimize the leaves' parameters, which makes it possible to optimize the parameters at the next layer up, and so on. This makes it possible to train the tree given only a partition of the training set into the leaves, with no initial parameters. In practice, one typically initializes the parameters of all nodes anyway, which implies such a partition. With other orders (BFS and DFS) we do need to know the initial parameters at all the nodes, because they are necessary to compute the prediction of children's subtrees.

8.5.2 TAO with Breadth-First Search (BFS) Order

FIG. 11 gives pseudocode for the TAO algorithm with breadth-first search (BFS) order. The code lines outside the repeat . . . until loop are as in FIG. 5, except that the sets $N_0, \ldots, N_\Delta$ of nodes at depth $0, \ldots, \Delta$ respectively, and the root's reduced set $\mathcal{R}_1$ are computed before the repeat loop iteration (using the array data structure mentioned earlier).

CHILDREN-REDUCED-SETS (T, i) computes the reduced set of each of i's children, by passing each instance in i's reduced set $\mathcal{R}_1$ through i's decision function $f_i$, and adding the instance to the resulting child's reduced set. As in the reverse BFS case, it may be efficient to parallelize the for loop in CHILDREN-REDUCED-SETS.

8.5.3 TAO with Depth-First Search (DFS) Order

FIG. 12 gives pseudocode for the TAO algorithm with depth-first search (DFS) order. CHILDREN-REDUCED-SETS is as in FIG. 11. The code lines outside the repeat . . . until loop are as in FIG. 5. Visiting the nodes in DFS order is achieved by simply recursing on each node as we reach it from its parent. DFS-VISIT is first called on the root (assumed to be node i=1), whose reduced set is $\mathcal{R}_1=\{1, \ldots, N\}$. The separability condition holds because, at any time during one TAO iteration (in the call DFS-VISIT (T, 1)), any two nodes currently being optimized (i.e., running TRAIN DECISION ($f_i$, $\mathcal{R}_i$)) cannot be descendants of each other. This follows from the fact that if j is a descendant of i, then we do not run TRAIN-DECISION ($f_i$, $\mathcal{R}_i$) until all descendants of i (including j) have run TRAIN-DECISION.

The work done by DFS-VISIT on a node i is as follows. For a leaf, it simply trains it. For a decision node, it computes the reduced set of each of its children (in CHILDREN-REDUCED-SETS), recursively optimizes its children (in parallel), and then it optimizes i's decision function.

Note that DFS optimizes a node after recursing on its children. This means that, after the top-level call to DFS-VISIT (T, 1), the entire tree is traversed, constructing the reduced set at each node (by repeatedly permuting the reduced sets array $\mathcal{R}$ and updating each node's range $\mathcal{R}(l_i \ldots r_i)$), and only then do nodes start to be optimized. Nodes not being optimized (because they are waiting on their children) block and consume no CPU time. Nodes being optimized are running in parallel. At any given time during the DFS traversal, the set of nodes being optimized (i.e., running TRAIN-DECISION or TRAIN-PREDICTOR) may contain nodes at different depths, including both decision nodes and leaves, and they are guaranteed to be non-descendants of each other. For this reason, the DFS traversal makes a better use of the available hardware parallelism than the reverse BFS traversal. The latter trains in parallel all nodes at the same depth, but the number of nodes at a given depth varies considerably (from one node at the root to $2^\Delta$ at the leaves, in a complete tree). DFS is especially better with unbalanced tree structures, where BFS (at least, naively implemented) would possibly waste available parallel processing (e.g. by not training all the leaves in parallel). Hence, reverse BFS results in a synchronous parallelization, where the nodes' depth acts as a barrier, and we cannot proceed to the next depth until all nodes at the current depth have finished. DFS results in an asynchronous, more efficient parallelization, where nodes at any depth may be trained in parallel.

The DFS order is also more efficient in handling dead subtrees, since it skips them entirely (so it does not need to check its nodes). In the reverse BFS order, each node is checked and skipped if dead, which introduces a small overhead.

If computing $f_i(x_n, \theta_i)$ takes significant runtime, it may be faster to run the loop "for $n \in \mathcal{R}_i$" in parallel, by splitting it over several processors. As with BFS, the concurrent write "$\mathcal{R}_i \leftarrow \mathcal{R}_i \cup \{n\}$" into the reduced sets array $\mathcal{R}$ can be done safely.

8.6 Pruning the Tree

As TAO iterates, the root-leaf path followed by each training instance changes and so does the reduced set of each node. This can lead to some parts of the tree becoming unnecessary, which introduces opportunities to reduce the tree size by pruning it, without affecting its prediction on the training set. Specifically, we can have:

Dead subtrees: A dead subtree arises if the reduced set of a node (decision node or leaf) becomes empty (because its parent sends all its instances to another child). Then, no training instances reach the node's entire subtree.

Pure subtrees: A pure subtree arises if a decision node's reduced set contains instances all of which have the same ground-truth class label. Strictly, this is only useful in classification, where the label is discrete, but in an approximate way (see section 8.13) it also applies generally, e.g. to regression.

In TAO (in any of its versions), we typically do not prune any nodes until the end of the algorithm. Also, if we encounter a node whose reduced set (or its care set) is empty, we do not optimize it, we simply skip it (and its entire subtree), i.e., we leave its parameters unchanged. Not only does this make sense (as we explain below), but it also accelerates the algorithm. In the pseudocode, this is seen in statements such as "if $\mathcal{R}_j \neq \emptyset$" or "if $\mathcal{R}R' \neq \emptyset$", where we skip the optimization over empty nodes. We do optimize over pure nodes.

Pruning a tree is typically done at the end of the algorithm, as follows. For a pure subtree, assume node i's reduced set has all instances of the same class k but its parent j has instances of k and at least one other class. Then, we replace node i with a leaf that always predicts label k, and we discard i's subtree. For a dead subtree, assume node i's reduced set is empty but its parent j has a nonempty reduced set. Then, if j is a binary node, we replace j (the parent) with its other child, and we discard j's decision function and i's subtree. This can be done in constant time by reorganizing pointers in the tree data structure. If node j has more than two children, then we leave node j in the tree, discard i's subtree, and change j's decision function $f_j$ so that if its output for an instance equals the child i, the output is changed to an arbitrary child of the remaining children of j other than i.

Figure 13:
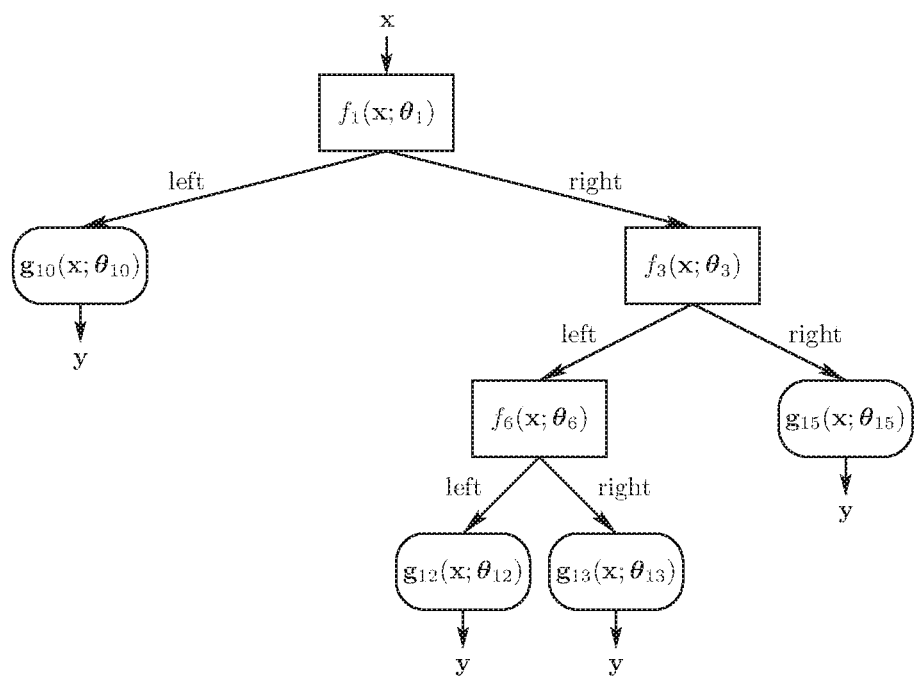
FIG. 13 shows the final tree structure after post-processing the tree learned by TAO for the tree of FIG. 2.

Referring to FIG. 13, therein is shown a final tree structure after postprocessing the tree learned by TAO for the tree of FIG. 2. In this example, several branches received no training instances (namely the left branch of nodes 2 and 7 and the right branch of node 5) and were removed ("dead subtrees"), so the tree was pruned.

Pruning a dead or pure subtree has no effect on the training instances, though it may affect test instances. We generally expect this to be beneficial in terms of generalization, since we achieve a smaller model with the same training error, and of efficiency, since a smaller tree takes less space and is faster at inference. These reasons also suggest that we may be able to find better trees if we are slightly more aggressive and prune subtrees that are not strictly but approximately empty or pure, see section 8.13.

Why prune at the end? Dead or pure subtrees can occur anytime during TAO iterations, so it is possible to prune them as soon as they occur, effectively a greedy approach compared to pruning only at the end. But this is not a good idea because it prevents reviving such subtrees if they become alive or impure again in a later iteration. Having those subtrees available again can help the tree find a lower objective function value. Hence, we typically apply pruning only at the very end of the TAO optimization. That is, if we are training a single tree (for a specific value of, say, the sparsity hyperparameter α in sparse oblique trees), we prune after TAO has finished iterating. If we are computing a collection of trees over a range of increasing α values (the regularization path), we prune each tree separately after TAO has finished iterating on the very last α. Note that keeping dead subtrees in the optimization introduces nearly no overhead anyway, since the node optimization is skipped.

Why skip the optimization over dead nodes? When encountering a dead node (whose reduced set or care set is empty), we typically skip its optimization and leave its parameters (and hence the parameters of its entire subtree) unchanged. When encountering a pure node, we do optimize it as usual. Let us see why.

First, consider a node i whose reduced set or care set is empty. The data term (loss function) in the objective function of the node optimization is constant and only the regularization term $\alpha \phi_i(\theta_i)$ is left. While mathematically speaking we can still optimize over the node, from a machine learning point of view it does not make sense to train a model without data. If anyway we still did want to optimize the node, the result (for most regularization functions, such as $\ell_p$ norms) would be to make zero all weights (except possibly the bias, which can take any value and becomes undefined), and this would happen for the entire subtree. This would make the model of each node in the subtree (decision function or leaf predictor) not depend on the input instance, so all instances would end up in the same leaf. This makes it hard for the subtree to be revived in a later TAO iteration, because for this to happen it must be able to provide a prediction for at least one instance that is better than through another subtree. Since the tree optimization is NP-hard to start with, we have more opportunities to find a good optimum by being able to revive dead or pure subtrees, and this is easier if we leave their parameters unchanged. Note that this is consistent with the concept of alternating optimization: all we are doing is temporarily skip optimizing over some variables. Eventually, we do optimize over them: either if they are revived (by receiving instances or becoming impure), or at the end (when optimizing them is equivalent to pruning them).

Second, consider a node that is pure, i.e., all the instances in its reduced set have ground-truth class k. Here, it is necessary to optimize the node as usual and update its parameters in order to improve the tree. If the node is a leaf, its predictor model will learn to predict class k. If it is a decision node, its model will learn to direct instances to the right leaf. It is possible that in the decision node optimization all pseudolabels are equal, which will result in zeroing the node's parameters, hence directing all instances to a single child and causing dead subtrees. But these dead subtrees are left as they are (as discussed above) and may revive later if the reduced sets change. Having all pseudolabels be equal can happen beyond classification, e.g. in regression, and likewise we optimize such a node as usual.

8.7 Initialization and Termination 8.7.1 Initialization

Generally, we take the initial tree to be complete with random parameters, of large enough depth. Let us see why. As with any optimization problem, particularly NP-hard ones such as our tree optimization, choosing a good initial tree can be very helpful to converge to a good optimum and to do so fast. TAO works on a tree of fixed structure and known models at the nodes, and the resulting tree can be no larger than the initial one. Hence, it is convenient to use an initial tree that is complete of large enough depth, and let TAO determine the final tree structure and parameters, as best suited to the data. It is also possible to try multiple initial trees of different depths, but because TAO can prune the tree, taking a single initial tree that is deep enough and then pruning it across increasing sparsity values is simpler.

As for the node parameters, they can be set randomly as one would if each node model was to be initialized for training on its own. It is convenient to avoid parameter settings that produce subtrees with empty reduced sets. This can be done by picking random parameters that partition each node's reduced set about evenly over its children (e.g. by a random hyperplane through the reduced set mean). We do this by starting from the root, setting its parameters, and recursively setting its children's parameters.

Depending on the case, the initial tree may be obtained by other algorithms (e.g. CART-type) or from domain information (see an example in section 8.8). It may also be a previous TAO tree, as in warm-start initialization in a regularization path or in an inner-loop optimization.

8.7.2 Stopping Criterion

This determines when to stop iterating in TAO's main loop and is referred to as "until stop" in the pseudocode. Our preferred criterion is to stop when either none of the parameters (throughout the tree's nodes) have changed since the previous iteration, or when a user-set number of iterations is reached. We do not need to evaluate the objective function at each iteration, which is faster, and we typically allow for parameter updates that may occasionally increase it (because of an inexact node optimization).

If we reject node updates that do not strictly decrease the objective, then we can stop when we reach either a user-set tolerance in the objective decrease or a user-set number of iterations.

8.7.3 Normalization of the Tree

Given the decision tree trained by TAO (or any decision tree), we can apply certain transformations to the parameters that do not change the tree predictive function. Depending on the application, it may be convenient to put the tree into a canonical form, or "normalize" it. Consider binary oblique nodes as an example, where node i has a decision function of the form "go right if $w_i^T x + b_i \geq 0$" with parameters $\theta_i = \{w_i, b_i\}$ (weight vector and bias). We have the following transformations:

Negation: Negating $w_i$ and $b_i$ simply exchanges the children of node i. We can normalize the tree by always using the form "go right if $f_i(x, \theta_i) = w_i^T x + b_i \geq 0$" for the decision function (rather than allowing nodes of the form "go left if $w_i^T x + b_i \geq 0$", say).

Scaling: Scaling $w_i$ and $b_i$ by a positive constant has no effect on the decision, which is given by the sign of $w_i^T x + b_i$. We can normalize the tree by setting the scale so that the weight vector has norm 1, i.e., we replace $\{w_i, b_i\}$ with $\{w_i/\|w_i\|, b_i/\|w_i\|\}$. This can always be done (since $w_i \neq 0$ for any node after pruning), and it gives each individual weight an intuitive interpretation as the amount of participation of their feature in the decision function relative to other features.

8.8 Learning Deep Unbalanced Trees

As noted in section 8.7, a good way in general to pick an initial tree is to make it complete with a large enough depth. TAO can then prune this to a structure and parameters that best fit the data. However, in some datasets the optimal tree structure can be a deep unbalanced tree, where a few paths are deep (say depth 20) but most are shallow (say depth 5). This reflects the fact that some regions of input space may be harder to separate than others. It may happen if the number of classes is very large or if learning an axis-aligned tree. In such cases, if using an initial tree that is complete, its depth would have to equal the depth of the deepest leaf. This would result in a huge number of nodes ($2^{20}$ in the example above), possibly more than training instances, and require too much storage. Even though most of these nodes would end up being pruned anyway at the end of the TAO training, they incur a significant computational cost (although TAO does not optimize over nodes with empty reduced sets, they still have to be stored).

One way to learn a deep unbalanced tree is to use as starting tree a deep enough, unbalanced tree that is likely to contain the optimal tree as a substructure. Such a tree can be obtained by greedily growing a tree until it reaches zero loss (since achieving a low loss is what drives the need for the tree to be large enough). This is similar to what CART or C4.5 do, and in fact such trees can be used as initial TAO tree. However, in growing the tree it is likely not necessary to use a purity criterion to split the nodes; one can simply pick a feature or hyperplane at random and set the bias so it achieves a 50/50 split (with binary trees).

Another way to avoid handling large, deep trees is to use more complex models in the nodes and leaves (such as linear, kernel SVM or even small neural nets). In particular, using linear softmax classifiers at the leaves results in far smaller trees than using constant classifiers, and is particularly useful if there are many classes.

8.9 Using TAO to Obtain a Regularization Path Over Trees

In practice, we will often want to scan a collection of trees trained for a range of regularization hyperparameter values $0 \leq \alpha_1 \leq \ldots \leq \alpha_Q$. In particular, this is useful with sparsity regularization, as in the Lasso. For $\alpha = 0$ we achieve the lowest training error and all parameters will be nonzero (in general). For a large enough value of $\alpha$ the tree will shrink to a single root node having all parameters zero, which is a completely sparse but useless model, with a large training error. The trees that generalize better will occur for some intermediate $\alpha$ value and this can be estimated with usual means, such as using a validation set. In some applications we may want to achieve trees with higher error but smaller or sparser so they are more interpretable. Useful ranges for $\alpha$ depend on the problem (dataset size and dimensionality, size of tree, etc.) and finding them may require some trial and error; usually, the $\alpha$ values should span several orders of magnitude, exponentially spaced.

Computationally, the best way to train the collection of trees is as follows. We first select an initial tree, say a complete tree with random parameters (see section 8.7), and a range of $\alpha$ values $0 \leq \alpha 1 \leq \ldots \leq \alpha_Q$. Using that initial tree, we use TAO to train tree 1 using $\alpha_1$ but we do not prune it after TAO finishes iterating. Then we use TAO again to train tree 2 using $\alpha_2$ initialized from tree 1 ("warm-start") but we, again, do not prune it. We repeat this for all $\alpha$ values, always initializing from the previous $\alpha$ value's tree and never pruning. After TAO has finished with the last $\alpha$ value, we prune all trees (section 8.6). This "warm-start" procedure has two advantages compared to training each tree with its own initialization: each tree should require fewer iterations because it has a good initialization, and we also are more likely to avoid oscillations in the training error caused by each tree converging to a different local optimum.

With CART-type algorithms, one usually stops splitting a node if its reduced set is small (since fitting a model to few instances leads to overfitting). In TAO, nodes with small reduced sets will be pruned automatically if $\lambda$ is large enough. So it is not necessary to monitor the reduced sets, one simply constructs the regularization path over $\lambda$ and picks a good tree.

8.10 Model Selection Over the Tree Structure

Learning both the structure and node parameters of a decision tree can generally be posed as an optimization problem of a loss function over a training set as in eq. 4 with a constraint or penalty on the complexity of the tree. The complexity of the tree can be defined in various ways: depth, number of nodes, etc. We describe next how TAO handles model selection and the tree complexity, which is very different from traditional tree learning.

Generally speaking (not just for trees), model selection is achieved by training models of different sizes and structures on a training set, from which a final model is picked in one of two ways: the model with lowest error on a validation set (cross-validation), or the model with lowest value of the sum of the training error plus a model selection criterion such as Akaike information criterion (AIC) or Bayesian information criterion (BIC). Either way, this requires training a potentially large number of models, which is computationally very costly. For example, for neural nets, each model could correspond to using a different neural net architecture (given by the number of layers, number of hidden units, regularization hyperparameters, etc.). For trees, each model would correspond to a tree of a different structure and size.

However, TAO can perform an effective form of model selection while training just a single tree. This is done by taking as initial tree one that has a large enough structure and using an adequate regularization term of hyperparameter α (typically $\ell_1$ regularization, but others are possible). We then optimize eq. 4 over the tree parameters with TAO. That is, we train a single tree structure, and model selection happens in two ways during this training:

Model selection over the node models occurs via $\ell_1$ regularization, which makes some of their parameters zero.

Model selection over the tree structures, constrained to be subsets of the initial tree, occurs via automatic pruning. That is, while the trained tree can be no larger than the initial one, it can be smaller because of pruning. As described in section 8.6, a node can be pruned if all its parameters are zero (since all instances reaching it go to the same child and all the other children receive no instances).

Thus, no special care is required to do model selection other than setting the regularization hyperparameter α, in particular we need not train multiple trees. The reduced sets, which vary during training, help to determine how complex a node should be. The TAO optimization implicitly explores substructures of the initial tree, and that is why this tree should be taken large enough.

Effectively then, the way the tree complexity is constrained or penalized in TAO is that 1) we restrict the space of possible tree structures to those structures that are subsets of the initial tree, and 2) the actual structure that is learned depends on the regularization term. Its hyperparameter α, and hence the resulting tree, can be selected by cross-validation, as commonly done with other models; indeed, varying α from zero to infinity traces a regularization path of progressively smaller trees (section 8.9). The process is similar to what happens in other $\ell_1$-regularized models such as the Lasso. In the Lasso, the selection is over subsets of features rather than over tree structures and node parameters.

The regularization term in eq. 4 defines the complexity cost of the tree and can take different forms. One of them, the δ-penalty, has the meaning of "number of nodes" in the tree (see section 9.1).

In section 8.11 we describe a different way to do model selection with TAO that grows the tree structure progressively.

8.11 Learning the Tree Structure with TAO

Up to now we have applied TAO to an initial tree of a given structure. However, we can combine this with growing the tree structure itself. The basic idea is that we interleave growing the tree larger (by splitting each leaf) with optimizing (and pruning) the current tree with TAO. Growing the tree makes it possible to search an ever larger space of tree structures, while optimizing (and pruning) the tree makes sure to find good parameter values and to remove unnecessary nodes. Specifically, the algorithm is as follows:

Initialization Start with a single node, a leaf, and optimize it with TAO, that is, optimize the objective function (eq. 4) over the leaf's predictor model.

Iteration ("Split-Optimize-Prune")

Leave all the decision nodes in the current tree (and their parameters) as they are. For each leaf in the current tree, if it already achieves a minimal loss on its reduced set (e.g. zero classification error for the 0/1 loss), leave it as is. Otherwise, split the leaf, i.e., replace it with a decision node and its children leaves, and assign random parameter values to all of them (the decision node and its leaves).

Optimize the new tree with TAO, including pruning the tree at the end of the TAO iterations.

We repeat the above iteration until either we reach a set number of iterations or the tree after the iteration has the same structure as before the iteration (which means every split node was pruned back) and its parameters (throughout the tree) changed less than a set tolerance.

The previous algorithm generates a sequence (collection) of trees of different structure, from the first one consisting of a single node to the last one, each optimized on the training set. We can perform model selection as in section 8.10 and pick one of these trees according to standard model selection rules, such as cross-validation or a model selection criterion.

Let us consider the algorithm more in detail. Each split-optimize-prune iteration above consists of:

1. Growing the current tree;
2. Optimizing all the tree's parameters; and
3. Pruning the tree where the growing is done by splitting the tree leaves, and optimizing and pruning are done by running TAO as usual on the current tree grown. The parameters of this grown tree are identical to those of the previous grown tree except in the old leaves, which are now decision nodes and the leaves' children, which have random parameters.

If a leaf already achieves minimal loss on its reduced set, splitting it will not reduce the loss but will increase the tree size and number of parameters and hence the regularization term, so we do not split such a leaf. At the end of a new iteration, the tree will usually be bigger, have new parameter values throughout and achieve a lower loss. Although the splitting affects potentially every leaf, the pruning can remove arbitrary subtrees from the tree, so that the resulting tree will eventually be far from complete and have leaves at different levels, and overall a complex structure. Once the tree is big enough and the loss low enough, further growth will not compensate because the regularization term will increase more than the loss decreases. This will cause the split nodes to be pruned back and the structure will not change, although its parameters may still change. If the structure does not change and the parameters change too little (or if we reach the maximum number of iterations allowed), we stop.

Since the model structure is changing, we need to take care of the following:

Choice of node model and tree structure: every time a leaf is split, we need to decide how many children to create, and for each of the resulting nodes (one decision node and its leaves) what node models they should use. This can be done by deciding ahead of time, valid throughout the tree growth, the arity of each node (say 2, so the tree will be binary) and the type of decision nodes and leaves (say linear decision nodes and constant-label leaves). It is possible to do this in other ways or even on the fly. This defines the tree predictive function and also the loss function term of the objective function (section 4.2.1).

Choice of regularization terms in eq. 4: again we have a choice, for each new node created. This can be done by deciding ahead of time the type of regularization term for a decision node and leaf and the value of the hyperparameter α, valid for every node throughout the tree growth. This makes new regularization terms "appear" in the objective function as the tree grows. We can also think of this as all the regularization terms being there all the time but taking a value of zero for nodes not yet in the tree.

This defines the regularization term of the objective function (section 4.2.2).

Hence, and importantly, the objective function that TAO optimizes at each split-optimize-prune step still has the form (eq. 4), i.e., a loss and a regularization term. This makes it possible to learn sparse weight vectors at the nodes, and to prune the tree as we grow it. Because of this and because we do not split leaves with minimal loss, the resulting tree will in general not be complete, and its structure will be dictated by the dataset. This process learns the tree structure from scratch as a combination of growing and pruning and does not need an initial tree.

An advantage of this procedure compared to running TAO once on a fixed, large enough structure is that the latter limits the possible tree structures, which can be problematic if the optimal tree is deep enough (and unbalanced) that it is not a subset of the fixed tree (see section 8.8). Growing the tree as described here can eventually find such structure. However, if the optimal tree is not very deep (as is often the case with oblique trees) then running TAO once on a fixed, large enough structure is much faster than the growing procedure and should find a similar tree.

This process is reminiscent of the way a tree s grown in traditional algorithms such as CART or C4.5, but there are crucial differences: the growth is not greedy, because the parameters of a node do continue to change (and a node or subtree can even be pruned); and all the nodes' parameters are jointly updated to optimize the desired objective function over the whole tree (rather than optimizing a purity criterion locally at each node being split).

Figure 14:
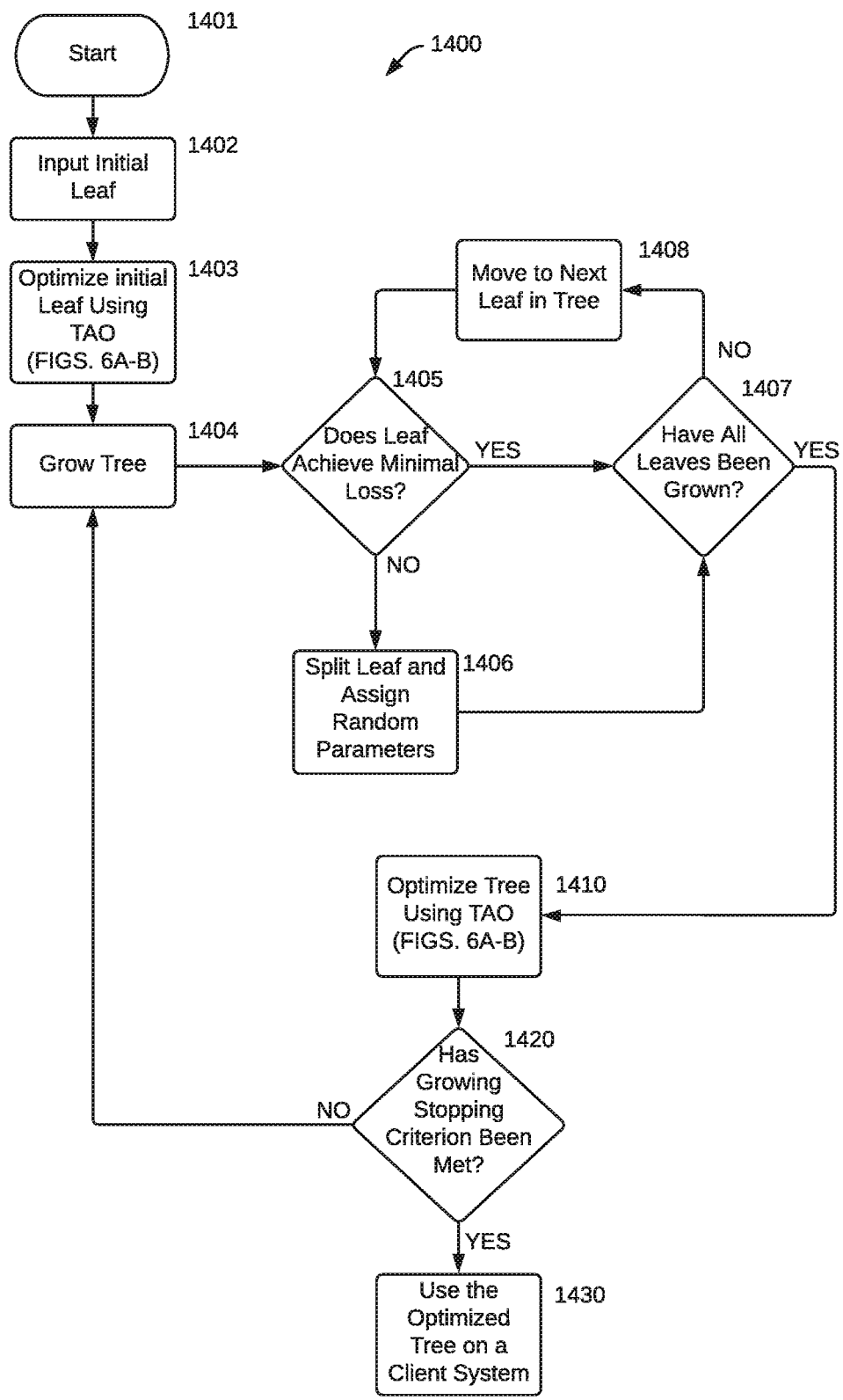
FIG. 14 shows a flowchart diagram for a method of growing a decision tree starting with an initial leaf.

Referring now to FIG. 14, therein is shown a flowchart diagram setting forth the specific steps of a method 1400 for learning the tree structure utilizing TAO. The method starts at step 1401 and continues at 1402 by inputting an initial leaf with random parameters. The initial leaf is then optimized at step 1403 utilizing the TAO algorithm (shown in FIGS. 6A & 6B). It should be noted that the initial leaf is input into the TAO algorithm as an initial decision tree. Therefore, when this initial leaf is processed as a tree, there will only be one set of non-descendant nodes and only one node (the leaf) in the set. Further, when running TAO on this initial leaf, TAO will update parameters of the leaf's model using the leaf reduced problem, and will continue to iterate on the leaf, until a stopping criterion is reached.

After the optimization of the leaf, at step 1404, the tree is grown by taking the initial input leaf (or a grown leaf), and at step 1405, determining if the leaf achieves a minimal loss (where the regularization term increases more than the leafs loss decreases) on the leafs reduced set of instances. If the leaves does achieve a minimal loss, then at step 1407, the method determines if all leaves have been grown. If the leaf is the initial input leaf all leaves will necessarily be grown. If no (all leaves have not been grown), at step 1408, the method moves to the next leaf in the tree, and returns to step 1405, to ask if the next leaf achieves a minimal loss. If, on the other hand, at step 1405, the leaf does not achieve the minimal loss, then at step 1406 the leaf is split, becomes a decision node) and random parameters are assigned to the children of split leaf. The method then moves to step 1407 and determines if all current leaves have been grown. If not all current leaves have been grown, then the method repeats step 1408 by moving to the next leaf in the tree and determining again at step 1405 if the leaf achieves the minimal loss. Once the method determines at step 1407 that all current leaves have been grown, then at step 1410, the grown tree is optimized utilizing the TAO algorithm of FIGS. 6A & 6B. The grown tree is input into the TAO algorithm as the initial tree and the tree is processed, and TAO iterates until a stopping criterion is reached and the resulting tree is pruned.

At step 1420, the method determines if the growing stopping criterion has been satisfied. As indicated, the growing stopping criterion may be when the new decision tree has the same structure as the previous optimized tree and a change in the tree's parameters is less than a set tolerance, or may be a predetermined number of growing iterations. If no (the growing stopping criterion has not been met) then the method repeats starting at step 1404 with growing the tree. If yes (the growing stopping criterion is satisfied), then at step 1430, the tree may be used on a client system to perform a machine learning task.

As with the method of described in FIGS. 6A and 6B, the tree may be complete or incomplete, the splits at the nodes may be binary, ternary, quaternary, or any combination thereof, or the splits at the nodes may be generated randomly, as described above. The training set may be any conventional set of instances as described above. The sets of non-descendant nodes may be generated in any order, or randomly as described above, and may be processed in parallel. When processing the nodes utilizing the TAO algorithm, the leaf's predictor model and the decision node's decision function model may be as described above. The loss function and regularization may be as described above. The stopping criterion for the TAO algorithm may be as described above, and the pruning may occur as described above.

In some embodiments, the method of learning a tree structure using TAO may further comprise, generating a collection of trees. The collection is generated by adding each optimized tree to the collection of trees before repeating the growing process to produce the next optimized tree. A suitable tree from the collection may then be chosen using model selection rules (e.g., cross-validation or a model selection criterion), and the suitable tree may then be used on a client system to perform a machine learning task.

8.12 Categorical Features

Up to now we have considered the input features x to be real. We now discuss how to model categorical features. A categorical variable takes values in a finite set; for example, a color in {red, green, blue}, or a binary variable in {0, 1}. The simplest way to handle categorical variables in TAO is to use a one-hot encoding, which is widely used in machine learning and statistics for this purpose. A C-value categorical variable with C>2 is represented by C binary dummy variables, exactly one of which is 1, e.g., $(1,0,0)^T$, $(0,1,0)^T$ and $(0,0,1)^T$ for C=3. A binary categorical variable (C=2) is represented by a single dummy binary variable, i.e., by itself. In this encoding the C values are the corners of a regular simplex in $\mathbb{R}^C$; each value is equidistant from the others, so no particular ordering or metric difference is introduced. The one-hot encoding can be seen as a limit case of a soft encoding of membership (or mixture) into C "pure" categories, where the C variables are real-valued but constrained to lie within the simplex (i.e., they are nonnegative and sum to 1). The one-hot encoding requires no change to the TAO algorithm: before training, each categorical feature is encoded into dummy variables whose value never changes and is treated as real. Crucially, it works with binary trees (i.e., it does not need multiway splits), and it allows us to use categorical and metric variables together (since the dummy variables are taken as real), e.g. in a hyperplane decision node.

Let us see more in detail how categorical features work in axis-aligned and oblique trees. Assume w.l.o.g. that of the $\mathcal{D}$ input features, the first C correspond to a categorical variable $\mathcal{X}$ taking C values $\{1, \ldots, C\}$. Consider a decision node i in the tree.

Axis-Aligned Trees

If a node tests a dummy variable, then this corresponds to an equality test on the corresponding category value, i.e., the decision compares the categorical variable with a single value. In details, assume the decision function of node i tests $x_c$, the cth dummy binary variable of $\mathcal{X}$, which by the one-hot encoding must be either $x_c=1$ (so $\mathcal{X}=c$) or $x_c=0$ (so $\mathcal{X} \neq c$). Hence node i must be binary (with a left and a right child). The decision function $f_i(x)$ must take one of the following forms:

"Go right if $x_c+b_i \geq 0$". If $b_i \in [-1,0)$, this is equivalent to "go left if $x_c=0$ and right if $x_c=1$", which is equivalent to "go right if $\mathcal{X}=c$, else go left". If $b_i<-1$ or $b_i \geq 0$ then $f_i(x)$ is constant and any instance will always go left or right, respectively.

"Go right if $-x_c+b_i \geq 0$". If $b_i \in [0,1)$, this is equivalent to "go left if $x_c=1$ and right if $x_c=0$", which is equivalent to "go right if $\mathcal{X} \neq c$, else go left". If $b_i<0$ or $b_i \geq 1$ then $f_i(x)$ is constant and any instance will always go left or right, respectively.

In traditional axis-aligned decision trees, a categorical feature is usually handled by a C-way split, i.e., as an equality test that sends the input instance to the cth child if $\mathcal{X}=c$.

Oblique Trees

The decision function takes the form $f_i(x)=\sum_{d=1}^{\mathcal{D}} w_d x_d + b_i$ (where some of the weights $w_d$ may be zero). The linear combination of the first C features, $\sum_{d=1}^{C} w_d x_d$, represents a table that maps category c to value $w_c$, because of the one-hot encoding. This agrees with what a function of the original categorical variable $\mathcal{X}$ would be able to do. Hence the dummy variables $x_c$ can be used freely in the tree construction, as if they were independent variables.

Piecewise Functions

We can also use dummy variables to parameterize a single continuous (not categorical) feature as a vector with the goal of defining a piecewise function. Let $\mathcal{X} \in \text{dom}(\mathcal{X}) \subseteq \mathcal{D}$ (for example, dom($\mathcal{X}$) could be a collection of intervals), and let $\{S_i\}_{i=1}^n$ be a partition of dom($\mathcal{X}$). Define a vector of n dummy variables $x=(x_1, \ldots, x_n)^T$ s.t. $x_i=\mathcal{X}$ if $\mathcal{X} \in S_i$ and $x_i=0$ if $\mathcal{X} \notin S_i$ for each i=1, ..., n. This allows us to define a piecewise function of $\mathcal{X}$ (i.e., a function where each piece is of the form "h($\mathcal{X}$)=$h_i(\mathcal{X})$ if $\mathcal{X} \in S_i$") in a way that is transparent to the decision tree (or indeed to any other model using $\mathcal{X}$). All we have to ensure is that the vector x is used consistently with its definition so it corresponds to a single $\mathcal{X}$ value (this is guaranteed to happen if we construct x from $\mathcal{X}$, as we would do if encoding a given dataset). The resulting piecewise function can be used in a decision node or a leaf predictor, and learned with TAO. For example, for $\mathcal{X} \in \mathbb{R}$, define $x=(x_1, x_2)^T$ on the partition $(-\infty, 0) \cup [0, \infty)$ (negative and positive parts of $\mathcal{X}$). Then a linear combination $w^T x = w_1 x_1 + w_2 x_2$ defines the piecewise linear function $w_1 \mathcal{X}$ if $\mathcal{X}<0$ and $w_2 \mathcal{X}$ if $\mathcal{X} \geq 0$. This is particularly useful to learn a nondifferentiable function, such as $|X|$ ($w_1=-1$, $w_2=1$) or max($\mathcal{X}$, 0) ($w_1=0$, $w_2=1$), which is otherwise difficult for many models if operating directly on $\mathcal{X}$. The $x_i$s can be combined with other features freely. For this to be useful, we need to know ahead of time the partition of the variable $\mathcal{X}$; this may be possible in some applications to incorporate prior information.

Manufactured Features

Another common technique in machine learning is to add new features that are fixed functions of the original features, such as $x_1^2$, $x_1 x_2$ or log $x_1$. This is particularly useful if the decision functions are simple (axis-aligned or linear).

8.13 Useful Heuristics

The following heuristics may be useful sometimes. They generally change the training time but also the resulting tree, so they should be used with care.

8.13.1 Choice of Surrogate Loss in the Decision Node Optimization

In order to solve approximately the decision node optimization of section 7.3, which is in general NP-hard, we replace the 0/1 loss with a surrogate loss that is easier to optimize. This choice will depend on the model at the node. For linear models, the logistic (cross-entropy) or hinge loss are convenient, since they produce convex problems and can be efficiently optimized with existing algorithms. Other options are the squared loss, squared hinge loss, exponential loss, etc.

8.13.2 Inexact Node Optimization

It is a well-known fact in numerical optimization that solving a subproblem approximately rather than exactly can greatly reduce the runtime of the overall problem. With TAO, this applies in the node optimization, both for leaves and decision nodes. One approach is to use stochastic optimization (e.g. some form of SGD) and limit the number of passes over the reduced set.

For axis-aligned nodes, the exact solution involves trying all possible features and, for each feature, all possible bias values (midpoints between training instances). This can be sped up with little accuracy loss by, for example, trying only a small sample of the bias values (and indeed this is done with CART-type algorithms). For oblique nodes, where the node optimization involves training a surrogate linear classifier, this can be done by limiting the number of iterations or the desired accuracy in the surrogate optimizer (e.g. LIBLINEAR).

8.13.3 Accepting Node Updates that Increase the Objective Function

The approximate solution of the decision node optimization of section 7.3 may have a higher value of the objective function than the current parameters at the node (from the previous TAO iteration). This typically happens in later TAO iterations, close to convergence, when it becomes harder to improve over the current model. It can also happen at a leaf if the predictor model is trained approximately or via SGD, whose iterates do not monotonically decrease the objective. It is always possible to guarantee a monotonic decrease in TAO by simply rejecting updates that do not decrease the objective and leaving the node parameters unchanged; they may change at a later iteration. However, a simpler option that we prefer is to accept the update always. This is faster, because we need not evaluate the objective to verify it has decreased, and may allow the algorithm to explore more solutions (since the problem is NP-hard). With large datasets, using some version of SGD is necessary to reduce training time anyway, which means we have to accept updates that increase the objective (occasionally and slightly). If accepting all updates, the stopping criterion is simple: we run TAO for a set number of iterations.

8.13.4 Aggressive Pruning

Strictly defined as in section 8.6, we only prune subtrees whose reduced sets are pure (all instances have the same ground-truth class) or empty. We can relax this definition to be slightly more aggressive and learn smaller trees. We prune subtrees for which the number (or relative proportion) of instances in the reduced set is less than a threshold, or for which the number (or relative proportion) of instances of the same class is greater than a threshold. Conservatively used, this helps to find trees that can be quite smaller at a small increase of the loss.

After pruning aggressively, the resulting tree should be retrained with TAO, because the objective may be slightly reduced.

8.13.5 Approximate Don't-Care Sets

Consider a decision node i. Strictly defined, a don't-care instance has the same loss no matter which child of i it is sent to. This means that don't-care instances will only be likely to happen with classification problems using the 0/1 loss, where the possible loss values are finite, and to some extent with the hinge loss (which varies continuously but for which some instances may result in exactly a zero loss). Don't-care instances can also happen in K-class classification with any loss (even the cross-entropy, which varies continuously) if the decision node's subtree does not contain a class k in any leaf: the reduced-set instances from class k will be don't-care. This can be caused by using C-class classifiers at each leaf with C<K. With problems where the loss changes continuously, such as regression or dimensionality reduction, don't-care instances will nearly never happen. In short, in some tasks we may never have strict don't-care instances, but we may still want to consider some instances as approximately don't-care. We can relax the definition so that an instance is don't-care if the difference between the biggest and smallest loss (over all children) is smaller or equal than a user parameter $\eta \geq 0$. This is shown in the pseudocode for TRAIN-DECISION (FIG. 8) as "if $\max_i(l) - \min_i(l) > \eta$". Setting $\eta=0$ recovers the strict definition. This has the obvious advantage that optimizing over the node is faster (there are fewer instances) and that we can define don't-care instances beyond 0/1 loss classification problems. It should work quite well if there are instances for which the loss down each child is about the same, i.e., such instances "don't care much".

8.13.6 Removing Classes from a Leaf

Consider a K-class classification tree where each leaf is a linear softmax classifier (or some other multiclass classifier) that can output each of the K classes. In order to get sparser trees, it may be convenient to limit the number of classes that each leaf can predict. This can be done by defining the optimization problem accordingly (the leaf models and the regularization term on the leaves) and letting TAO optimize that. But it can also be done directly by removing parameters from the softmax classifier so that it can only output a subset of classes. This can be done during a TAO iteration (when optimizing over a leaf), or at the end, as part of an aggressive pruning, by removing classes for which the number (or relative proportion) of instances is smaller than a threshold. This also handles the situation where some classes are not represented in the reduced set at a leaf (an extreme case being a pure leaf). Note that these operations do not affect the reduced set, they only affect the leaf model (from which we remove parameters). It is a form of model selection.

Conservatively used, this has the advantage that the tree has fewer parameters at a small increase of the loss. But, in addition, it can actually improve the tree overall and even reduce its loss, because it puts pressure on the decision nodes to find a good partition of the training data.

8.13.7 Retraining after TAO Finishes

In some special situations, it is helpful to retrain a tree. One is after modifying the tree so that the training loss changes, as with aggressive pruning (mentioned above). Another is if using a regularization term that produces shrinkage, such as the $\ell_1$ norm, as follows. First, we use TAO to train the tree as usual with the $\ell_1$ regularization term. At the end (and after pruning), we train the tree again but without the regularization term and having each node use only the instance features associated with nonzero weights (i.e., leaving as zero the weights that were zero). This will typically reduce the training error a bit without creating any new nonzero weights. This procedure is commonly used with the Lasso.

8.13.8 Should One Encourage Balanced Splits?

Some CART-type algorithms force, or encourage, each split in the tree to be approximately even (i.e., to have each child receive about the same number of instances), so the resulting tree is balanced. With such algorithms, which are greedy and cannot modify a node once it is split, such heuristic can sometimes be useful to get a better tree. However, the structure of the tree should be dictated by the data, and the best trees need not be balanced. With TAO, which can monotonically decrease the objective function, there is no need (and, unless there is a very good reason, it is not recommended) to force the nodes to achieve balanced partitions of their reduced sets.

9 More Tree Optimization Problems that can be Solved with TAO

Section 4 showed how to optimize problems of the form (eq. 4) using TAO. This already enlarges significantly the class of machine learning tasks and node models that now can be handled when learning trees, compared to traditional CART-type algorithms. But there are other types of problems involving decision trees that can also be solved with TAO, possibly in combination with other algorithms. We show how in this section. First, we explore in more depth the possibilities offered by the regularization or constraint terms to control in various ways the tree to be learned, as suitable for different data modeling applications (section 9.1). Second, we show how the assumptions of section 4.3 about instance and node additivity and private parameters can be relaxed so that TAO is applicable (section 9.2). Third, we show how to use TAO to solve a much wider variety of problems involving the parameters of a fixed-structure tree by using standard reformulations of the optimization problem (section 9.3).

9.1 Regularization Via Penalty Terms or Constraints

Regularization via a penalty or constraint is widely used in machine learning and statistics in order to encourage certain type of models to be learned. TAO can use any regularization penalty or constraint in eq. 4 as long as it applies separately to each node (node additivity assumption in section 4.3). Cleverly used, such regularization allows one exquisite control over the type of tree learned. We discuss some examples; many of them assume oblique trees.

9.1.1 Restricting the Set of Features at Each Node

Assume an input instance has $\mathcal{D}$ features, and that for each node i we can only use a known subset of features $\mathcal{F}_i \subset \{1, \ldots, \mathcal{D}\}$. Restricting which features can be used at a node is trivial: during training, we only use the features in $\mathcal{F}_i$ (equivalently for an oblique node, we set to zero the weights of the features that are not in $\mathcal{F}_i$). This is useful in two very different situations. The first one is in special applications where it may be of interest to use certain features in, say, nodes near the root, and other features in nodes near the leaves, usually because we want an interpretable model, or because there are natural groups in the features. This requires manually selecting the set of features $\mathcal{F}_i$ to use at each node i. The second situation is in constructing forests (ensembles of trees), where each tree is trained independently using TAO. We can force each tree, or each node in each tree, to use a different subset $\mathcal{F}_i$ containing $m<\mathcal{D}$ features (selected independently and at random for each tree or node, and kept fixed during training) This introduces diversity in the forest, which (suitably tuned) tends to improve the prediction accuracy of the forest. This same technique is used in random forests.

9.1.2 Restricting the Number of Features at Each Node: $\ell_p$ Norms

A particularly useful and well-known case is that of sparsity regularizers, which encourage the parameters of the node to contain few nonzero values (which in turn makes the model simpler and possibly more robust); it is also commonly used for feature selection. A large amount of theoretical and computational results have been developed in the last decades for sparse learning, mostly with linear models. TAO can reuse existing sparse optimization algorithms to solve the optimization problem at a decision node or leaf. This makes various penalties and constraints based on $\ell_p$ norms and combinations thereof available for use with trees, notably ridge regression ($\ell_2^2$), the Lasso ($\ell_1$) and its generalizations such as the elastic net ($\ell_1 + \ell_2^2$), the group Lasso (sums of unsquared $\ell_2$ penalties), the fused Lasso, and others.

The $\ell_1$ regularizer was already used in the "sparse oblique trees," with the form "$\alpha \sum_{i \in \mathcal{D}} \|w_i\|_1$". It leads to sparsifying the nodes' weight vectors and to pruning the tree.

The $\ell_0$ norm (defined as the number of nonzero elements of a vector) is especially interesting with trees. By constraining "$\|w_i\|_0 \leq k$" at an oblique node i we effectively force node i to use at most k features from the input instance x, which can be useful to make the tree more interpretable. As in section 8.9, we can construct a regularization path over $\kappa \in [0, \mathcal{D}]$. Although $\ell_0$-constrained optimization problems are usually NP-hard, many algorithms (such as iterative hard thresholding) have been developed in the literature of sparse learning and compressed sensing to solve them approximately and efficiently. The case k=1 produces the traditional axis-aligned (univariate) trees, which can be solved by enumeration, as mentioned in section 7.1.

9.1.3 Penalizing the Number of Nodes in the Tree

Consider a very simple penalty which appears not to have been used in machine learning before as model regularizer. We call it the $\delta$-penalty (or 0/1 penalty), since it is the delta function of a vector $w \in \mathbb{R}^D$:

$$\delta(w) = \begin{cases} 0, & w = 0 \\ 1, & w \neq 0. \end{cases}$$

This is different from $\|w\|_0$, which is the number of nonzeros in w. Instead, $\delta(w)$ is zero if all elements of w are zero and one otherwise. We then use a regularization term in eq. 4 of the form "$\alpha \sum_{i \in \mathcal{D}} \delta(w_i)$". This counts the number of "active" decision nodes in the tree, each with a cost $\alpha$, hence penalizing it aims at reducing the number of nodes altogether in the tree.

TAO handles this very easily. Since the regularization term separates additively, it appears in each decision node optimization as a term "$\alpha \delta(w_i)$". Solving the corresponding problem over node i is done exactly by picking the better of two options: the solution with $w_i=0$, and the solution for $w_i$ without the penalty. Essentially, this is like asking whether not using that node is preferable to using it.

The $\delta$-penalty can be combined with the $\ell_1$ or $\ell_0$ regularizers. One important case is with axis-aligned trees: using the constraint $\|w_i\|_0 \leq 1$ and the $\delta$-penalty makes it possible to prune such trees. (Note that the $\ell_1$ regularizer is useless with axis-aligned trees, since $\|w_i\|_1 = 1$ for each i and so the regularizer is constant.)

9.1.4 Restricting the Number of Classes in a Leaf

With K-class classification problems, particularly if K is large, it is useful to control the number of classes that a leaf can predict (see also "removing classes from a leaf" in section 8.13.6). This can be done with a suitable regularization penalty or constraint, depending on the leaf classifier.

For example, it the classifier is simply a constant histogram $\theta_i$ (a K-dimensional vector giving the probability of each class at that leaf), constraining $\|\theta_i\|_0 \leq C$ means only C classes may be predicted. The leaf optimization is very simple: we construct the class histogram of the leaf's reduced set, zero all bins except the top C bins, and renormalize it; in the particular case C=1, this is the same as assigning a constant label to the leaf (the majority label). With a linear softmax classifier, we can use the group Lasso.

If the classifier can only handle C classes (say, a C-class softmax classifier, or C=2 for a logistic regression), but the leaf's reduced set contains K>C classes, the optimal classifier will select only C of the K classes. A good approximation to this is to pick the top C classes (in number of instances) and fit the classifier to them. An exact solution can be found by trying all $$\binom{K}{C}$$

combinations, but is most likely worth the computational cost.

9.1.5 Regularization Dependent on the Reduced Set Size

The TAO optimization of decision trees has a unique behavior: the size of the reduced set at a given node i changes over iterations, which means that the effect of (say) a regularization term $\alpha \|\theta_i\|_1$ on the model of node i is inversely proportional to the number of instances in its reduced set $\mathcal{R}_i$ (or care set $\mathcal{R}_i'$), as can be seen from eq. 10 or 12. This has the effect of making nodes more and more sparse as one goes from the root (whose reduced set is largest) towards the leaves (whose reduced set is smallest). For example, if each decision node bipartitions its reduced set, then a node at depth d will have a reduced set of size $N2^{-d}$, which decreases quickly with d.

In general, we may want to control how sparsity operates over different nodes in the tree. We can do this easily by making the regularization term (or constraint) dependent on the size of the reduced set (or care set). For example, we can define the tree objective function as $$E(\Theta) = \sum_{n=1}^{N} L_n(T(x_n; \Theta)) + \alpha \sum_{i \in \mathcal{N}} h(|\mathcal{R}_i'|)\phi_i(\theta_i) \qquad \text{Equation 19}$$

where $|\mathcal{R}'_i|$ is the number of elements in the set $\mathcal{R}'_i$ and h(t) could be, for example, h(t)=$t^a$ (with a∈ ℝ ). Note that the above equation is well defined because $\mathcal{R}'_i$ is a function of the tree parameters Θ. The reduced problem at a decision node i is then:

$$\min_{\theta_i} E_i(\theta_i) = \sum_{n \in \mathcal{R}'_i} l_{in}(f_i(x_n; \theta_i)) + \alpha h(|\mathcal{R}'_i|)\phi_i(\theta_i) \quad \text{Equation 20}$$

and we obtain a similar expression for the reduced problem over a leaf. By dividing the right hand side of eq. 20 by $|\mathcal{R}'_i|$, we see that this now has an equivalent per-point regularization weight of $\alpha h(|\mathcal{R}'_i|)/|\mathcal{R}'_i|$. We can see the behavior this produces in the case of $\phi_i(\theta_i)=\|\theta_i\|_1$. Firstly, α controls the "overall sparsity budget", in that α=0 means no node is sparse, and a large enough α means all nodes are sparse ($\theta_i$=0 for every i). Second, h controls the distribution of this sparsity budget over the nodes. Specifically for h(t)=$t^a$, the per-point penalty is $(\alpha|\mathcal{R}'_i|^{a-1})\|\theta_i\|_1$, and we have:

- a=0: node i has a penalty $(a/|\mathcal{R}'_i|) \|\theta_1\|_1$, so nodes with smaller reduced sets (deeper in the tree) have a higher sparsity penalty.
- a=1: node i has a penalty $\alpha\|\theta_i\|_1$, so any node (no matter where in the tree) has the same sparsity penalty; the sparsity is uniformly distributed across the nodes.
- a=2: node i has a penalty $\alpha|\mathcal{R}'_i| \|\theta_i\|_1$, so nodes with smaller reduced sets (deeper in the tree) have a lower sparsity penalty.

9.1.6 Restricting the Structure of the Tree

The fact that TAO works on a tree of given structure makes it possible to impose constraints on the tree structure easily. For example, the depth and number of nodes are obviously constrained to be no larger than those of the initial tree. Besides, we can impose certain connectivity structure. For example, we can define a tree where each decision node (except the last one) has a leaf child and a decision node child; this, sometimes called a decision list, corresponds to a tail-recursive set of decision rules, such as "IF $f_1(x) \geq 0$ THEN class-A ELSEIF $f_2(x) \geq 0$ THEN class-B ELSE class-C". As another example, we can make the root be a multiway decision node in an otherwise binary tree, in order to do a quick split of the space into regions and have a binary tree specialize in each region. Or we can generate random tree structures, which provide a diversity mechanism to construct tree ensembles.

9.1.7 Constraints on the Tree Predictive Function

In some applications, it is convenient to constrain the model prediction in various ways. For example, in regression, we may want the output to be nonnegative (say, if the prediction is the age of a person or the price of an item) or to be an integer (say, a score in 1 to 5). Learning fair models (e.g. to avoid discriminating against a protected class) is sometimes based on applying certain constraints on a classifier. For this to hold, such constraints must be enforced during the training of the model. This can make the optimization very hard for other models, such as neural nets or kernel SVMs, but it can be surprisingly simple with decision trees. Since the tree prediction occurs at the leaves, then during training with TAO such constraints apply in the leaf optimization only. And, since the leaf predictor is typically a simple model, solving such constrained optimization is usually easy. For example, if the leaf predictor is a constant value, then the least-squares regression solution is the largest of zero and the average of the data. Some constraints on the tree predictive function couple the optimization over all the leaves, for example if we require the output to be an increasing function of the input. Still, this may be solvable in some cases.

9.2 Relaxing the TAO Assumptions

In section 4.3 we made the following assumptions about the tree optimization eq. 4:

A1: instance additivity: The loss term separates additively over the N training instances: $\Sigma_{n=1}^N L_n (T(x_n; \Theta))$.

A2: node additivity: The regularization term separates additively over the nodes of the tree: $\Sigma_{i \in N} \phi_i(\theta_i)$.

A3: private parameters: The parameters are not shared across nodes: i, j∈ N, i≠j ⇒ $\theta_i \cap \theta_j = \emptyset$.

We show how each of these can be relaxed so that TAO can be applied. The idea is to introduce auxiliary variables to decouple terms in the problem as needed. The resulting optimization algorithm has extra overhead, but it should be manageable.

9.2.1 Relaxing Instance Additivity

Most loss functions in machine learning have the form of a sum of terms, one per training instance, as in eq. 4, but sometimes one uses losses involving pairs (or triplets) of instances. Consider a problem of the form:

$$E(\Theta) = \sum_{n,m=1}^N L_{nm}(T(x_n; \Theta), T(x_m; \Theta)) + \alpha \sum_{i \in N} \phi_i(\theta_i). \quad \text{Equation 21}$$

Typically, $L_{mn}$, is nonzero only for a subset of all instance pairs, and has the meaning of a distance between the tree predictions for instances n and m. Losses of this form have been widely used in dimensionality reduction (sometimes called "parametric embeddings) and in neural nets (sometimes called "siamese networks").

We can reformulate this problem so that it can be solved using TAO. To do this, we recognize that the loss is a nested function and use the method of auxiliary coordinates (MAC). The key idea is to introduce auxiliary "coordinates" (variables) and turn the original problem involving a nested function into a constrained problem without nesting, which can then be solved with a penalty method and alternating optimization over the original parameters and the auxiliary coordinates. MAC was originally designed to be able to learn nested functions involving nondifferentiable functions such as decision trees, where the chain rule cannot be applied to compute gradients of the nested function.

We define an auxiliary coordinate vector $z_n$=T($x_n$; Θ) for each instance, which captures the output of the tree for the instance (in dimensionality reduction this is usually the low-dimensional projection of high-dimensional instance $x_n$). We rewrite the problem as the following constrained problem:

$$\min_{\Theta, Z} \sum_{n,m=1}^N L_{nm}(z_n, z_m) + \alpha \sum_{i \in N} \phi_i(\theta_i) \text{ s.t. } z_n = T(x_n; \Theta), \quad \text{Equation 22}$$

$$n = 1, \ldots, N.$$

To optimize this, we apply a penalty method such as the quadratic-penalty method (or the augmented Lagrangian) and minimize $$\min_{\Theta, Z} \sum_{n,m=1}^{N} L_{nm}(z_n, z_m) + \alpha \sum_{i \in N} \phi_i(\theta_i) + \frac{\mu}{2} \sum_{n=1}^{N} \|z_n - T(x_n; \Theta)\|^2 \quad \text{Equation 23}$$

as $\mu \to \infty$. Finally, we minimize this by alternating one step over $\Theta$ and one step over Z, and this gives the actual iterative algorithm we run. The step over $\Theta$ involves only the terms on $\alpha$ and $\mu$ and satisfies the assumptions of section 4.3, where the "loss" is the $\mu$ term, additively separable over training instances (effectively, a least-squares regression problem on a training set $\{(x_n, z_n)\}_{n=1}^{N}$). Hence it can be solved with TAO. The step over Z takes the form of a regularized nonlinear embedding and can be solved efficiently with existing algorithms.

A second formulation that may be more convenient follows from replacing only one of the arguments in the loss function. We rewrite the problem like this:

$$\min_{\Theta, Z} \sum_{n,m=1}^{N} L_{nm}(z_n, T(x_m; \Theta)) + \alpha \sum_{i \in N} \phi_i(\theta_i) \text{ s.t. } z_n = T(x_n; \Theta), \quad \text{Equation 24}$$

$$n = 1, \ldots, N.$$

again apply a penalty method:

$$\min_{\Theta, Z} \sum_{n,m=1}^{N} L_{nm}(z_n, T(x_m; \Theta)) + \quad \text{Equation 25}$$

$$\alpha \sum_{i \in N} \phi_i(\theta_i) + \frac{\mu}{2} \sum_{n=1}^{N} \|z_n - T(x_n; \Theta)\|^2$$

and finally apply alternating optimization over $\Theta$ and Z. Over $\Theta$, we can apply TAO, as before. Over Z, the problem separates over each $z_n$, so the N problems can be solved in parallel, unlike in the previous formulation.

9.2.2 Relaxing Node Additivity

Consider the original eq. 4 but where the regularization term has the form $\phi(\Theta)$ instead of the additively separable form $\Sigma_{i \in N} \phi_i(\theta_i)$. One example of this would be a group Lasso sparsity constraint across multiple nodes. We can solve this in two different ways: directly, by having the node optimization problems in TAO not be independent; and indirectly, by introducing auxiliary variables that decouple the problem so that TAO is directly applicable but we have an additional step.

The direct approach is as follows. If we optimize over the parameters of a set of non-descendant nodes, the reduced sets of the non-descendant nodes do not depend on their parameters (they depend on the parameters of their ascendants, which are fixed). Hence, the only thing that changes in the reduced problem is that rather than having a separate problem for each node, we have a single problem over all nodes at once, consisting of the sum over all nodes of the $E_i(\theta_i)$ terms of eq. 10' or 12', but involving $\alpha\phi(\Theta)$, which couples all the nodes. This problem is a model fitting problem of several models each on its own training set (its reduced set) but with a regularization term that couples all the parameters. Depending on the case, it may be solved with the same algorithm we would use to optimize over each node separately possibly with minor adjustments), although obviously solving the joint problem coupling the nodes is harder than solving the individual, uncoupled problems.

The indirect approach is as follows. Let us introduce auxiliary variables that duplicate the parameters and rewrite eq. 4 as:

$$\min_{\Theta, U} \mathcal{L}(\Theta) + \alpha \phi(U) \text{ s.t. } \{\theta_i = u_i\}, i \in N \quad \text{Equation 26}$$

where $\mathcal{L}$ represents the loss, which is the term that involves the tree. Solving this constrained problem using a penalty method, such as the quadratic-penalty method (or the augmented Lagrangian), we minimize the following for $\mu \to \infty$:

$$\min_{\Theta, U} Q(\Theta, U; \mu) = \mathcal{L}(\Theta) + \alpha \phi(U) + \frac{\mu}{2} \sum_{i \in N} \|\theta_i - u_i\|^2 \quad \text{Equation 27}$$

which can be done by alternating optimization over the original parameters $\Theta$ and the auxiliary variables U. The step over $\Theta$ now satisfies assumption A2: the $\mu$ term separates over the nodes and can be seen as a separable regularization penalty; and the $\alpha$ term is constant so it can be ignored. Hence this step can be solved with TAO as usual. The step over U has the form:

$$\min_{U} \alpha \phi(U) + \frac{\mu}{2} \sum_{i \in N} \|\theta_i - u_i\|^2 \quad \text{Equation 28}$$

which does not involve the tree, and may be solved as appropriate. Compared to the direct approach, the indirect approach does not require modifying TAO but it introduces the overhead of the step over U.

9.2.3 Relaxing Private Parameters

Consider the original problem eq. 4, but where the nodes share parameters, for example two nodes i and j could have $\theta_i = \theta_j$. Sharing parameters is often used in machine learning to keep the number of parameters small if the training set is small, or with certain models such as convolutional neural nets. Learning trees with shared parameters can be solved similarly to the previous section, in a direct or indirect approach. The direct approach is, again, to solve a joint problem over a set of non-descendant nodes (coupled because of the shared parameters) rather than separate problems. The indirect approach is, again, to introduce auxiliary variables (which in this case are sometimes called consensus variables). Let us illustrate this in the case where a certain parameter $\theta \in \mathbb{R}$ is shared by several nodes $j \in S$, where $S \in N$ is a set of nodes (that is, $\theta \in \theta_j$ if $j \in S$). We reformulate the problem as follows. For each $j \in S$, we replace $\theta$ with a separate "replica" $\theta_j$ and add a constraint $\theta_j = u$, where u is the consensus variable. Another way to see this reformulation is that sharing a collection of parameters $\{\theta_j\}_{j \in S}$ can be seen as taking the original eq. 4, and adding a collection of constraints of the form $\theta_j = u$ for each $j \in S$.

Then we proceed as in the previous section to optimize this constrained problem: we apply a penalty method and optimize it alternating two steps: one over the original parameters and replicas, and the other over the consensus variable. The former step trains a tree without shared parameters (on the original parameters and the replicas $\{\theta_j\}_{j \in S}$) to minimize the objective function $E(\Theta)$ with a quadratic penalty term $\mu \Sigma_j (\theta_j - u)^2$ (with penalty parameter $\mu$). This step can be done with TAO. The latter step optimizes over the consensus variable, and has a closed-form solution given by the average of the replicas $\{\theta_j\}_{j \in S}$. In general with multiple groups of shared parameters, we use a consensus variable for each (and corresponding replicas and constraints). The resulting algorithm is simple and introduces only a small overhead of having to update the consensus variables.

9.3 Other Optimization Problems where TAO is Applicable

Finally, we show how to use TAO to solve even more complex problems, where the tree predictive function appears in a constraint or as a nested subexpression. Again, the idea is to reformulate the problem via auxiliary variables, apply a penalty method and then alternating optimization over the original parameters and the auxiliary variables.

9.3.1 The Tree in a Constraint

Consider, by way of illustration, the following optimization problem:

$$\min_{\Theta,\Psi} F(\Theta, \Psi) \text{ s.t. } y_n = T(x_n; \Theta), n = 1, \ldots, N. \quad \text{Equation 29}$$

We apply the quadratic-penalty method (or augmented Lagrangian) and solve a sequence of problems for $\mu \to \infty$ of the form:

$$\min_{\Theta,\Psi} Q(\Theta, \Psi; \mu) = F(\Theta, \Psi) + \frac{\mu}{2}\sum_{n=1}^{N}\|y_n - T(x_n; \Theta)\|^2 \quad \text{Equation 30}$$

which now can be solved using TAO as described earlier. If the constraint is an inequality, such as $y_n \leq T(x_n; \Theta)$, we introduce slack variables and replace this with an equality constraint $s_n = T(x_n; \Theta) - y_n$, and a bound inequality $s_n \geq 0$.

9.3.2 The Tree in a Nested Subexpression

Consider the following optimization problem:

$$\min_{\Theta,\Psi} \sum_{n=1}^{N} L_n(T(F(x_n; \Psi); \Theta)) + \alpha\sum_{i\in\mathcal{N}}\phi_i(\theta_i) + \beta\phi(\Psi). \quad \text{Equation 31}$$

The motivation for this problem is to learn jointly a transformation F of the input features and a tree predictive function operating on the transformed features. This problem is difficult because, even if F is differentiable, we cannot use gradients via the chain rule because the tree is nondifferentiable. This is a prime example of the applicability of the method of auxiliary coordinates (MAC) mentioned earlier. We decouple the nesting by introducing an auxiliary coordinate vector $z_n = F(x_n; \Psi)$ for each instance, which represents the transformed features. We rewrite the problem as the following constrained problem:

$$\min_{\Theta,\Psi,Z} \sum_{n=1}^{N} L_n(T(z_n; \Theta)) + \alpha\sum_{i\in\mathcal{N}}\phi_i(\theta_i) + \beta\phi(\Psi) \quad \text{Equation 32}$$
$$\text{s.t. } z_n = F(x_n; \Psi), n = 1, \ldots, N.$$

We then apply the quadratic-penalty method (or augmented Lagrangian) and solve a sequence of problems for $\mu \to \infty$ of the form:

$$\min_{\Theta,\Psi,Z} Q(\Theta, \Psi, Z; \mu) = \quad \text{Equation 33}$$
$$\sum_{n=1}^{N} L_n(T(z_n; \Theta)) + \alpha\sum_{i\in\mathcal{N}}\phi_i(\theta_i) + \beta\phi(\Psi) + \frac{\mu}{2}\sum_{n=1}^{N}\|z_n - F(x_n; \Psi)\|^2.$$

Finally, we optimize this via alternating optimization over the original parameters ($\Theta$, $\Psi$) and the auxiliary coordinates Z, resulting in the following two steps:

Over ($\Theta$, $\Psi$), this separates into two independent subproblems:

$$\min_{\Theta} \sum_{n=1}^{N} L_n(T(z_n; \Theta)) + \alpha\sum_{i\in\mathcal{N}}\phi_i(\theta_i), \quad \text{Equation 34}$$

which has the standard form eq. 4 and can be solved with TAO, and $$\min_{\Psi} \beta\phi(\Psi) + \frac{\mu}{2}\sum_{n=1}^{N}\|z_n - F(x_n; \Psi)\|^2, \quad \text{Equation 35}$$

which has the standard form of a model fitting of F to a training set $\{(x_n, z_n)\}_{n=1}^{N}$, which can be solved using existing algorithms for this type of model.

Over Z, this separates into N independent subproblems, each of the form:

$$\min_{z_n} L_n(T(z_n; \Theta)) + \frac{\mu}{2}\|z_n - F(x_n; \Psi)\|^2, \quad \text{Equation 36}$$

which can be solved exactly in some cases by simply solving over $z_n$ for each leaf predictor model of the tree and picking the one having the lowest objective value (a "tree-leaves projection" algorithm).

In summary, the resulting MAC algorithm alternates between fitting a tree T and a transformation F to the current auxiliary coordinates, and updating each coordinate given the tree and transformation.

If instead we consider a nested subexpression of the form $F(T(x_n; \Theta); \Psi)$ (where we first apply the tree to the instance and then apply F), we can still apply MAC and derive a corresponding iterative algorithm (where one step will be solved by TAO). But a better way is to define the problem differently: we apply a separate mapping $F_i$ to each leaf of the tree, i.e., $F_i$ is the predictor for leaf i. This problem can then be solved directly with TAO without the need for auxiliary variables (the optimization over the $F_i$ functions will happen in the leaf optimization).

10 Applying TAO to Machine Learning Problems

Traditionally, decision trees have remained a second-class citizen in machine learning and statistics compared to, say, kernel machines and neural nets, which have seen widespread development thanks to the existence of effective optimization algorithms. The applicability of decision trees has been limited to classification and regression only, and the types of node models have remained very simple. The trees that are implemented by most statistical and machine learning packages (commercial or academic) are nearly exclusively axis-aligned trees with constant leaves. This includes, SCIKIT-LEARN, TENSORFLOW, XGBOOST, WEKA, MATLAB, SAS, SPSS, RAPIDMINER, MICROSOFT SQL SERVER ANALYSIS SERVICES and RULEQUEST RESEARCH.

TAO can train decision trees effectively for quite general learning problems. In fact, all that we need to be able to apply TAO to optimize a regularized loss over a tree is to be able to solve the corresponding node optimization subproblems (approximately, at least). In turn, these involve being able to learn on its own a binary classifier or predictor model at the decision nodes or leaves, respectively. This is doable for many types of node models, loss functions and regularizers.

Not only does TAO produce much better trees in traditional scenarios (axis-aligned or oblique trees for classification and regression), but it makes it possible to apply trees to many new scenarios. These can involve:

- Different loss functions for classification, regression and beyond, such as semisupervised learning, dimensionality reduction or structured inputs.
- Different regularization terms, such as those inducing sparsity.
- Different types of models at the decision nodes and leaves, such as kernel machines, neural nets, or even trees themselves—essentially, any machine learning model as long as the node optimization problem can be (approximately) solved. The models may even be of different types within the same tree, say a linear SVM at the root and kernel SVMs in its children.
- Ensemble learning, e.g. forests made of trees trained with TAO.
- Using TAO as a generic optimization method for trees, as part of another algorithm, e.g. in an inner-loop optimization initialized from a given tree (warm-start).

This opens the door, for the first time, to applying to decision trees (and their combination with other models) the vast amount of optimization techniques that have been extensively studied in machine learning in recent decades and exploited for practical success, such as convex and nonconvex optimization, sparse learning, or large-scale learning algorithms such as SGD.

10.1 Classification and Regression

Classification and regression can be defined via different losses, such as the 0/1 loss, logistic (cross-entropy) or hinge loss for classification, or the squared error or absolute deviation for regression (see section 4.2.1). Each of these can be optimized with TAO. Note that a hard decision tree can perfectly have probability models as leaf predictors and hence it can provide an estimate of the uncertainty in its predictions. For classification, the simplest decision trees have a constant classifier at the leaves, but we can instead output the class distribution at each leaf, have a linear classifier with softmax outputs, or have any other classifier that outputs a probability distribution over the classes.

10.1.1 ROC Curve for a Binary Classification Tree

An ROC curve gives the response of a binary classifier in terms of its false positive rate (FP) and true positive rate (TP), obtained by varying its decision to pick class 1 if $p(1|x) > \theta$ where $\theta \in [0,1]$ is a threshold. The curve is obtained by tracing all values of the threshold. This is useful in practice to tune a classifier for best performance, and also to compute the area under the curve (AUC), which is commonly used to compare different classifiers.

Traditionally, a decision tree outputs a deterministic class label rather than a posterior probability over all labels. This means their ROC curve reduces to a single point in the (FP,TP) space, no matter the value of the threshold. This makes ROC curves of little use. TAO makes it possible to learn trees whose leaves have an arbitrary class-conditional model, such as a logistic regressor, and hence makes ROC curves useful again. In fact, ROC curves for trees are more flexible than for non-tree models: we can use the same threshold $\theta \in [0,1]$ in each leaf, or a separate threshold $\theta_i \in [0,1]$ in each leaf i.

The ROC curve for a classifier can be constructed exactly by noting that the curve consists of N+2 points, one per training instance plus the curve ends at (0,0) and (1,1). All we need to determine these points is the posterior probability $p(1|x_n)$ for each instance $n=1, \ldots, N$. This is easily modified for a tree by noting that we have one posterior probability model $p_i(1|x)$ per leaf i, and this model applies only to the instances $x_n$ in the leaf's reduced set $\mathcal{R}_i$. Hence, the ROC curve also has N+2 points.

10.1.2 K-Class Classification Problems

TAO has the remarkable property that the size of the model at the leaves can vary during training because only a subset of the classes may appear in the reduced set of a given leaf. This means TAO may learn compact models where perhaps decision nodes achieve a coarse-to-fine partition of groups of classes and leaves specialize on certain subsets of classes. This can be very useful when K is very large.

A particularly interesting kind of K-class tree classifier is obtained by using binary classifiers at the leaves, such as logistic regression or an SVM (this requires we have at least [K/2] leaves). This gives a better alternative to one-vs-one and one-vs-all classifiers, potentially of higher accuracy with fewer classifiers and much faster inference. This is because the one-vs-*classifiers use predetermined training sets to learn each binary classifier (for example, a pair of classes in the one-vs-one case). However, in the tree we describe these training sets are adaptively learned (they are the reduced sets of each node) with the goal of optimizing the loss. This will typically find better splits in the tree and will be able to make a prediction by evaluating a smaller number of binary classifiers. To train a binary classifier on a reduced set with K classes, see section 9.1.4.

10.1.3 Multiway Splits

TAO can train trees that are not binary, i.e., where the decision nodes have multiway splits. Multiway splits are not recommended generally because they reduce the number of points in each node too quickly and may not be easy to interpret. Besides, a multiway split can always be achieved by a series of binary splits. However, multiway splits can sometimes be useful, particularly in classification problems with many classes. For example, if it is easy to separate several groups of classes from each other (say, by hyperplanes), we can have the root node be a multiway split and separate such classes in one go, directing the groups of classes that are harder to separate down one (or more) child. This suggests that a tree whose decision nodes are all binary except the root, which is K-way, may be useful in K-class problems. We can apply a group Lasso penalty to the root in order to prune unneeded children.

10.2 Dimensionality Reduction

We can use decision trees in two well-known formulations of dimensionality reduction: autoencoders, and nonlinear embeddings such as t-SNE or the elastic embedding (EE). In both cases, we use the method of auxiliary coordinates (MAC), which has been successfully applied to train continuous and binary autoencoders and parametric embeddings for t-SNE and EE.

For autoencoders, we consider an encoder tree $T_e(x; \Theta_e)$ which projects a high-dimensional input instance $x_n$ onto a low-dimensional vector $z_n$, and a decoder tree $T_d(z; \Theta_d)$ which maps a low-dimensional vector z back to the high-dimensional input space. The autoencoder is trained to minimize the reconstruction error over a training set $\{x_n\}_{n=i}^{N}$ (with regularization terms on each tree, which we omit for clarity):

$$\min_{\Theta_e, \Theta_d} \sum_{n=1}^{N} L_n(x_n, T_d(T_e(x_n; \Theta_e); \Theta_d)). \quad \text{Equation 37}$$

Typically, the loss $L_n$ is the squared error. This problem has the form of a nested mapping as in eq. 31 and can be solved as described in section 9.3.2, i.e., with an iterative algorithm that alternates a step using TAO to train the encoder and decoder trees independently, and a step that updates the auxiliary coordinates.

Nonlinear embedding problems have the form of eq. 21, in terms of a pairwise loss, such as that of t-SNE or EE, and where the tree $T(x; \Theta)$ maps a high-dimensional input x to a low-dimensional projection. These problems can be solved as described in section 9.2.1, i.e., with an iterative algorithm that alternates a step using TAO and a step solving a standard nonlinear embedding. The latter can be solved with a number of algorithms, some of which scale to millions of instances.

Since dimensionality reduction is an exploratory task, the fact that decision trees can be interpretable models is useful; inspecting the tree may reveal important clues about the manifold structure of the data. Indeed, the ability of decision trees to model discontinuous mappings may be especially suitable with data that contains clusters.

10.3 Clustering, Quantization and Coding

Clustering is usually formulated as a nonparametric problem, as in k-means, where we simply find a partition of the training instances into groups. However, sometimes we want to learn a function that we can apply to a new instance x to predict its cluster. We can do this with a decision tree, so that its predictive function T (x; $\Theta$) outputs the cluster index for x. Using a tree has two important advantages: 1) the tree may likely be interpretable and provide an explanation of how x is clustered depending on its features; and 2) it learns a hierarchical clustering, i.e., a nested collection of clusters. This is often desirable in practice, but many algorithms (such as k-means) do not generate a hierarchical clustering. (We note in passing that any decision tree, whether trained in a supervised way or in any other way, yields as a subproduct a clustering of the input data, where each leaf and its corresponding reduced set is a cluster.)

For example, assume the problem is defined by a clustering objective function $E(\{z_1, \ldots, z_N\}, \Psi)$ into K clusters, where $z_n \in \{0,1\}^K$ is the assignment vector for instance $x_n$ (which is encoded as one-hot, i.e., it sums to 1), and $\Psi$ are other parameters (e.g. centroid locations in k-means). We then replace $z_n = T(x_n; \Theta)$ where T is a K-class classification tree, and optimize the problem jointly over all the parameters ($\Psi$, $\Theta$). Computationally, the problem can be solved using the ideas of section 9.2.1 and 9.3.2; in the resulting iterative algorithm, a subproblem involves training the tree T, which we solve with TAO. One can learn trees with other clustering objective functions in a similar way.

Quantization (vector or scalar) and coding are strongly related to clustering from a formal point of view, and indeed trees have a long history in such applications, where they can provide fast searches for large codebooks. We can learn a tree as for clustering, to minimize a desired distortion function. In this case, we use a regression tree with constant values at the leaves (the codebook vectors) and the root-leaf path defines the code of an instance. The size of the tree controls the distortion rate. TAO makes it possible to learn compact trees with low distortion rate.

10.4 Semisupervised Learning

In semisupervised learning (SSL), only a small subset of the input training instances have a label (for classification or regression). Many approaches have been proposed for SSL with models such as kernel machines, mixture models, Gaussian processes or neural nets, but not with decision trees. SSL with trees is potentially important for e.g. medical diagnosis of rare diseases, where we have few labeled data but much unlabeled data. One convenient way to do SSL with trees is the graph prior (manifold regularization) version of SSL, which is probably the most widespread one. Here, one combines the desired loss (classification or regression) over the labeled data with a term over the whole data (labeled or unlabeled) that encourages "similar" instances (defined via a similarity function) to have the same label. This effectively defines a graph where instances are vertices and weighted edges indicate similarity, and we seek a labeling that is smooth on that graph, and is produced by a decision tree. As in the parametric embedding case of section 10.2, we can use MAC to handle the tree; here, the auxiliary coordinates are the labels. The result is an algorithm that alternates between labeling the instances given the tree predictions (which can be solved as usual in SSL), and fitting a tree to the (instance, label) pairs using TAO.

10.5 Exploring the Space of Tree-Based Models 10.5.1 Sparse Linear Decision Nodes Sparsity of linear models is a huge research area that has been very successful in statistical learning (feature selection, interpretable models), signal processing (compressed sensing) and computer vision (dictionary learning, overcomplete representations). TAO makes it possible to apply this to decision trees. Specifically, we can promote sparsity via the $\ell_0$ or $\ell_1$ norm, in its penalty or constraint version, for which multiple effective algorithms exist (e.g. based on soft or hard thresholding, matching pursuit, etc.). TAO can learn such models for various machine learning tasks, such as (semi)-supervised learning or dimensionality reduction.

Sparse oblique trees can be seen as a nonlinear replacement for $\ell_1$-regularized linear models such as the Lasso. Like the Lasso, they are able to select a subset of the input features (so the rest are not used for inference), but in addition they are able to select specific features as a function of the input instance, and they define a nonlinear, K-class classifier.

10.5.2 Nonnegative Linear Decision Nodes: "Parts-Based" Trees

A particularly novel and interesting type of decision tree is one where we constrain the weights of each linear decision node to be nonnegative, which should produce decision trees that learn parts-based representations of the input. This may lead to particularly interpretable decision trees for problems such as recognition of digits, characters or faces—all objects that can be thought of as consisting of parts (strokes, facial features, phonetic features). The idea of using nonnegative parameters to learn parts was pioneered in the context of nonnegative matrix factorization and has been a fruitful research area. Computationally, constraining the weights to be nonnegative can be easily handled in the context of convex solvers for SVMs and logistic regression.

One particular case of this is when both the features $x_d$ and the weights $w_i$ at a node i's sparse linear decision function $f_i(x) = w_i^T x + b$ are binary in $\{0,1\}$, i.e., $f_i(x) = \Sigma_{d \in S_i} x_d + b$, where $S_i$ contains the indices of the nonzero weights in $w_i$. Then such a decision function can model rules of the form "IF −b or more features out of subset $S_i$ are present THEN go right". More generally, a linear decision function accumulates positive and negative weights based on the input features and goes right if the total exceeds the bias.

We can also apply nonnegativity constraints to groups of weights (if they are known in advance), and to constrain the sign of groups of weights.

10.5.3 Nonlinear Decision Nodes: Kernel SVMs and Structured Inputs (Strings, Graphs, Etc.)

One particularly convenient way to model a nonlinear decision node is with a kernel SVM, because of its modeling power and its ease of optimization, for which well-developed code exists, such as LIBSVM and LIBLINEAR. In fact, combining decision trees with linear and kernel SVMs may prove a useful model: we can place linear SVM nodes at and near the root, whose job is to route instances to specialized subtrees containing kernel-SVM nodes. This has two advantages: it provides a way to use different kernels in different areas of the input space, and it scales to training on large datasets (since the slower kernel SVMs are close to the leaves and hence are trained on smaller reduced sets).

A fundamental advantage of kernel methods is that they can operate on "structured inputs", such as strings or graphs, which do not have a natural representation as explicit feature vectors, but for which a similarity measure may be computed. For example, for strings this may involve finding the best alignment between two strings. We can use decision trees with structured inputs by having the nodes be SVMs using a suitably defined kernel, such as convolutional kernels, string kernels, locality-improved kernels, tree and graph kernels, etc. This enlarges the application of decision trees to text and natural language processing (e.g. text and sentence categorization), bioinformatics (e.g. biological sequence analysis, protein classification or drug discovery) or chemoinformatics (e.g. molecular function prediction). The interpretability of decision trees may be particularly useful in bioinformatics and chemoinformatics, where the decision tree may provide biological insight that other black-box approaches cannot.

10.5.4 Hybrids of Decision Trees and Deep Neural Nets

Recent years have seen an explosion of ever larger and more complex deep net architectures which have resulted in improved performance on various benchmarks Examples of such architectures include fully-connected and convolutional nets, e.g. LENET, ALEXNET and VGG; other architectures such as RESNETS or INCEPTION; and recurrent nets and LSTMs. Hard decision trees have somewhat complementary properties to deep nets, in particular interpretability and fast inference. By varying the relative complexity of the tree itself (depth and number of nodes) and of the nodes (neural nets with a certain architecture), there are many possibilities spanning the spectrum from pure, large trees with simple nodes to a single-node tree with a complex root (a deep net, which is the current state-of-the-art in classification accuracy). The complexity of each node's model will in turn be constrained by the size of the reduced set at each node. The resulting inference speed and interpretability will vary across this spectrum. The space of hybrids of decision trees and deep nets is huge. A particularly interesting one is as follows: we place a deep net at the root of the decision tree to extract features; we make the decision nodes be sparse oblique, which will be particularly effective if the deep net feature vector is high-dimensional; and we let the leaves be linear K-class (softmax) classifiers. (Another possibility is to have a forest rather than a single tree operate on the deep net features.) This has the following advantages: it capitalizes on the proven ability of a deep net to extract good features (especially convolutional nets); it improves parallelism during training, by having larger models at the leaves and smaller models at the decision nodes; and it may provide some reasonable interpretability in terms of the deep net features.

Being able to use parallel computation effectively during deep net training has been a long-sought goal in deep learning. This is difficult because 1) the established training algorithm for deep nets, SGD, is inherently sequential and is most effective with relatively small minibatches; and 2) evaluating a deep net or its gradient on an input is also inherently sequential. Although some progress has been done via parallel SGD and other techniques, the implementation is complicated and the speedups achieved scale poorly with the number of processors. Hybrids of decision trees and deep neural nets can be trained with TAO, which relies on SGD only in the optimization over individual nodes. TAO's inherent parallelism over non-descendant sets of nodes thus introduces significant parallelism in training such models.

How does one optimize end-to-end a decision tree that takes as input the output of a deep net? This is exactly the problem we discussed in section 9.3.2, where T is the tree and F the deep net.

10.5.5 Deep Net Compression: Achieving Models that are Smaller, Faster or Consume Less Energy The problem of deep net compression seeks to replace a large, highly accurate deep net with a much smaller deep net (or other model) with an acceptable accuracy. It is motivated by the need to deploy deep nets onto IoT devices such as mobile phones, which have stringent limitations on runtime, energy or bandwidth. This has attracted considerable interest in academic and industrial research. Tree-based neural nets provide a new approach for model compression. Decision trees and tree-based neural nets trained with TAO can achieve competitive classification accuracy with relatively few parameters and a very fast inference time. For example, simply replacing the fully-connected layers of architectures such as LENET5 or VGG with an oblique decision tree, we can achieve large gains in memory, inference speed with no degradation of the test classification accuracy. Indeed, in GOOGLE's datacenters most of the neural net inference workload is spent in fully-connected layers (at least in 2016), so replacing fully-connected layers with a decision tree could have an important practical impact.

Other techniques may be useful, such as teacher-student approaches, which train a smaller model on the (suitably transformed) outputs of the large model. This approach originally developed to replace a large, slow random forest with a smaller, faster model, and has more recently been applied to deep nets.

10.5.6 Tree within Tree

We can have nonlinear decision nodes be decision trees themselves and use TAO to train them in the decision node optimization. The resulting "tree within tree" model is equivalent to a (much) larger binary tree; we can see this by appending the subtrees of the left and right child of a node i to every leaf of the tree within i. This shows that a tree-within-tree shares, or reuses, entire subtrees, which may be a convenient model in practice.

10.6 Ensembling TAO Trees: Decision Forests

Forests (ensembles of trees) are among the most effective off-the-shelf algorithms for classification and regression. Traditionally, forests are constructed by using some kind of ensembling technique (such as bagging or boosting) and training each individual tree using a CART-style algorithm. TAO can be used to construct better forests by simply using it instead of CART to train each individual tree, with no modification to the overall forest learning procedure. This should produce forests that, while being more accurate, are more compact (consisting of fewer, smaller trees).

However, in such procedures each tree is trained independently of the others, which is suboptimal. We can go beyond that and use TAO to train all the trees jointly, by applying alternating optimization to the overall forest: we repeatedly optimize each tree (using TAO) given the remaining trees are fixed, and iterate the procedure until convergence. This will monotonically decrease the objective function over the whole forest at each iteration.

10.7 Interpretable Models

While it is possible to learn very accurate predictive models by training deep nets with millions of parameters on large labeled datasets, their interpretability has remained very difficult, in spite of much recent research on the topic. The lack of explainability is "one of the biggest obstacles to widespread adoption of artificial intelligence", and "answering 'why?' questions is central to assigning blame and responsibility and lies at the heart of legal systems". Indeed, organizations and governments such as DARPA and the European Union are getting involved in this issue. A person should know why a medical-diagnosis system recommends surgery, or a financial credit system determines a transaction is fraudulent or denies a mortgage application. Not being able to explain why has legal implications.

Decision trees have long been widely recognized as among the most interpretable of all models, but unfortunately their low predictive accuracy if trained with CART-type algorithms has kept them from being useful. The ability of TAO to train tree-based models with penalties that promote sparsity or parts-based learning in the nodes makes it possible to learn models that are both highly accurate and interpretable. In a tree, interpretability generally depends on the size of the tree and the complexity of individual nodes. The regularization strategies described in section 9.1 afford great flexibility in the type of tree that is learned. For example, depending on the case, we may prefer to learn a small tree with weakly sparse nodes (each using many features), or a larger tree with very sparse nodes, or even a tree where the sparsity of a node depends on how close it is to the root. The space of hybrid models of decision trees and deep nets likely contains models that strike a good balance between high accuracy and interpretability. Even if the leaves of a tree are complex classifiers, understanding why an instance is routed to a specific leaf may be helpful.

Also, decision trees offer a new approach to interpreting and even manipulating deep nets: by training a sparse oblique tree on features extracted by a pretrained deep net to do classification, we can inspect the hierarchy created by the decision tree, group related features, and find correlations between them and the output classes.

11 Computational Complexity and Convergence Guarantees of TAO

In this section, we first review the complexity of learning trees from data, and then discuss TAO's optimality guarantees and computational complexity in time and space.

11.1 Complexity of the Tree Learning Problem

We give a summary of approximation results for two problems of interest in learning trees minimizing a loss function over a tree (for the simplest types of axis-aligned trees), and minimizing the 0/1 loss over a hyperplane (this problem corresponding to the decision node optimization with oblique trees). In most cases, both problems are hard to solve exactly or even approximately. We also describe the size of the search space for both problems, to give an idea of its size (see sections 11.1.3-11.1.4).

11.1.1 Complexity of the Tree Learning Problem (for Boolean, Axis-Aligned Trees)

Learning optimal trees from data, or even approximating the optimal tree by a constant factor, is hard in most formulations of the problem, even for axis-aligned trees (which are the simplest case). We review several basic results, all of which assume the simplest types of axis-aligned trees: binary trees for binary classification with a 0/1 label at each leaf and with binary features (hence the tree is a Boolean function). For each NP-hard tree minimization problem below, the corresponding NP-complete decision problem is to determine whether there exists a decision tree with size less than or equal to a given number. The proof is typically by reduction from a set covering problem, which is NP-hard to solve and to approximate in polynomial time to within any constant factor.

Consider a finite collection of instances and tests (where the tests can be organized as a binary decision tree) and define the size of the tree as the expected number of tests required for classifying an unseen instance (i.e., the expected path length of the tree). They show that constructing a minimal tree is NP-hard. The result also holds if defining the size of the tree as the largest path length (i.e., the depth of the tree) or to some other measures of tree size.

In all the following results, the size of a tree is defined as the number of leaves. For example, the smallest decision tree that it is consistent with a training set is NP-hard, and, that a decision tree cannot be efficiently approximated within a constant factor. Two decision trees are defined as "decision equivalent" if they represent the same function, i.e., they give the same output for every possible input. They show that finding a decision tree of minimal size that is decision equivalent to a given decision tree is NP-hard. Further a decision tree of minimal size that is decision equivalent to a given decision tree cannot be efficiently approximated within a constant factor.

11.1.2 Complexity of the Hyperplane Learning Problem

The complexity of (unweighted) 0/1 loss binary classification with a hyperplane (i.e., a thresholded linear function) depends, as follows:

1. The easy case: linearly separable sets. Recognizing whether two arbitrary sets of points can be separated by a hyperplane (and finding such a hyperplane) can be formulated as a linear program and hence solved in polynomial time (i.e., this problem is not NP-hard).
2. The hard case: linearly inseparable sets. When the two sets are not linearly separable, the problem of finding a hyperplane that minimizes the number of misclassified points is NP-hard [theorem 3.1] and cannot be approximated to within a constant factor in polynomial time [corollary 4.10]. The corresponding NP-complete decision problem is, given two sets of points, to determine whether there exists a hyperplane that achieves at most k misclassifications.

Also, recognizing whether two sets of points can be separated by a hyperplane whose weights are either 0 or 1 is NP-complete. Further NP-hard variants of linear separability problems have also been investigated.

With oblique trees, the decision node optimization problem in TAO is a weighted 0/1 loss binary classification problem (with or without a sparsity penalty), which is therefore NP-hard.

Special cases. Some restricted forms of the (weighted or unweighted) 0/1 loss binary classification problem are not NP-hard. Assume we have N points in $\mathbb{R}^{\mathcal{D}}$. Then:

1. If the points are in dimension $\mathcal{D} = 1$, the problem can be solved efficiently by enumeration: we simply scan all N points, trying a separation in between consecutive points.
2. If the points are linearly separable, then any separating hyperplane gives the global optimum for both the unweighted 0/1 loss problem (as stated above) and also for any weighted 0/1 loss problem. This holds because a separating hyperplane achieves the tight lower bound of the objective function of the reduced problem, i.e., it achieves the ideal pseudolabels; see the end of section 7.4. (This is not generally true if we have a regularization term.)

An important case where this happens is if $N \leq \mathcal{D} + 1$ (with points in general position), because the problem is then necessarily linearly separable (see section 11.1.4).

Both of these are important in the decision node optimization of decision trees with TAO. The first one corresponds to axis-aligned trees, since $\mathcal{D} = 1$ in each decision node. The second one may apply to oblique trees if they are deep enough, since nodes deep enough in the tree can have reduced sets small enough that the condition $N \leq \mathcal{D} + 1$ will hold.

11.1.3 Counting Trees

Call n the number of nodes in the tree (including both leaves and internal, or decision, nodes). The number of tree structures having n nodes is known in several cases, including the following types of trees:

Ordered trees, where the relative order of the subtrees of each node matters (e.g. whether exchanging the left and right child matters in a binary node). The number of binary trees with n nodes is given in eq. 14 as $$b_n = \frac{1}{n+1}\binom{2n}{n}$$

(this is also known as the nth Catalan number, $C_n$). Asymptotically (using the Stirling approximation) this is $4^n n^{-3/2}/\sqrt{\pi}$. It exceeds 10 thousand for n=10 and 1 million for n=14. More generally, the number of t-ary trees (where each decision node has t children) with n nodes is given as $$\frac{1}{(t-1)n+1}\binom{tn}{n}.$$

Oriented (or rooted or unordered) trees, where the relative order of the subtrees of each node does not matter. The exact formula is complicated, but there is a simpler asymptotic expression: $A_n = c\alpha^n n^{-3/2}$ where $\alpha \approx 2.9558$ and $c \approx 0.4399$. This exceeds 10 thousand for n=13 and 1 million for n=18.

In the context of decision trees, ordered vs oriented trees work as follows Imagine a binary tree where we exchange the left and right child of a given node (and adjust the decision function so the tree predictive function remains unchanged). Then, as ordered trees, the resulting tree is considered different from the original; as oriented trees, both are considered the same tree. In parameter space both trees are indeed different because they correspond to different weight values and decision functions. But whether we count ordered or oriented trees, both grow much faster than $2^n$ with the number of nodes n.

11.1.4 Counting Dichotomies

A dichotomy of a set of N points is a partition into two sets (where one of them can be empty). The number of dichotomies of N points is $2^N$, but if the dichotomy is given by a hyperplane, then the number is smaller, and is given by the following theorems. We say that N points in $\mathbb{R}^{\mathcal{D}}$ are in general position if every subset of $\mathcal{D}$ or fewer points is linearly independent, i.e., no $\mathcal{D} + 1$ points are on a hyperplane.

Theorem 11.1 (Function-counting theorem). Consider N points and the origin in general position in Euclidean $\mathcal{D}$-dimensional space (no $\mathcal{D}$ points in any subspace). Then there are C (N, $\mathcal{D}$) dichotomies using hyperplanes through the origin ($w^T x = 0$), where $$C(N, \mathcal{D}) = 2\sum_{k=0}^{\mathcal{D}-1}\binom{N-1}{k}.$$

From this it follows that:

If $N \leq \mathcal{D}$ then $C(N, \mathcal{D}) = 2^{\mathcal{D}}$, i.e., all possible dichotomies can be realized via a hyperplane through the origin.

If $N = \mathcal{D}$ then $C(N, \mathcal{D}) = 2^N = 2^{\mathcal{D}}$.

If $N = 2\mathcal{D}$ then $C(N, \mathcal{D}) = 2^{N-1}$.

If $N \gg D$ then $C(P,N) = \mathcal{O}(N^{\mathcal{D}})$.

Theorem 11.2. Consider N points in general position in Euclidean $\mathcal{D}$-dimensional space (no $\mathcal{D} + 1$ points in any hyperplane). Then there are C(N, $\mathcal{D} + 1$) dichotomies using arbitrary hyperplanes ($w^T x + b = 0$).

In the context of decision trees and TAO, an important special case of theorem 11.2 is that if $N \leq \mathcal{D} + 1$ then C(N, $\mathcal{D} + 1) = 2^{\mathcal{D}+1}$, i.e., all possible dichotomies in $\mathcal{D}$-dimensional space can be realized via a hyperplane (no matter how we assign class labels to the N points). Hence, in decision nodes whose reduced set has $\mathcal{D} + 1$ points or less, the reduced problem (no matter the pseudolabels) is linearly separable and, from section 11.1.2, a separating hyperplane can be found in polynomial time, so the reduced problem is not NP-hard. This is another important case (together with the axis-aligned case) where the reduced problem in TAO can be solved exactly and efficiently. Reduced sets having $\mathcal{D} + 1$ points or less will happen for nodes that are far enough from the root. For a binary tree and assuming each node partitions 50/50 its reduced set, this happens for nodes at depth $$\Delta \geq \log_2\left(\frac{N}{\mathcal{D}+1}\right)$$

(for example, for the well-known MNIST dataset, where $\mathcal{D}$ =784 and N=60k, this happens for $\Delta \geq 7$).

11.2 Optimality Guarantees of TAO

As noted in the previous section, learning trees from data (even to a constant approximation factor) is NP-hard already for the simplest types of trees, and the search space of tree structures is enormous. Hence we cannot expect efficient training algorithms to be exact (i.e., to find the global optimum of eq. 4). We have to settle for efficient algorithms that tend to work well, and this should be assessed by both theoretical and empirical results. Here, we discuss what we can currently say about TAO in terms of theoretical results.

Conceptually, TAO applies alternating optimization to the objective function eq. 4. Specifically, it fixes the parameters of a set of nodes and optimizes over the rest. Unlike for gradient-based algorithms, there are few theoretical results for alternating optimization, and these are mostly for convex and differentiable problems, which is not the case with trees. So at present we have no theoretical results regarding the quality of the tree learned by TAO, i.e., how far it is from the globally optimal tree. However, we can state the following two properties:

Monotonic Decrease of the Objective Function

At each iteration, TAO decreases the objective function eq. 4 or leaves it unchanged over the current tree. This is guaranteed if the node optimization is able itself to decrease the reduced problem objective function, eqs. 11 and 12, which is true for many important models. (Although the reduced problem over a decision node is a weighted 0/1 loss classification problem, which in general is NP-hard, an approximate solution can usually be found that reduces the objective. If that is not the case, we can simply skip the update for that node and leave its objective unchanged. With axis-aligned trees, the node problem can be solved exactly.)

Finite-Time Termination with Exact Node Optimization

If the node optimization problems (decision nodes and leaves) can be solved exactly over the node parameters, then the search space is finite, and given by the number of possible reduced sets that can be generated by the training set of N instances. Hence, assuming TAO would not cycle, this makes the number of iterations no larger than the size of the search space, and far smaller in practice. The node optimization is exact for axis-aligned trees with constant leaf predictors.

The monotonic decrease is a powerful result because 1) it allows one to use an arbitrary initial tree, and 2) it guarantees progressive improvement of the tree. This improvement is considerable in practice for an important reason: the separability condition. Alternating optimization works best when two conditions hold: the parameters of the objective function are loosely coupled, and each step can be solved efficiently and accurately. Both hold for TAO: the separability condition means that the optimization over an entire subset of non-descendant nodes is uncoupled, and the reduced problem theorem tells us that the optimization over one node (which itself can involve many parameters) can be solved efficiently and accurately for many types of nodes. In practice, each TAO iteration makes large changes to all the tree's parameters and considerably decreases the objective function, particularly in early iterations. In our by now considerable experience, TAO learns trees for large, high-dimensional, challenging datasets having consistently much higher accuracy than CART or any other tree learning algorithm.

TAO and k-Means

At a high level, the behavior of TAO is very similar to that of k-means, the most widely used algorithm for clustering, originally proposed in the 50s. k-means is an iterative algorithm to minimize the squared distortion of a dataset of N instances over a set of K centroids, which is an NP-hard problem. k-means is also an alternating optimization algorithm, which alternates two steps: one over the centroid means (which are continuous parameters) and one over the instance-to-centroid assignments (which are discrete parameters). Like TAO, k-means benefits from separability: given the assignments, the optimization separates over the K centroids; given the centroids, the optimization separates over the N assignments. Both steps can be solved exactly, and the two properties above hold: monotonic decrease of the objective function and finite-time termination. These are responsible for the excellent performance in practice of k-means. Theoretical results for k-means about approximation to the global optimum were only found in 2007, based on a clever initialization of the centroids. (Strictly speaking, these results are not about k-means, but about the initialization, which already achieves the desired approximation factor; k-means then further improves it.)

Theoretical Guarantees Vs Practical Performance

Theoretical results about the ability to approximate NP-hard problems are important but should be critically understood, because they are usually based on worst-case assumptions that can be far from practical performance. A typical approximation guarantee for a polynomial-time algorithm will state that the objective function (possibly in expectation) of the solution returned by the algorithm is at most a constant factor $\rho$ times larger than the global optimum. While such a guarantee is undeniably of theoretical interest, its practical impact is dubious unless $\rho$ is relatively small. Further, one should not make the mistake of claiming that just because algorithm $\mathcal{X}$ has an approximation guarantee it is really better in practice than another algorithm $\mathcal{Y}$ for which no such guarantees are known. An algorithm may not have an approximation guarantee simply because nobody has been able to find one, or because in pathological cases (worst-case analysis) the algorithm can have an unbounded error, even if it may perform very well in typical cases. Well-known examples of this are the simplex algorithm for linear programming and the k-means algorithm for clustering. An approximation factor for the latter was found over 50 years after the discovery of k-means and has quite a large value anyway ($\rho=8(\ln K+2)$, where K is the number of clusters).

Another type of theoretical guarantee relies on using brute-force search (perhaps efficiently implemented). This will indeed solve any NP-hard problem, but with a worst-case runtime that is at least exponential, making it practical only for trivially small problems. Certain tree learning problems are formulated as a mixed-integer optimization problem, which they solve essentially via branch-and-bound search using state-of-the-art commercial solvers. While this search will eventually find the globally optimal tree, the runtime required is enormous even for tiny trees and datasets. With nontrivial trees or datasets, such branch-and-bound search must be stopped early, at which point the "optimality guarantees" disappear, and the approach becomes a heuristic search with no particular advantage over other heuristic algorithms such as CART. Optimality guarantees based on impractically slow algorithms are vacuous and, worse, can mislead a casual reader in thinking that the very difficult problem of tree learning can be solved exactly in practice.

11.3 Computational Complexity of TAO

We discuss the time and space computational complexity of TAO in its different versions (TAO-BFS, TAO-RE-VERSE-BFS and TAO-DFS) as described in section 8.

11.3.1 Time Complexity

In a sequential processor, TAO-BFS, TAO-REVERSE-BFS and TAO-DFS all have the same time complexity, essentially due to the fact that BFS, reverse BFS and DFS visit each node and edge of the directed tree exactly once. This complexity depends on the complexity of the models at the decision nodes and leaves. We can give a rough but instructive computational complexity as follows. Assume: 1) a complete binary tree of depth $\Delta$ where all decision nodes have the same type of model and all leaves have the same type of model; the care sets equal the reduced sets; 3) the runtime to apply a decision function and a leaf predictor to an instance is $t_f$ and $t_g$, respectively; and 4) the time to train a decision function and a leaf predictor on N instances is $NT_f$ and $NT_g$, respectively. Then it is easy to see that, for all versions of the pseudocode, we have the following runtimes:

Compute reduced sets: $N \Delta t_f$.

Compute pseudolabels at the decision nodes: $N \Delta(2t_g + (\Delta-1) t_f)$. This is because, for each instance, at each decision node we have to try both the left and right child (each involving a path from the node to a leaf).

Solve the node optimization: $N \Delta T_f$ (decision nodes) and $NT_g$ (leaves).

This gives a total per TAO iteration of $N (\Delta(T_f+2t_g)+\Delta^2 t f + T_g)$. Under the very natural assumptions that the tree depth is moderate and that training a node model takes much longer than applying it (per instance), i.e., that $t_f \ll T_f$ and $t_g \ll T_g$, we have an approximate runtime per TAO iteration of $N (\Delta T_f + T_g)$. Comparing with the time that it takes to apply the tree to all N instances, which is $N (\Delta t_f + t_g)$, we see the per-iteration time is equivalent to training $\Delta$ decision functions and one leaf predictor on the entire training set, i.e., training "one root-leaf" path over the entire training set.

In a parallel processor, the runtime is more complicated to compute, depending on the number of processors. As noted above, TAO-DFS uses asynchronous parallelism and so should be faster than TAO-BFS or TAO-REVERSE-BFS.

11.3.2 Space Complexity

All versions of TAO (TAO-BFS, TAO-REVERSE-BFS, TAO-DFS) have the same space complexity. Apart from the tree itself (including the models at its |N| nodes), which is the output of the algorithm, the main space consumed by TAO is that of storing the reduced sets $\mathcal{R}_i$ and the pseudolabels $\bar{y}_n$ for the decision node optimization. The reduced sets are stored in the integer array R of section 8.4, of size N. Each pseudolabel is a small integer (the index of a child); for binary trees it can be stored with a single bit. The maximum number of pseudolabels needed at any time in any TAO algorithm is N, since TAO optimizes jointly over non-descendant nodes, whose reduced sets are disjoint, and the pseudolabels can be discarded once the node is trained. Hence, the space consumed by the pseudolabels is at most N small integers (it may be less than N because the care sets can be smaller than the reduced sets). Taking all together, the overall space complexity is $\mathcal{O}(N)$, with small constant factors.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. A distributed computing system may also be utilized.

In one or more exemplary designs, the functions described may be implemented in hardware, software, firmware, or any combination thereof. If implemented in software, the functions may be stored on or transmitted over as one or more instructions or code on a non-transitory computer-readable medium. Computer-readable media may include both computer storage media and nontransitory communication media including any medium that facilitates transfer of a computer program from one place to another. A storage media may be any available media that can be accessed by a general purpose or special purpose computer. By way of example, and not limitation, such non-transitory computer readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general purpose or special-purpose computer, or a general-purpose or special-purpose processor.

The previous description of the disclosed embodiments is provided to enable any person skilled in the art to make or use the embodiments disclosed. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A computer-implemented method for learning a decision tree, the method comprising:
   inputting an initial decision tree having a plurality of nodes;
   inputting a training set of instances;
   processing the initial decision tree to create an optimized tree, the processing comprising:
      partitioning the plurality of nodes of the initial decision tree into sets of non-descendant nodes;
      for each set of non-descendant nodes, process nodes in the set of non-descendant nodes, the processing comprising:
         for each node i of the set of non-descendant nodes:
            if i is a decision node, updating parameters of the node's decision function model using a decision node reduced problem:

$$\min_{\theta_i} E_i(\theta_i) = \sum_{n \in \mathcal{R}_i} l_{in}(f_i(x_n; \theta_i)) + \alpha \phi_i(\theta_i)$$

where Ri is a reduced set of the decision node, $l_{in}$ is a real-valued loss function for a subtree rooted at the node i, Ei is an objective function of the node i, $\theta_i$ is a set of parameters of the node i, $x_n$ is the nth training instance, $f_i(x_n;\theta_i)$ is the node's decision function model, and a $\alpha\phi_i(\theta_i)$ is a regularization; and if i is a leaf, updating parameters of the leaf's predictor model using a leaf reduced problem:

$$\min_{\theta_i} E_i(\theta_i) = \sum_{n \in \mathcal{R}_i} L_n(g_i(x_n; \theta_i)) + \alpha \phi_i(\theta_i)$$

where $R_i$ is a reduced set of the leaf, $L_n$ is a real-valued loss function, Ei is an objective function of the leaf i, $\theta_i$ is a set of parameters of the leaf i, $x_n$ is the nth training instance, $g_i(x_n;\theta_i)$ is the predictor model at the leaf, and $\alpha\phi_i(\theta_i)$ is the regularization;

iterating the processing by inputting the optimized tree as the initial decision tree until a stopping criterion is satisfied;

pruning a resulting optimized tree to produce a pruned tree; and using the pruned tree on a client system to perform a machine learning task.

2. The computer-implemented method of claim 1, where the reduced set of the decision node is without don't care instances.

3. The computer-implemented method of claim 1, where the stopping criterion is when a user specified number of iterations is reached, or the parameters change less than a user set tolerance.

4. The computer-implemented method of claim 1, further comprising, processing in parallel at least some of the sets of non-descendant nodes.

5. The computer-implemented method of claim 1, further comprising partitioning the nodes of the initial decision tree into the sets of non-descendant nodes utilizing reverse breadth-first search (BFS) order, BFS order, depth-first search (DFS) order, or by generating random sets of non-descendant nodes.

6. The computer-implemented method of claim 1, where the initial tree is complete, is incomplete, comprises binary nodes, comprises ternary nodes, comprises quaternary nodes, is binary and complete, is binary and incomplete, has splits that are generated randomly, is a tree obtained by a conventional algorithm, or is a combination thereof.

7. The computer-implemented method of claim 1, where the parameters of the initial decision tree are random, equal to the parameters of a previously processed tree, or equal to the parameters of a tree obtained by another machine learning algorithm.

8. The computer-implemented method of claim 1, where the node's decision function model is a classifier, a univariate classifier, a linear multivariate classifier, a sparse linear multivariate classifier, a nearest-neighbor classifier, a logistic classifier, a softmax classifier, a constant classifier, a naïve Bayes, a kernel machine, a radial basis function network, a generalized linear model, a Gaussian process, a neural net, or a classification tree.

9. The computer-implemented method of claim 1, where the leaf's predictor model is a classifier, a univariate classifier, a linear multivariate classifier, a sparse linear multivariate classifier, a nearest-neighbor classifier, a logistic classifier, a softmax classifier, a constant classifier, a naïve Bayes classifier, a kernel machine classifier, a radial basis function network classifier, a generalized linear model classifier, a Gaussian process classifier, a neural network classifier, a classification tree, a linear regressor, a polynomial regressor, a nearest-neighbor regressor, a SVM regressor, a radial basis function network regressor, a generalized linear model regressor, a neural network regressor, a spline, a regression tree, a probability density model, a graphical model, a mixture density, a Gaussian mixture, a kernel density estimate, a probability output, or a neural network with a softmax output layer.

10. The computer-implemented method of claim 1, where the machine learning task is predicting target values for binary classification, multiclass classification, a receiver operating characteristic (ROC) curve, regression, ranking, density estimation, dimensionality reduction, clustering, quantization, coding, or semisupervised learning.

11. The computer-implemented method of claim 1, where the machine learning task is a data mining operation for discovering patterns in the training set of instances, constructing decision rules from the pruned tree, explaining a prediction for an input by tracing a path the input followed from a root to a leaf of the pruned tree, using the pruned tree to interpret another model, or using the pruned tree to find a clustering or segmentation of the training set of instances.

12. The computer-implemented method of claim 1, where the loss function $L_n$ is selected from misclassification error (0/1 loss), logistic loss, cross-entropy, hinge loss, squared error, absolute deviation, quantile regression, robust errors, log-likelihood, reconstruction error, autoencoder error, siamese distances, pairwise distances, or non-linear embedding.

13. The computer-implemented method of claim 1, where the regularization is: restricting a set of features at each node; penalties or constraints based on L0, L1, L2, L1+L2 or other Lp norms or combinations thereof; restricting a number of features via L1, L0 or other sparsity regularizers; penalizing a number of nodes in the initial decision tree via a delta penalty; restricting a number of classes in a leaf; regularization dependent on a size of the reduced set; restricting a structure of the initial decision tree; constraints on a tree predictive function; non-negativity constraints on parameters of the decision tree to be learned; or combinations thereof.

14. The computer-implemented method of claim 1, where pruning the resulting tree occurs after a last iteration and comprises:
for a first node's sub-tree where the first node's reduced set has all instances of a same class, replacing the first node with a leaf that predicts the same class and discarding the first node's subtree; and
for a second node's subtree where the second node's reduced set is empty and the second node's parent node's reduced set is non-empty:
if the second node's parent node is binary, replacing the parent node with the parent node's non-empty child and discarding the parent node's decision function and the second node's subtree; or
if the parent has more than two children, leaving the parent node in the tree, discarding the second node's decision function, and changing the parent node's decision function such that if the parent node's output equals the second node, the parent node's output is changed to output to an arbitrary child of remaining children of the parent node.

15. The computer-implemented method of claim 1, where the training set of instances is: a D-dimensional vector of features of nominal, ordinal, categorical, encoded as one-hot encoding, or scale (continuous) type; a D-dimensional vector of features derived from a conventional machine learning model; a graph; a string; or other structured input not represented by a D-dimensional vector.

16. The computer-implemented method of claim 1, where the initial decision tree is one tree in an ensemble of trees, and the method further comprises repeating the method for each tree in the ensemble.

17. The computer-implemented method of claim 1, where the input features to the decision tree are the output features of a neural net or other machine learning model.

18. The computer-implemented method of claim 1, where the pruned tree replaces a portion of a neural network.

19. The computer-implemented method of claim 1, further comprising storing reduced sets for each node in an array.

20. The computer-implemented method of claim 1, further comprising:
  determining a set of increasing a values;
  processing the initial decision tree using a lowest value of a and iterating until the stopping criterion is satisfied;
  before pruning, adding a first unpruned tree to a collection of trees;
  inputting the first unpruned tree as the initial decision tree, processing the initial decision tree using a next increasing a value in the set to create a next unpruned tree, and iterating until the stopping criterion is satisfied;
  adding the next unpruned tree to the collection of trees;
  repeating the processing the initial decision tree and adding the next unpruned tree by inputting the next unpruned tree as the initial decision tree, and using the next increasing a value, iterating until the stopping criterion is satisfied, and adding the next unpruned tree to the collection of trees, until all increasing $\alpha$ values of the set have been used; and
  pruning all trees in the collection of trees.

21. A computer-implemented method for learning a decision tree, the method comprising:
  inputting an initial leaf with random parameters;
  performing the computer-implemented method of claim 1, where the initial leaf is input as the initial decision tree and the processing is iterated until a stopping criterion is satisfied;
  growing a new decision tree, the growing comprising:
    for each leaf of a current decision tree, determining if the leaf achieves a minimal loss on the leaf's reduced set of instances, where the minimal loss occurs when an increase in a regularization term is more than a decrease in the leaf's loss;
    if the leaf does not achieve the minimal loss, splitting the leaf and assigning random parameters to each new leaf to create the new decision tree;
  performing the computer-implemented method of claim 1, where the new decision tree is input as the initial decision tree, wherein the processing is iterated until a stopping criteria is reached and the current decision tree is pruned;
  repeating the growing of the current decision tree until a growing stopping criterion is reached;
  pruning the resulting decision tree; and
  using the resulting pruned decision tree on a client system to perform a machine learning task.

22. The computer-implemented method of claim 21, where the growing stopping criterion is when a set number of iterations is reached, or the optimized new decision tree has the same structure as a previous optimized new tree and a change in the optimized new decision tree's parameters is less than a set tolerance.

23. The computer-implemented method of claim 21, further comprising before repeating the growing of the current decision tree, adding the optimized current decision tree to a collection of trees, and before using the current decision tree, choosing, using model selection rules, a suitable tree from the collection of trees to use on a client system to perform a machine learning task.

24. The computer-implemented method of claim 23, where the model selection rules are cross-validation or a model selection criterion.

\* \* \* \* \*